US008312392B2

(12) United States Patent
Forutanpour et al.

(10) Patent No.: US 8,312,392 B2
(45) Date of Patent: Nov. 13, 2012

(54) USER INTERFACE GESTURES AND METHODS FOR PROVIDING FILE SHARING FUNCTIONALITY

(75) Inventors: Babak Forutanpour, Carlsbad, CA (US); Ted Gooding, San Diego, CA (US); David Bednar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 380 days.

(21) Appl. No.: 12/578,892

(22) Filed: Oct. 14, 2009

(65) Prior Publication Data

US 2011/0083111 A1  Apr. 7, 2011

Related U.S. Application Data

(60) Provisional application No. 61/248,249, filed on Oct. 2, 2009.

(51) Int. Cl.
*G06F 3/033* (2006.01)
(52) U.S. Cl. ......... 715/863; 715/733; 715/734; 715/748
(58) Field of Classification Search .................. 715/863, 715/733, 734, 748
See application file for complete search history.

(56) References Cited

U.S. PATENT DOCUMENTS

| | | | |
|---|---|---|---|
| 6,313,853 B1 * | 11/2001 | Lamontagne et al. | ........ 715/762 |
| 7,427,926 B2 | 9/2008 | Sinclair et al. | |
| 7,479,949 B2 | 1/2009 | Jobs et al. | |
| 7,751,834 B2 | 7/2010 | Park et al. | |
| 7,802,191 B2 * | 9/2010 | Pettinati et al. | ............... 715/739 |
| 8,045,455 B1 | 10/2011 | Agronow et al. | |
| 2004/0003133 A1 | 1/2004 | Pradhan et al. | |
| 2004/0203381 A1 * | 10/2004 | Cahn et al. | ................... 455/41.2 |
| 2006/0256074 A1 | 11/2006 | Krum et al. | |
| 2006/0258289 A1 | 11/2006 | Dua | |
| 2007/0124503 A1 | 5/2007 | Ramos et al. | |
| 2007/0146347 A1 | 6/2007 | Rosenberg | |
| 2007/0268110 A1 | 11/2007 | Little | |
| 2008/0039212 A1 | 2/2008 | Ahlgren et al. | |

(Continued)

FOREIGN PATENT DOCUMENTS

WO WO2005076542 A1 8/2005

(Continued)

OTHER PUBLICATIONS

Moore, Travis "Mover Review" AppVee, <www.appvee.com/t/iphone-app-review-mover>, Oct. 14, 2009.

(Continued)

*Primary Examiner* — Andrey Belousov
(74) *Attorney, Agent, or Firm* — Nicholas A. Cole

(57) ABSTRACT

Methods and devices provide a gesture activated file sharing functionality enabling users to share files with other nearby computing devices. The file sharing functionality may include establishing wireless links with nearby devices and determine their relative locations. The computing device may detect a file sharing gesture and transmit files to or request files from a nearby device in response to the gesture. Base on gesture parameters, e.g., direction, speed and shape, and computing device attitude parameters, e.g., tilt angle and pointing direction, the computing device may identify a targeted device to which a file may be transmitted. The computing device may request user verification of the identified device and send a request to transmit files to the targeted device. The computing devices may transmit files using networks and addresses provided over the device-to-device communication links.

69 Claims, 46 Drawing Sheets

U.S. PATENT DOCUMENTS

| | | | |
|---|---|---|---|
| 2008/0096519 A1* | 4/2008 | Miegel | 455/404.2 |
| 2009/0017799 A1* | 1/2009 | Thorn | 455/414.1 |
| 2010/0124949 A1 | 5/2010 | Demuynck et al. | |
| 2010/0167646 A1 | 7/2010 | Alameh et al. | |
| 2010/0257251 A1 | 10/2010 | Mooring et al. | |
| 2011/0081923 A1 | 4/2011 | Forutanpour et al. | |

FOREIGN PATENT DOCUMENTS

| | | |
|---|---|---|
| WO | WO2008007175 A1 | 1/2008 |

OTHER PUBLICATIONS

International Search Report and Written Opinion—PCT/US2010/050747, International Search Authority—European Patent Office—Jan. 10, 2011.

International Search Report and Written Opinion—PCT/US2010/050738—ISA/EPO—Apr. 15, 2011.

\* cited by examiner

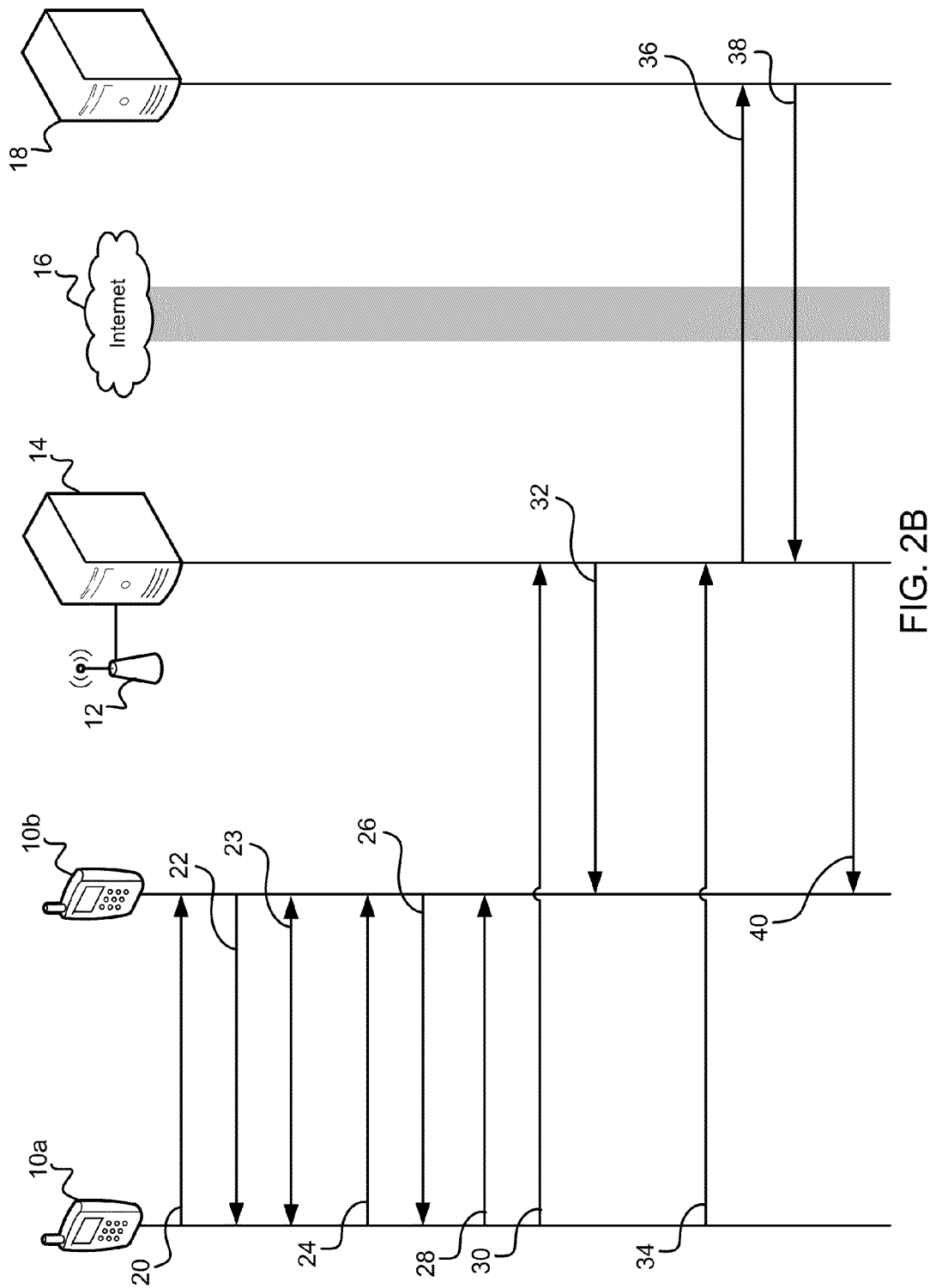

USER INTERFACE GESTURES AND METHODS FOR PROVIDING FILE SHARING FUNCTIONALITY

RELATED APPLICATIONS

This application claims the benefit of priority to U.S. Provisional Patent Application No. 61/248,249 filed Oct. 2, 2009 entitled "User Interface Methods Providing File Sharing Functionality," the entire contents of which are hereby incorporated by reference. This application cross-references and fully incorporates by reference concurrently filed U.S. application Ser. No. 12/578,905, entitled "Device Movement User Interface Gestures for File Sharing Functionality."

FIELD OF THE INVENTION

The present invention relates generally to computer user interface systems and more particularly to a gesture based user interface for activating a file sharing function.

BACKGROUND

Personal electronic devices (e.g. cell phones, PDAs, laptops, gaming devices, etc.) provide users with increasing functionality and data storage. In addition to serving as personal organizers, personal electronic devices serve to store documents, photographs, videos, and music, and serve as portals to the Internet and electronic mail. These devices allow users to communicate with other users and share stored files, such as documents, pictures or videos with other mobile device users. Today, mobile devices allow users to share files by employing different methods such as emailing, texting (e.g., SMS), multimedia messaging service (MMS), and near field communication (NFC). However, these file sharing methods are limiting, cumbersome, and time consuming. Drafting and sending an email requires a large amount of typing. The sender must know and enter an email address before sending a message. To send SMS or MMS messages, senders must know the recipient phone number. To use the internet for uploading or downloading files, the users must know a URL and visit a website. To use NFC, the senders and recipients of files must be in very close proximity.

SUMMARY

The various aspects include methods for sharing files among computing devices, including activating a file sharing functionality, discovering nearby computing devices, establishing a wireless link with the discovered computing devices, determining locations of the discovered nearby computing devices, detecting a file sharing gesture, identifying a targeted computing device based on the detected file sharing gesture, and transmitting a file sharing message to the targeted computing device. The wireless link may be established using a wireless technology selected from Bluetooth®, ZigBee®, Near Field Communication (NFC), wide-area-wireless IEEE 802.11 (WiFi), infrared (IrDA), and ultrasound. In an aspect, determining locations of the discovered nearby computing devices may include receiving location coordinates provided by Global Positioning System (GPS) receivers in each of the discovered nearby computing devices via the established wireless link, and transmitting the file sharing message to the targeted computing device may be accomplished using a wireless technology different from the wireless technology used to establish the wireless link. In an aspect, determining locations of the discovered nearby computing device may include determining a difference in arrival times of signals received from the discovered nearby computing devices using a first and second antennae, and using triangulation calculations based on the determined difference in arrival times of signals to determine a direction to each of the discovered nearby computing devices. In a further aspect, determining locations of the nearby discovered computing device may include receiving location coordinates provided by GPS receivers in each of the discovered nearby computing devices, and comparing the received location coordinates to location coordinates from a GPS receiver. In a further aspect, detecting a file sharing gesture may include detecting one of a flick gesture and a hand gesture. In a further aspect, identifying the targeted computing device may include determining a shape of the detected file sharing gesture, determining a direction and speed of the detected file sharing gesture, calculating a location where an object would land based on the determined shape, direction and speed of the detected file sharing gesture, and comparing the calculated location to the determined locations of the nearby discovered computing devices to identify a computing device closest to the calculated location where an object would land. In a further aspect, identifying the targeted computing device may include determining a tilt angle of the computing device, determining a direction and speed of the detected file sharing gesture, calculating a location where an object would land based on the determined tilt angle, direction and speed of the detected file sharing gesture, and comparing the calculated location to the determined locations of the nearby discovered computing devices to identify a computing device closest to the calculated location where an object would land.

In a further aspect, transmitting a file sharing message may include transmitting a selected file to the targeted computing device, and the method may further include transmitting a request to transmit the file to the targeted computing device, and receiving a response from the targeted computing device including access data specifying an address to which the file should be transmitted, in which transmitting the file to the targeted computing device may include determining a wireless communication link over which the file should be transmitted based upon the address specified in the received access data, and transmitting the file to the address via the determined wireless communication link. In a further aspect, the request to transmit the file to the target computing device may be accomplished using the established wireless link, and the determined wireless communication link used to transmit the file uses a wireless technology that is different than the established wireless link technology. In a further aspect, transmitting a file sharing message may include transmitting a selected file to the targeted computing device, and the method may further include displaying a prompt for a user verification of the targeted computing device, and determining whether a user input indicates user verification of the targeted computing device, in which transmitting the file to the targeted computing device may be accomplished if the user input indicates user verification of the targeted computing device. In a further aspect, displaying a prompt for a user verification the targeted computing device may include receiving a user identifier from discovered computing devices via the established wireless link, using the received user identifier to obtain an image from a contact database, and displaying an obtained image as the prompt for the user verification of the targeted computing device.

In another aspect, the method may further include displaying a launch pad on a touchscreen user interface, in which detecting a file sharing gesture may be accomplished by comparing a touch event start point or an end point to the displayed launch pad.

In another aspect, the method may further include displaying a radar map image including graphical indicators for the determined relative locations of the discovered nearby computing devices. In a further aspect, transmitting a file sharing message comprises transmitting a message requesting the targeted computing device to transmit a file. In another aspect, the method may further include transmitting access data to the targeted computing device in which the access data includes an address to which the requested file should be transmitted.

In another aspect the method may further include determining whether the detected file sharing gesture includes a curved path, and identifying the targeted computing device may include selecting a computing device positioned behind another computing device relative. In another aspect, the method may further include determining whether the detected file sharing gesture is directed away from other computing devices, and calculating an indirect path based on the direction of the file sharing gesture and an edge of the computing device display, in which identifying the targeted computing device may be based upon the calculated indirect path and the determined locations of the discovered nearby computing devices.

Another aspect is a mobile device that includes a processor, a display coupled to the processor, a touch sensitive surface coupled to the processor, a memory coupled to the processor, and at least one wireless transceiver coupled to the processor, in which the processor is configured with processor-executable instructions to perform operations of the various aspect methods.

Another aspect is a mobile device that includes means for accomplishing the functions involved in the operations of the various aspect methods.

Another aspect is a computer program product including a computer-readable medium storing computer-executable instructions including at least one instruction for accomplishing the processes of involved in the various aspect methods.

BRIEF DESCRIPTION OF THE DRAWINGS

The accompanying drawings, which are incorporated herein and constitute part of this specification, illustrate exemplary aspects of the invention. Together with the general description given above and the detailed description given below, the drawings serve to explain features of the invention.

FIG. 2B is a message flow diagram illustrating communications between components of the network of FIG. 2A.

DETAILED DESCRIPTION

Figure 1:
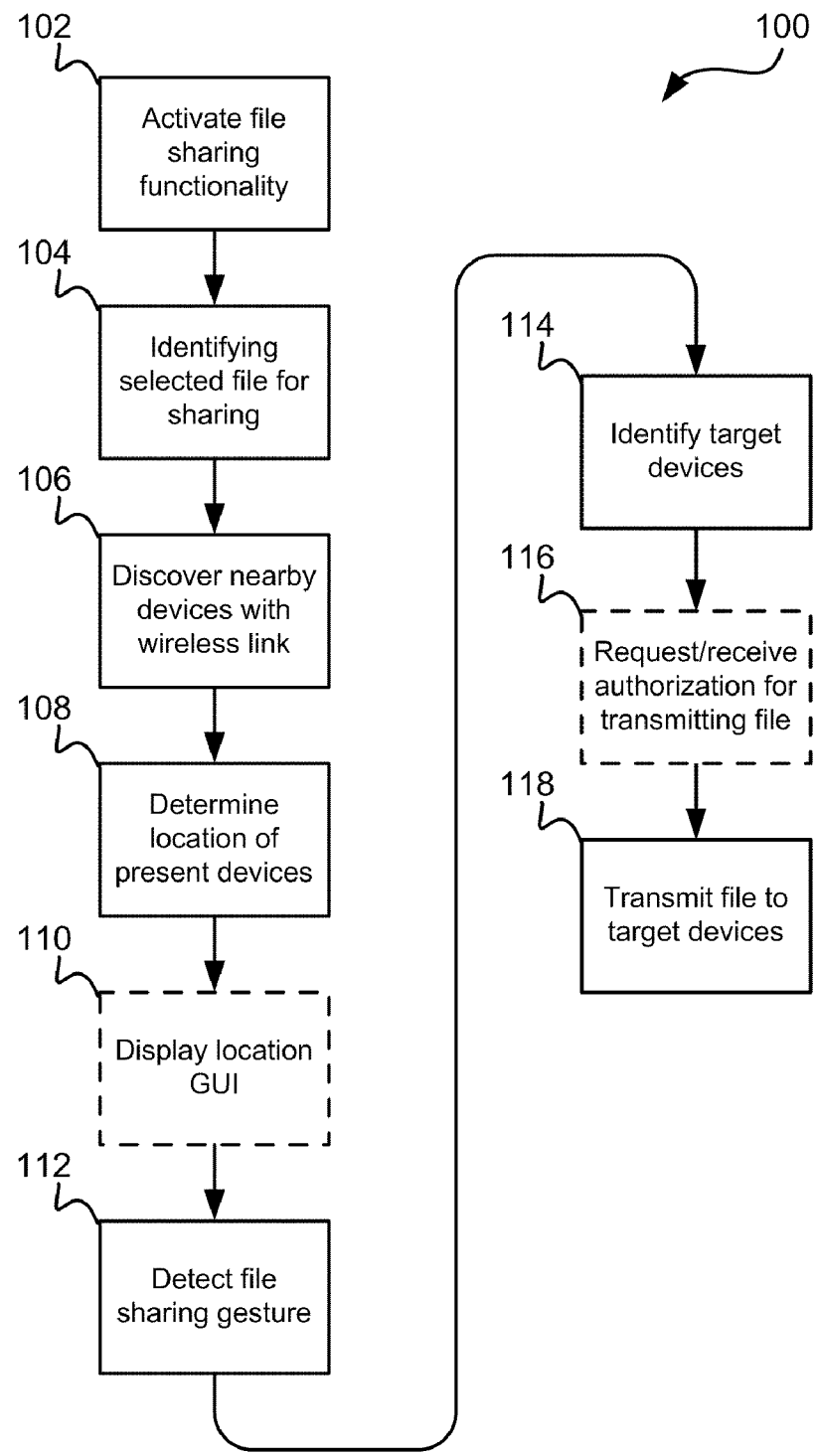
FIG. 1 is a process flow diagram of an aspect method for implementing file sharing functionality based on user gestures.

The various aspects will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The term "flick gesture" is used herein to mean a linear or curved touch gesture that is traced in one direction on a touchscreen user interface.

As used herein, a "touchscreen" is a touch sensing input device or a touch sensitive input device with an associated image display. As used herein, a "touchpad" is a touch sensing input device without an associated image display. A touchpad can be implemented on any surface of an electronic device outside the image display area. Touchscreens and touchpads are generically referred to herein as a "touch surface." Touch surfaces may be integral parts of an electronic device, such as a touchscreen display, or may be a separate module, such as a touchpad, that can be coupled to the electronic device by a wired or wireless data link. The terms touchscreen, touchpad and touch surface may be used interchangeably hereinafter.

As used herein, the terms "personal electronic device," "computing device," and "portable computing device" refer to any one or all of cellular telephones, personal data assistants (PDA's), palm-top computers, notebook computers, personal computers, wireless electronic mail receivers, cellular telephone receivers (e.g., the Blackberry® and Treo® devices), multimedia Internet enabled cellular telephones (e.g., the Blackberry Storm®), and similar electronic devices which include a programmable processor, memory, a transceiver for communicating with a network (e.g., a wireless network), and a connected or integral touch surface or other pointing device (e.g., a computer mouse). In an example aspect used to illustrate various aspects of the present invention, the electronic device is a cellular telephone including an integral touchscreen display. However, this aspect is present merely as one example implementation of the various aspects, and as such is not intended to exclude other possible implementations of the subject matter recited in the claims.

As used herein a "touch event" refers to a detected user input on a touch surface which may include information regarding location or relative location of the touch. For example, on a touchscreen or touchpad user interface device, a touch event refers to the detection of a user touching the device and may include information regarding the location on the device being touched.

As used herein the term "path" refers to a sequence of touch event locations that trace a path within a graphical user interface (GUI) display during a touch event. Also, as used herein the term "path event" refers to a detected user input on a touch surface, which traces a path during a touch event. A path event may include information regarding the locations or relative locations (e.g., within a GUI display) of the touch events which constitute the traced path.

With the advances in electronic technologies, computing devices are increasingly used to store and share personal data. Pictures, movies, emails, URLs, applications, contacts, and text messages are examples of data that users store and share with other computing devices. A variety of available file sharing methods are currently available which allow users to share files via a variety of wired and wireless communication networks. For example, emails are delivered in Internet Protocol (IP) datagrams via wired and wireless (e.g., WiFi and cellular data networks) to email addresses; Short Messaging Service (SMS) and Multimedia Messaging Service (MMS) messages are delivered via cellular telephone networks to device phone numbers; downloaded files and webpages from websites accessed at an IP address are delivered via wired and wireless networks; data can be exchanged between two computing devices via short range Bluetooth wireless communication links; and data can be communicated over very short distances using Near Field Communication (NFC) technologies.

Despite the variety of communication links available to transfer information among computing devices, current user interface systems require users to enter information that has no perceptual connection with the physical world, such as email addresses, telephone numbers or IP addresses. Those more intuitive interfaces, such as allowing users to share files by tracing a finger gesture on the touchscreen of a computing device as provided on the Bump and Move file sharing applications for the Apple iPhone®, require that all communicating devices be within the same network and require a server and internet connection to help pair sender and receiver. In sum, known methods for sharing files among computing devices are either not intuitive, or are limited to particular networks.

The methods and systems of the various aspects allow users to be cognitively and physically involved with communicating data (i.e., sharing files) by linking the file transfer functionality to gestures that have intuitive meaning. In the natural world, delivery of objects occurs when cognitive intention and physical effort combine to allow carrying of an object from one person to another. In the various aspects, the processes of transmitting files are tied to user physical actions which mimic actions that would be implemented if the files of nearby computing devices were physical objects. Computing devices may gather information about the presence and relative location of other nearby computing devices. Such presence data may include the location parameters (e.g., GPS coordinates) and access data (e.g., telephone number or email address) of nearby computing devices. Similar to how one might send a piece of paper to another by flicking it to the other person with a rapid finger movement, the various aspects allow users to select a file, determine the physical location of the targeted computing devices, and transmit the file to other computing devices using an intuitive physical action such as a flick gesture. Similarly, the various aspects may allow a computing device to request transmission of files from another computing device by using a self-directed stroke gesture.

The file sharing functionality of the various aspects may be implemented on any type of touch surface. In a particularly useful application, the touch surface is a touchscreen that is touched by a finger; since touchscreens are generally superimposed on a display image, it enables users to interact with the display image with the touch of a finger. In such applications, the user interacts with an image by touching the touchscreen with a finger and tracing a gesture, thus the user's finger activating the touchscreen serves as the pointing device. Touchscreen touch events acquisition (i.e., detection of a finger touch on a touchscreen) and processing are well known, such as is disclosed in U.S. Pat. No. 6,323,846, the entire contents of all of which are hereby incorporated by reference.

FIG. 1 illustrates a process flow diagram of a method 100 for implementing file sharing functionality in response to intuitive user gestures according to the various aspects. In method 100, a computing device may be configured to enable device users to share files with another computing device by activating a file sharing functionality at block 102. This file sharing functionality may be an application or operating system function that includes a set of processes implemented in processor-executable instructions on the computing device, which provides a user interface for file sharing, detects and interprets user gestures, determines the file to be shared and the destination, negotiates the file transfer with the receiving device, and transmits the file via an appropriate and available communication network. This functionality includes the processes of the aspects described herein, as well as well known processes, such as the implementation of appropriate date communication protocols. For ease of reference, an application or operating system function that enables or encompasses such processes is referred to herein as the file sharing functionality. At block 102 the computing device may activate the file sharing functionality, either automatically or in response to a specific user input. For example, the file sharing functionality may be activated automatically when a file is accessed by a user, thereby enabling the user to share the accessed file if desired. As another example, a user may manually activate the file sharing functionality by pressing a button or by entering a particular touch gesture, as described in more details below with reference to FIGS. 3-6.

In method 100 at block 104, the computing device implementing the file sharing functionality may enable the user to identify a file to be shared with another computing device. For example, the user interface may present a menu, list, or thumbnail display of files from which the user can select a file by, for example, touching it on a touchscreen display. Any known method of selecting a file may be used.

In method 100 at block 106, activation of the file sharing functionality may prompt the computing device to discover nearby computing devices using a wireless communication link by using, for example, Bluetooth® or ZigBee® wireless communication technologies. Depending on the type of wireless communication technology used to establish a wireless communication link with nearby computing devices, the computing device may discover other computing devices located at relatively close distances. For example, a computing device configured with a Bluetooth® transceiver may be configured to discover the presence of like-equipped computing devices located within about 100 meters, depending on the Bluetooth power class employed. Bluetooth® is a standard communications protocol primarily designed for low power consumption, short range (power-class-dependent: 1 meter, 10 meters, 100 meters) communications between devices equipped with low-cost transceiver microchips. Bluetooth® makes it possible for these devices to communicate with each other when they are within range. As is well known, the Bluetooth® communication protocol, like other short range wireless communication protocols (e.g., the ZigBee® and NFC protocols), provides for automatic device discovery and link establishment signaling. This automatic link establishment capability includes a set of transmissions at a predefined frequency and with a predefined format that are recognized by receiving devices, prompting the receiving devices to reply with signals that enable the two devices to commence wireless link establishment handshaking communications to establish a wireless communication link between them. The various aspects leverage such automatic device discovery and wireless communication link establishment capabilities to enable a computing device to locate other nearby computing devices. Since the computing devices use radio frequency (RF) communications to discover each other, the two computing devices do not have to be in line of sight of to enable file transfers between them.

As part of discovering nearby computing devices, at block 108 the computing device may receive the locations of the nearby computing devices using different methods. In one aspect, the computing device may determine the location of nearby computing devices in block 108 by receiving precise latitude and longitude coordinates of the nearby computing devices from Global Positioning System (GPS) receivers within the computing devices. In another aspect, the computing device may determine the relative location of the nearby computing devices at block 108 by using signal strength and time-of-arrival information from received RF signals and triangulation calculations, as described more fully below with reference to FIG. 40.

Figure 8:
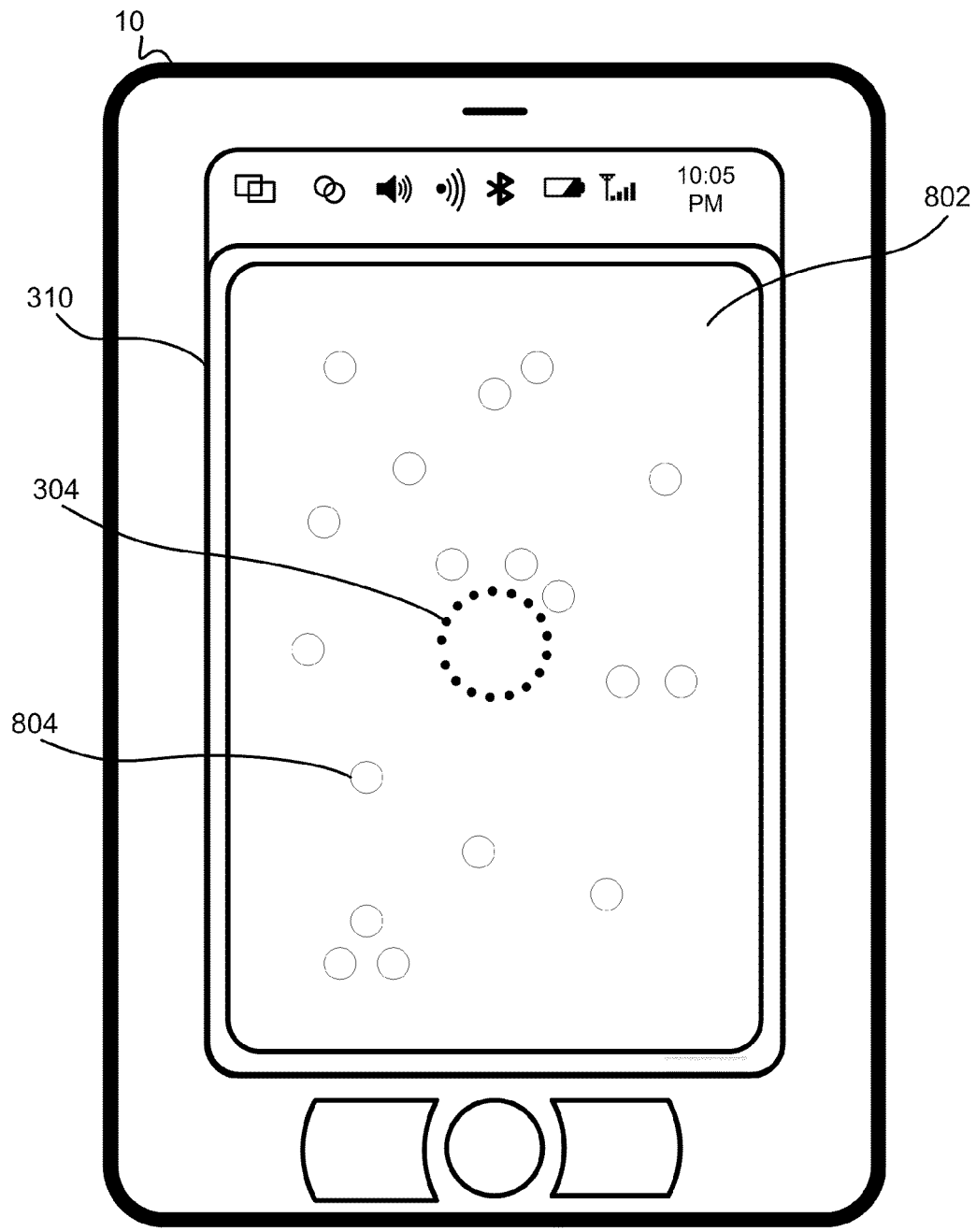
FIG. 8 is a frontal view of a portable computing device illustrating a display including a radar map according to an aspect.

Optionally, at block 110, the computing device may map the locations of nearby computing devices and display the map in a display GUI once the relative locations of nearby computing devices are determined. The mapped locations of nearby computing devices may be displayed relative to the position of the computing device, such as in a radar map type display showing locations of nearby computing devices with graphical indicators (e.g., dots). An example of such a radar map display is shown in FIG. 8, which is described more fully below. The display GUI may also include other graphics for guiding the user while utilizing the file sharing functionality. For example, a "launch pad" graphic may be presented to provide an area in which the user can trace different gestures for sharing files.

Once the file sharing functionality is activated and the locations of nearby computing devices are determined, at block 112 the computing device may determine whether a user wishes to share the selected file with another computing device by detecting a file transfer gesture. As described more fully herein, the computing device may be configured to detect and recognize a file transfer gesture based upon user touches on a touchscreen or touch surface of the computing device.

According to the various aspects, different file transfer gestures may be employed to initiate the transmission of files between computing devices. Such gestures may include finger gestures and hand gestures. Finger gestures may include gestures that are traced on the device's touchscreen display. Hand gestures may include opening all fingers on the touchscreen like petals of a flower to send files all nearby computing devices or closing fingers together to receive files from all nearby computing devices. Each of these file transfer gestures may be used to initiate transmission of data between computing devices as described in more details below with reference to FIGS. 3-30. For example, to share a file with another device, a user may use a flick gesture in the direction of another device to provide the computer device with the information it requires to identify the intended recipient of the file and initiate the transmission of the selected file to the intended computing device.

At block 114 the computing device may identify targeted particular nearby computing device to which the user intends to send the selected file based upon information regarding the file transfer gesture, such as its direction, distance, speed, etc., the orientation of computing device, such as its compass heading and tilt angle, and the relative location of nearby computing devices.

A computing device may be equipped with different sensors that can provide information that the device processor can use to calculate a trajectory or direction to identify the nearby computing devices that are to receive the selected file. For example, the computing device may include a compass to determine the orientation of the computing device with respect to the direction of a gesture. As another example, the computing device may include a set of accelerometers that can provide gravity vector data, which the processor can use to determine the tilt angle of the computing device.

Optionally, at block 116 the computing device may be configured to prompt a user to confirm or authorize sharing the selected file with the targeted computing device. Also at block 116 the computing device may receive a message from the targeted recipient computing device, indicating whether the device will accept the file. Providing a verification and/or authorization process enables a user to confirm that the intended recipient's computing device has been selected, and enables intended recipients to decide whether to accept a file. Such measures may prevent transmission of files to the wrong computing device, and give recipient users control over the files that are transmitted to their computing devices. Instead of transmitting an authorization message, a targeted computing device may simply provide the requesting computing device with communication access data, such as Bluetooth identification, email address, or telephone number which can be used to complete the file transfer.

On the receiver side, authorization to receive a file may be enabled in a variety of ways. For example, a user may configure their computing device to always accept file transmissions from nearby computing devices. In another example, when a computing device receives a request to receive a file, the device processor may generate a prompt that alerts the device's user of the pending file transfer request and, optionally, the identity of the user sending the file and file name or type. An intended recipient user may then press a key or virtual key on the GUI to either accept or decline transfer of the file. In a further example, a user may set an authorization state that automatically accepts file sharing with certain known computing devices, such as those in a contact database, and requires user input to authorize file transfers from unknown computing devices. Such file transfer acceptance criteria may be defined in custom settings based on their preferences.

As part of discovering nearby computing devices at block 106 or receiving authorization to transmit files at block 116, the recipient computing device may provide access data that the transmitting computing device uses to accomplish a file transmission. Such access data may include an address of the recipient computer device, such as a telephone number (for SMS or MMS messages), email address, or IP address that the transmitting computing device can use to address the file for transmission. The access data may also identify a preferred communication method and communication network to be used for transmitting the file. For example, the receiving device may identify that the file may be transmitted via a direct communication link, such as an NFC, Bluetooth or WiFi direct communication link. Alternatively, the receiving device may identify that the file may be transmitted via an indirect communication network, such as a cellular data communication link or WiFi communication link to a server (e.g., an e-mail server). Additionally as part of the discovery and/or authorization processes (blocks 106 and/or 116) the transmitting and intended recipient computing devices may negotiate a mutually acceptable communication network to use for the file transfer.

Once the intended recipient computing device is identified, and transfer of the file is verified and/or authorized, at block 118 the computing device may transmit the selected file to the targeted device using identified access data and communication network.

Figure 2A:
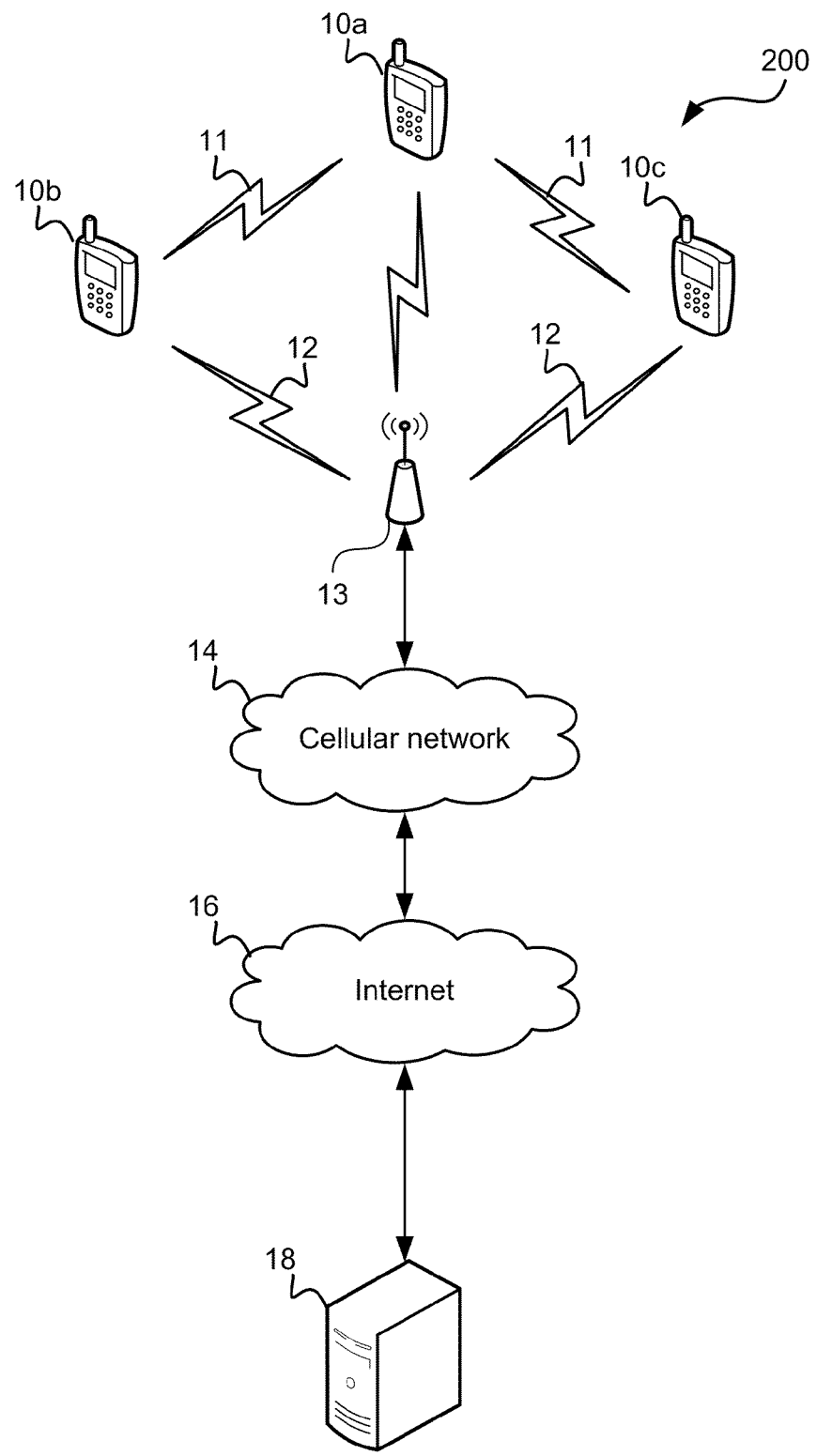
FIG. 2A is a communication network component diagram suitable for use with the various aspects.

As shown in the communication network diagram of FIG. 2A, a communication network 200 may include computing devices 10a-10c that are configured communicate with one another using a short range wireless communication link 11, such as a Bluetooth® wireless communication link. The computing devices 10a-10c can also communicate with a cellular communication network 14 via wireless communication links 12 between the devices and a cellular base station 13. Such a cellular communication network 14 may be a cellular telephone network, or a WiFi hotspot network coupled to the Internet 16. Depending on the type of files, the short range wireless communication link 11 available, and the access data provided, the computing devices 10a-10c may share files directly from one device to the other, through device-to-device wireless links (e.g., Bluetooth® or NFC communication link), and/or indirectly, such as via a cellular system (SMS or MMS) or via a wireless link to the Internet (e.g., via a webpage or an email server 18). For example, the computing devices 10a-10c which can establish Bluetooth® links with one another may exchange access data and files directly using a Bluetooth® communication link. As another example, computing devices 10a-10c may exchange access data via Bluetooth® links, and when access data specifies a telephone number for transmitting a file, the computing devices 10a-10c may transmit a selected file as an SMS or MMS message transmitted via a cellular telephone access point 12 to a cellular network 14. The cellular network relays the SMS/MMS message to the recipient device via the cellular access point 12. When access data exchanged between computing devices 10a-10c includes an email address, a transmitting computing device 10a may transmit a selected file via email by transmitting the email to an email server 18 via the cellular access point 12 to the cellular network 14, which relays the email message via the Internet 16. The email server 18 may receive the email, identify the intended recipient, and deliver it to the intended computing device 10b or 10c via the Internet 16 to the cellular network 14 which transmits it via the cellular access point 12.

While the foregoing examples described transmitting files via a cellular telephone network, messages may similarly be transmitted via another type of wireless communication network, such as a WiFi, WiMax or MiFi network. Further, the computing devices 10a-10c may be configured to select among a number of alternative wireless networks (e.g., cellular, WiFi and MiFi) based upon a variety of factors, including signal strength, reliability, cost, and access rights. Further, files transmitted by one computing device 10a via one wireless network may be received the recipient computing device 10b via a different wireless network. For example, a transmitting computing device 10a may transmit a selected file to a recipient device e-mail address via cellular telephone data communication link, but the recipient computing device may receive the e-mail from its e-mail server via a local WiFi wireless hotspot coupled to the Internet. The methods by which messages are routed through external networks and the Internet are well known, and thus not described further herein.

The various aspects are also not limited to radio frequency wireless communications, as the communication among mobile devices may be accomplished via visible or infrared light or ultrasound. For example, the messages employed in the various aspects may be transmitted via infrared data links using well known technologies, such as the infrared transceivers included in some mobile device models. As another example, the messages employed in the various aspects may be transmitted via visible light, such as a small projector on one mobile device (e.g. a "pico projector") that may be aimed at a camera on a second mobile device to exchange images. As a further example, future mobile devices that may be equipped with ultrasound emitters and receivers may be configured to use ultrasound to communicate data across short distances in a manner similar to radio frequency communications.

Representative communications that occur between different components of the communication network described above with reference to FIG. 2A are illustrated in FIG. 2B. A computing device 10a that has its file transfer functionality activated may discover nearby computing device 10a by sending a device discovery signal, message 20. The other computing device 10b, upon receiving the device discovery signal, may transmit a response message 22. The device discovery and response signals may include device identifying information about the computing devices 10a, 10b to enable the devices to negotiate a communication link, messages 23. The device discovery, response, and handshaking message formats will be defined by the particular communication protocol used for the device-to-device communications (e.g., Bluetooth®). As part of the response or handshaking messages 22 or 23, the replying computing device 10b may provide information about the device, such as its access data, its location (e.g., in the form of GPS coordinates) and, optionally, information about its owner such as a name or picture of the owner. Based on a detected gesture, the sending computing device 10a may determine that the user desires to share a particular file with a targeted computing device 10b. To accomplish a file transmission, the sending computing device 10a may send a query, message 24, to the targeted computing device 10b requesting permission to transmit the file and access data for use in sending the file. Based on the preferences of its owner and in response to the query message 24 received from the transmitting computing device 10a, the targeted computing device 10b may respond by transmitting the requested access data, message 26.

If the access data sent to the transmitting computing device 10a specifies that the file should be transmitted via the established device-to-device communication link (e.g., a Bluetooth® link), the transmitting computing device 10a may directly transmit the file to the targeted computing device 10b in message 28.

If the access data sent to the transmitting computing device 10a specifies a telephone number, the transmitting computing device 10a may compose an SMS or MMS message including the file, and transmit the message via the cellular network 14 wireless access point 12, message 30. The cellular network 14 relays the SMS/MMS message to the targeted computing device 10b using the telephone number, message 32.

If the access data provided to the transmitting computing device 10a is an e-mail address, the transmitting computing device 10a may compose and send an e-mail message via the cellular network 14 wireless access point 12 (or other type of wireless network), message 34. The cellular network 14 may relay the e-mail message to an addressed e-mail server 18 via the Internet 16, message 36. The e-mail server 18 may store the e-mail message and, when accessed, relay the e-mail message to the cellular network 14, which provides service to the targeted computing device 10b via the Internet 16, message 38. The cellular network 14 relays the e-mail message to the targeted computing device 10b via a wireless access point 12, message 40. If the access data includes an IP address, the computing device 10a may access the server with that IP address via the cellular network 14, and the Internet 16 to upload the file in a manner very similar to how an e-mail message is sent to an e-mail server. The targeted computing device 10b may access the server at the same IP address via the cellular network 14 and the Internet 16, and download the file in a manner very similar to how an e-mail message is received from the e-mail server.

Figure 3:
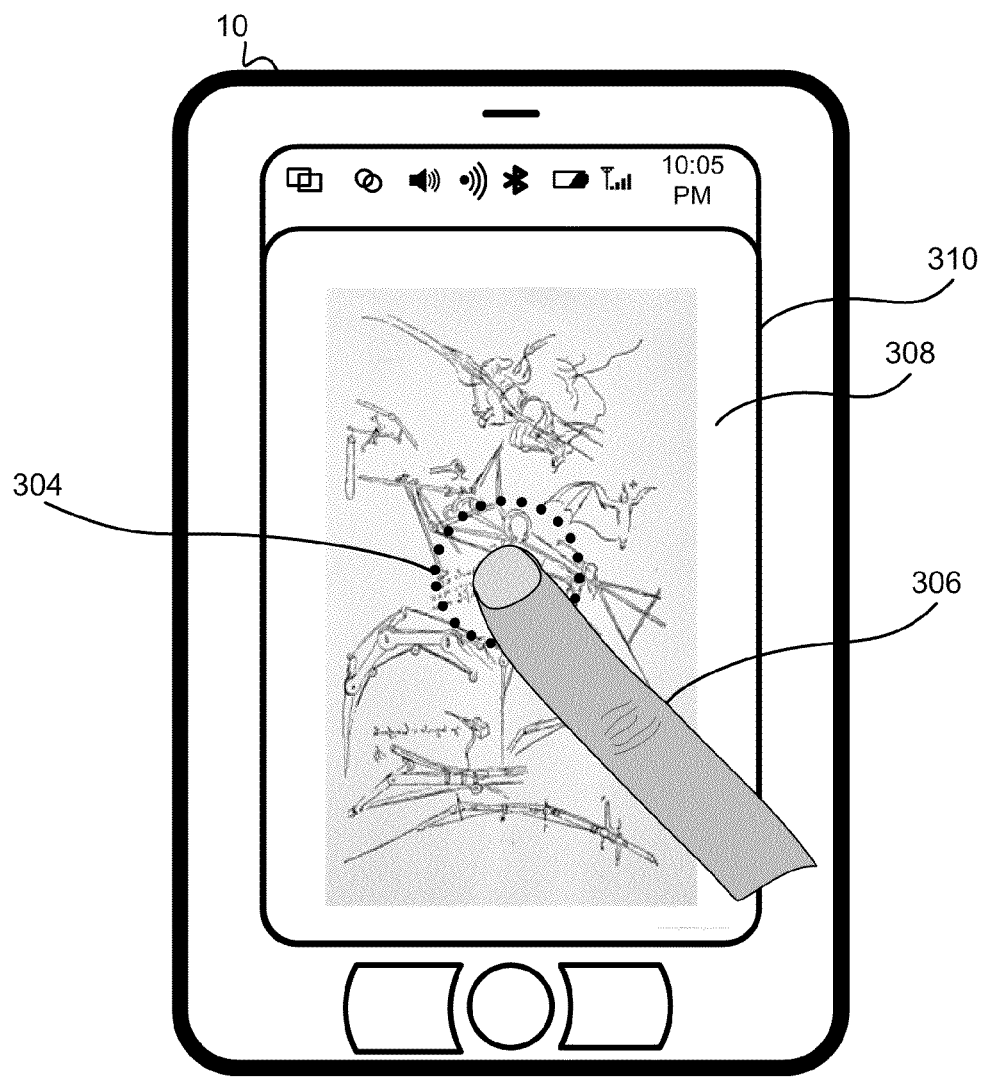
FIG. 3 is a frontal view of a portable computing device illustrating activation of file sharing functionality by touch according to an aspect.

FIGS. 3-6 illustrate different methods that may be implemented on a computing device 10 to enable a user to activate the file sharing functionality. As illustrated in FIG. 3, a computing device 10 may be configured to enable a user to activate the file sharing functionality by touching the touchscreen 308. A user may open a file, such as drawings by Leonardo da Vinci, and touch the touchscreen 308 using a finger 306 to activate the file sharing functionality. The user may be required to touch the touchscreen 308 for a set period of time and/or at a specific location to activate the file sharing functionality. For example, the user may be required to touch the touchscreen 308 and hold the touch for at least 5 seconds before the file sharing function is activated. As a further example, the file sharing functionality may be activated by voice command, such as "share this file," similar to how other mobile device functions can be activated by speaking a particular command. Alternatively, the user may be required to touch a specific location on the touchscreen 308, such as the center of the screen, to activate the file sharing function. In a further aspect, a certain amount of pressure applied to the touchscreen display may activate the file sharing functionality. As illustrated, activation of the file sharing functionality may be identified by the display of a GUI graphical indicator or icon, such as a launch pad 304.

Figure 4A:
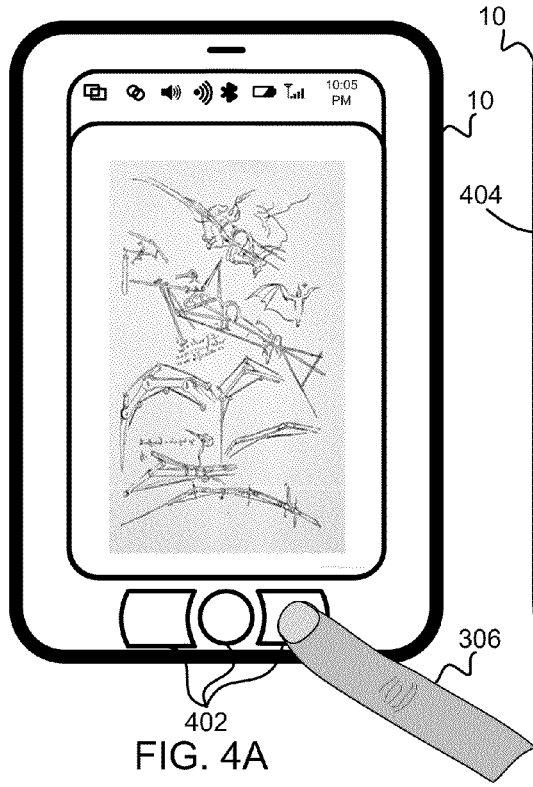
FIGS. 4A-4D are frontal views of a portable computing device illustrating activation of file sharing functionality by employing function keys according to an aspect.
Figure 4B:
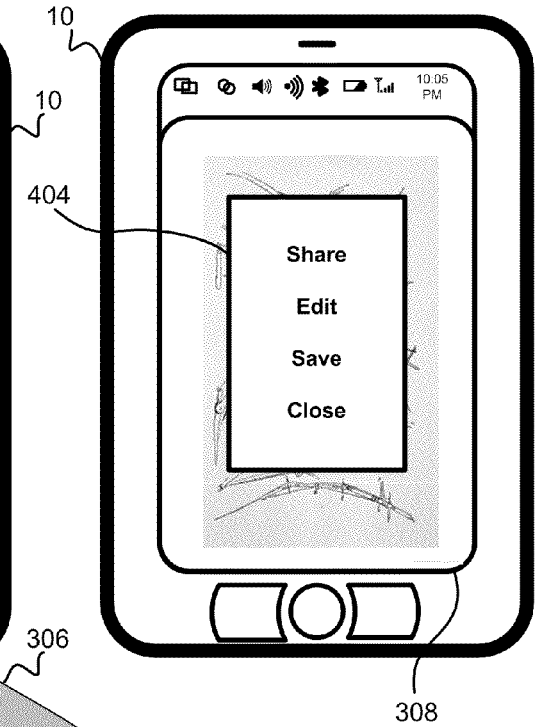
Figure 4C:
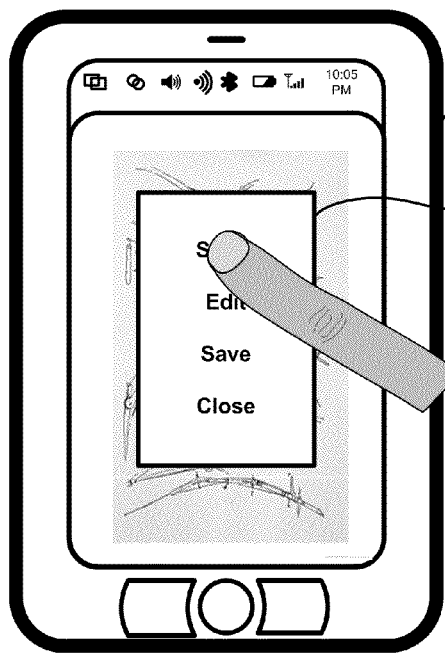
Figure 4D:
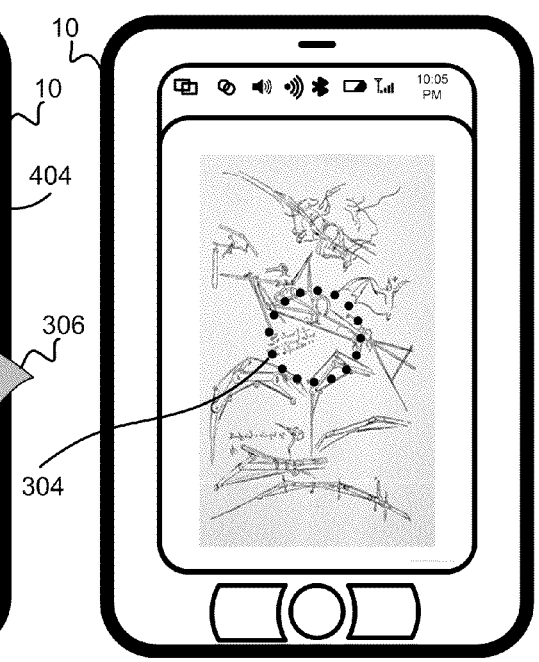

FIGS. 4A-4D illustrate activation of the file sharing functionality using a function key 402 on the computing device 10. As illustrated in FIG. 4A, a user may use a finger 306 to press a function key 402 associated with activating the file sharing functionality. The function key 402 may be specifically designated for activating the file sharing functionality, or may be designed for multiple functions. If other functions are associated with the function key 402, a GUI menu 404 may be presented to allow the user to select a particular desired function, as illustrated in FIG. 4B. As illustrated in FIG. 4C, the user may choose the file sharing functionality by touching the word "Share" as it appears on the menu 404 using a finger 306. As illustrated in FIG. 4D, activation of the file sharing functionality may be identified by the display of a launch pad 304.

Figure 5A:
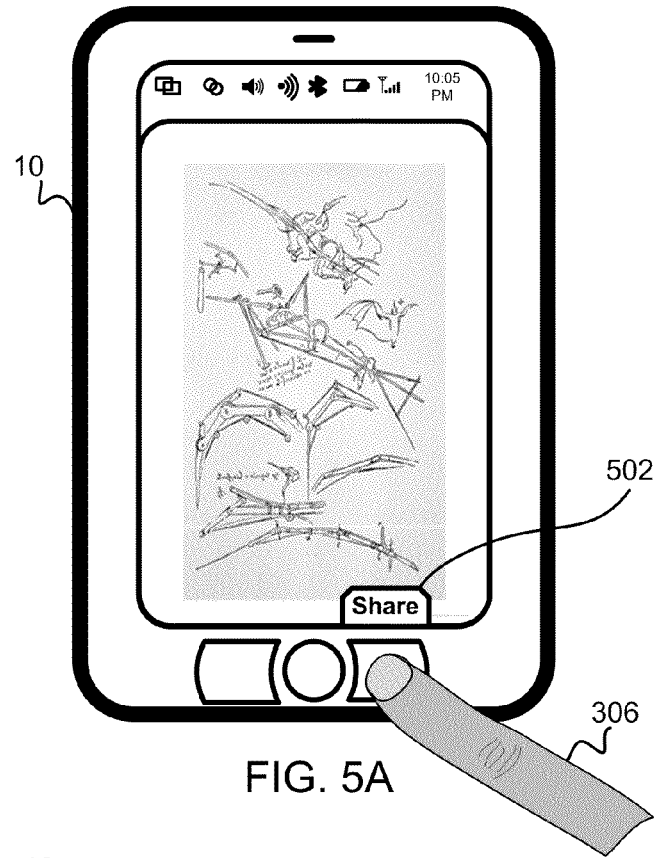
FIGS. 5A-5B are frontal views of a portable computing device illustrating activation of file sharing functionality by employing soft keys according to an aspect.
Figure 5B:
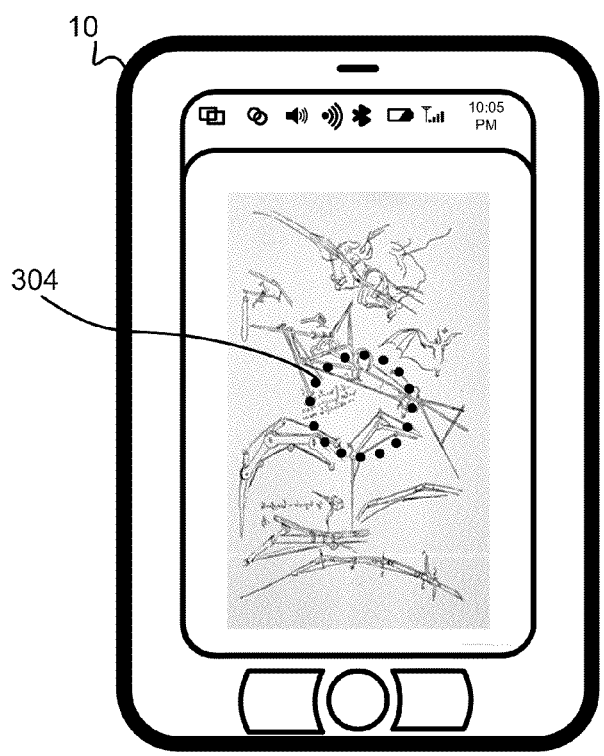

FIGS. 5A-5B illustrate activation of the file sharing functionality using soft keys 502 on the computing device 10. As shown in FIG. 5A, a user may touch a soft key 502 with a finger 306 to activate the file sharing functionality. As shown in FIG. 5B, the computing device 10 may inform the user about the activation of the file sharing functionality by displaying a launch pad 304.

Figure 6A:
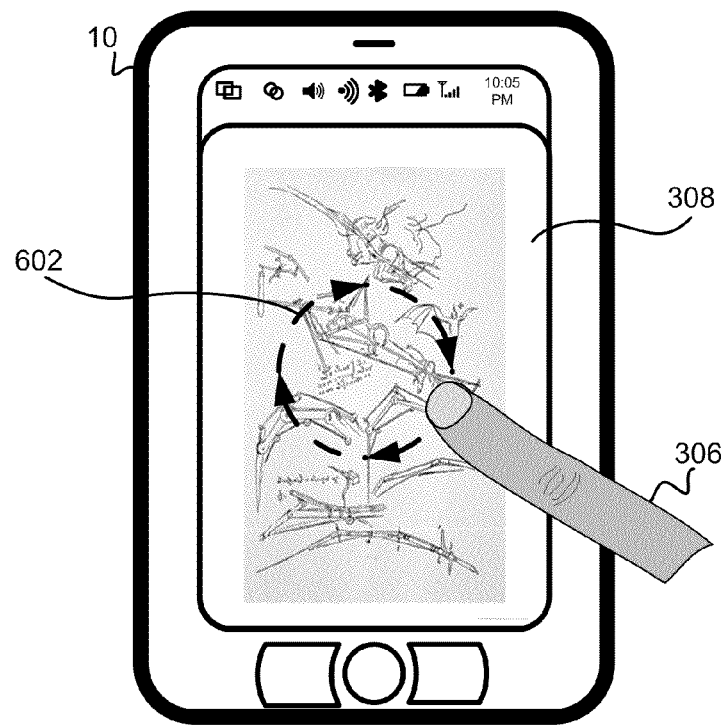
FIGS. 6A-6B are frontal views of a portable computing device illustrating activation of file sharing functionality using gestures according to an aspect.
Figure 6B:
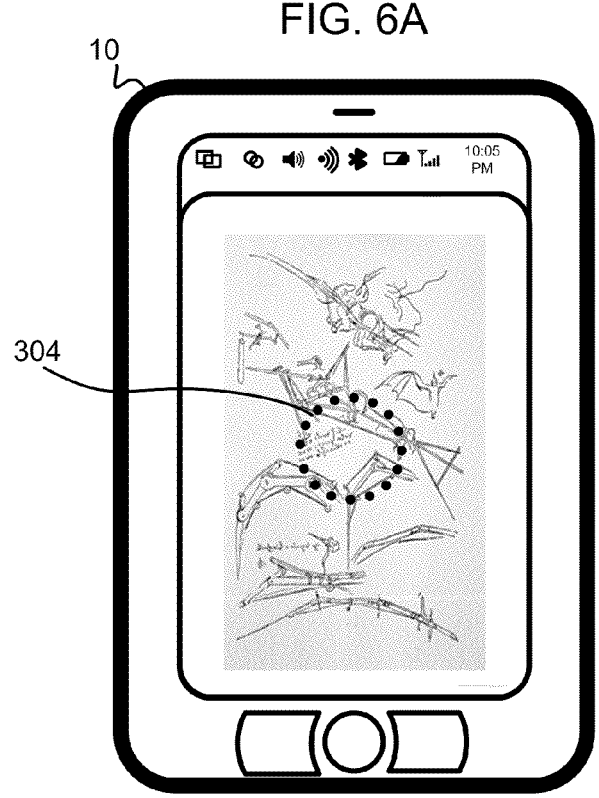

FIGS. 6A-6B illustrate activation of the file sharing functionality using a gesture traced on the touchscreen 308 of the computing device 10. As shown in FIG. 6A, a user may use a finger 306 to trace a closed elliptical shape 602, such as a circle, on the touchscreen 308. Tracing a circle is merely an example of a gesture that may be used to activate the file sharing functionality, and other gestures may be used. The computing device 10 may be configured to detect and identify the gesture as one for activating the file sharing functionality. As shown in FIG. 6B, the computing device 10 may inform the user about the activation of the file sharing functionality by displaying a launch pad 304.

The foregoing examples are not intended to limit the scope of the various aspects, and other activation mechanisms may be used.

Figure 7:
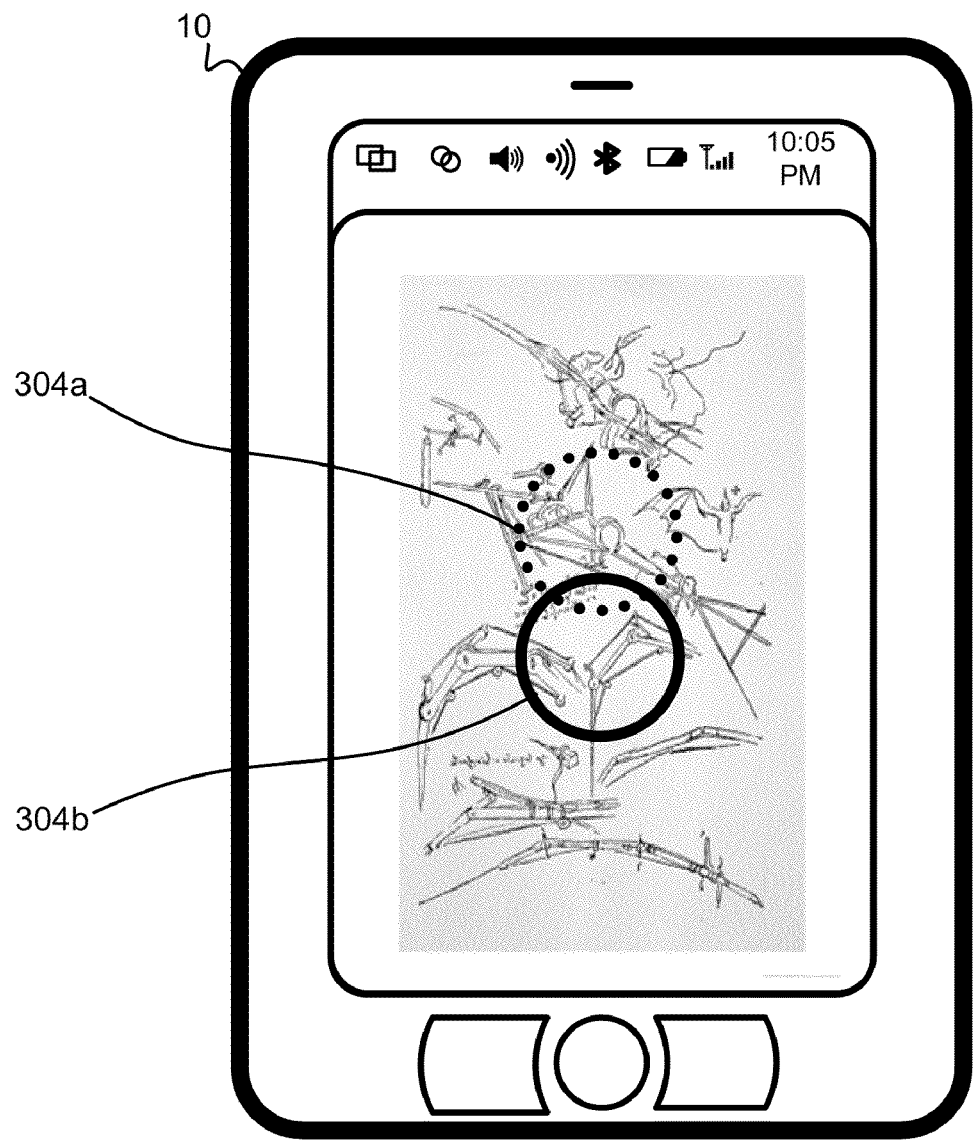
FIG. 7 is a frontal view of a portable computing device illustrating a display including multiple launch pads according to an aspect.

In an aspect illustrated in FIG. 7, once the file sharing functionality is activated, more than one launch pad 304 may be displayed to indicate the activation of the file sharing functionality, and to allow the user to share files with other computing devices 10 in different ways. For example, a first launch pad 304a, shown in this figure with dashed borders, may be displayed to enable the user to transmit files to other computing devices 10. A second launch pad 304b, shown here with solid borders, may also be displayed to enable uses to request and receive files from other computing devices 10, as described herein.

In an aspect illustrated in FIG. 8, a computing device 10 may inform a user that the file sharing functionality is active by displaying a radar map 802. Such a radar map display 802 may use graphical indicators 804, such as dots or circles, to show the location of other nearby computing devices which have wireless communication links established with the user's computing device 10. As described above, the wireless communication links to nearby computing devices and the device location information used to create the radar display 802 may be established and exchanged during the device discovery process commenced by activation of the file sharing functionality. The orientation of the nearby computing devices may be shown relative to the location of the user's computing device 10. The location of the user's computing device may be indicated on the radar map 802 by the launch pad 304. As the user moves, the orientation of the dots with respect to the launch pad 304 may change, indicating the changing relative location of the other computing devices with respect to the user's location. The radar map 802 display may be enabled or disabled based on the user's preferences.

Once the file sharing functionality is activated and a wireless link is established between nearby computing devices, different methods may be employed for sharing files among the linked computing devices. One method in which files may be shared is by transmitting files to another computing device 10. A second method in which files may be shared is by transmitting a request from the computing device 10 requesting another computing device to send it files. FIGS. 9-18 illustrate different aspect gestures that may be used to initiate the transmission of files to other computing devices. FIGS. 21-28 illustrate different aspect gestures that may be used to cause a computing device 10 to request files from other computing devices.

Figure 9:
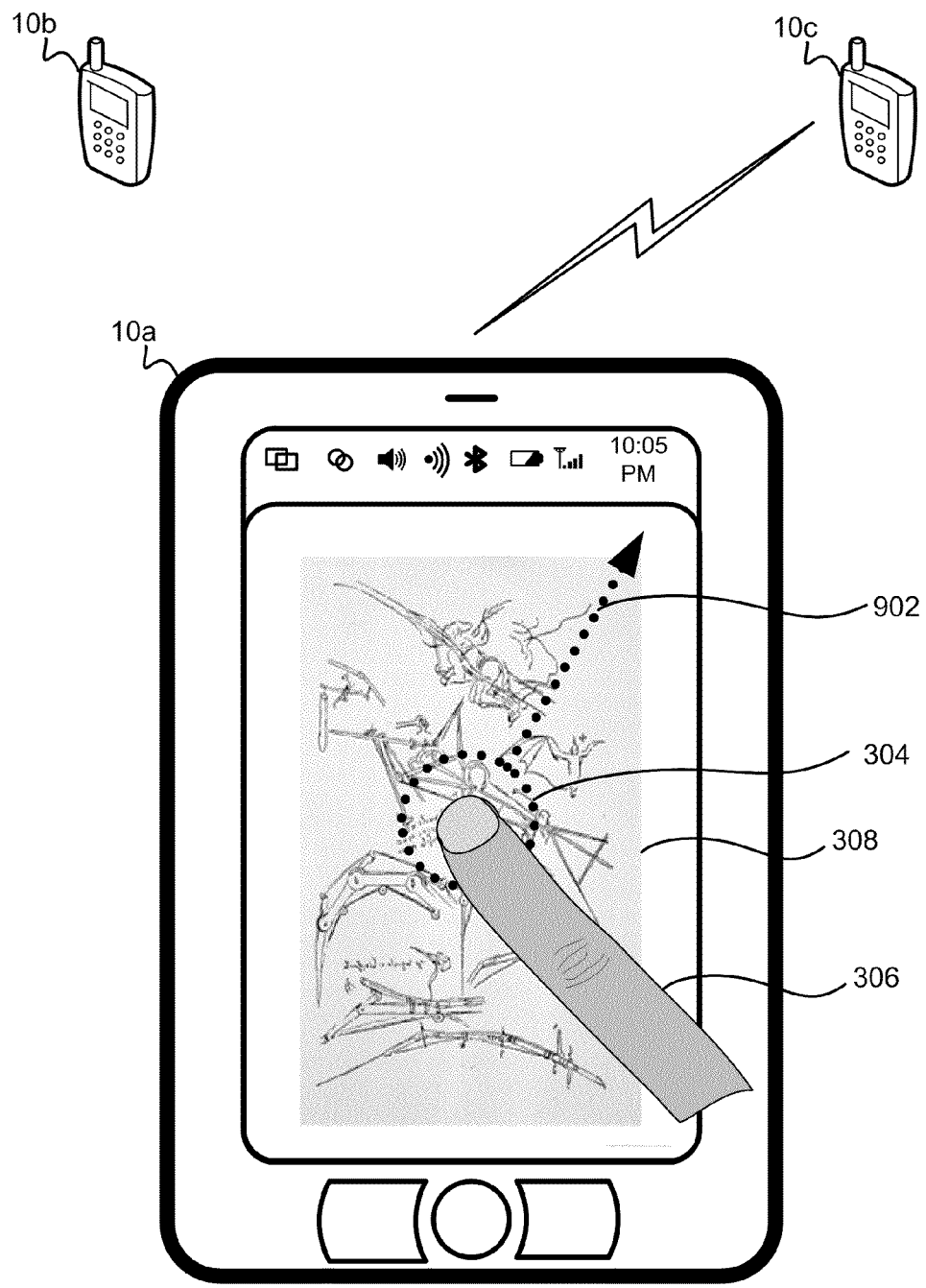
FIG. 9 is a frontal view of a portable computing device illustrating transmitting files using flick gestures according to an aspect.

As illustrated in FIG. 9, a user's computing device 10a may be near other computing devices 10b-10d. In a typical social situation, other computing devices 10b-10c may be located around a user's computing device 10a. As part of establishing wireless links to the other computing devices, the computing device 10a may be configured to determine the location of each of the other computing devices 10b-10d. For example, computing device 10a may determine the presence of computing devices 10b and 10c in front of it, and that of a computing device 10d behind it. The computing device 10a may be further configured to detect a user's touch on the touchscreen 308 and to recognize that a touch tracing a gesture towards a receiving computing device 10c indicates the user's desire to share the selected file or files with that particular computing device 10c. This touch gesture may be in the form of a quick flick of the finger on the touch screen, and accordingly is referred to herein as a flicking gesture." FIG. 9 shows the direction of the flick gesture by a dashed line with an arrow 902 directed towards the computing device 10c. Such a dashed line 902 may or may not be displayed on the display 310, which may be a configurable setting based on user preferences. The computing device 10a may be configured to identify the targeted computing device 10c based on the flick gesture and initiate transmission of the selected file to that other computing device 10c. As discussed above, the transmission of the file may be involve transmitting a file transfer request to the destination computing device 10c, receiving access data, and transmitting the file via an available communication network in accordance with the information in the received access data. The processes and communications described above with reference to FIGS. 1-2B may be accomplished automatically in the background, so it appears to the user that the flick gesture causes the selected file to quickly appear on the destination computing device 10c. In this manner, the sharing of the file is accomplished in a simple intuitive motion.

Should also be appreciated that the flick gesture may be applied to any surface that can detect the gesture. For example, mobile devices that have a touch sensitive surface on a case, such as the backside of a single sided device or the top side of a clamshell device may accept the gestures on any surface capable of receiving a file. For example, a clamshell mobile device with a touch sensitive exterior may enable users to transfer files by performing the flick gesture on the top surface of the device without viewing or touching a display. As another example, a mobile device with a touch sensitive back surface may accept a flick gesture applied to the back case while the user views the radar screen user interface on the display.

Figure 10:
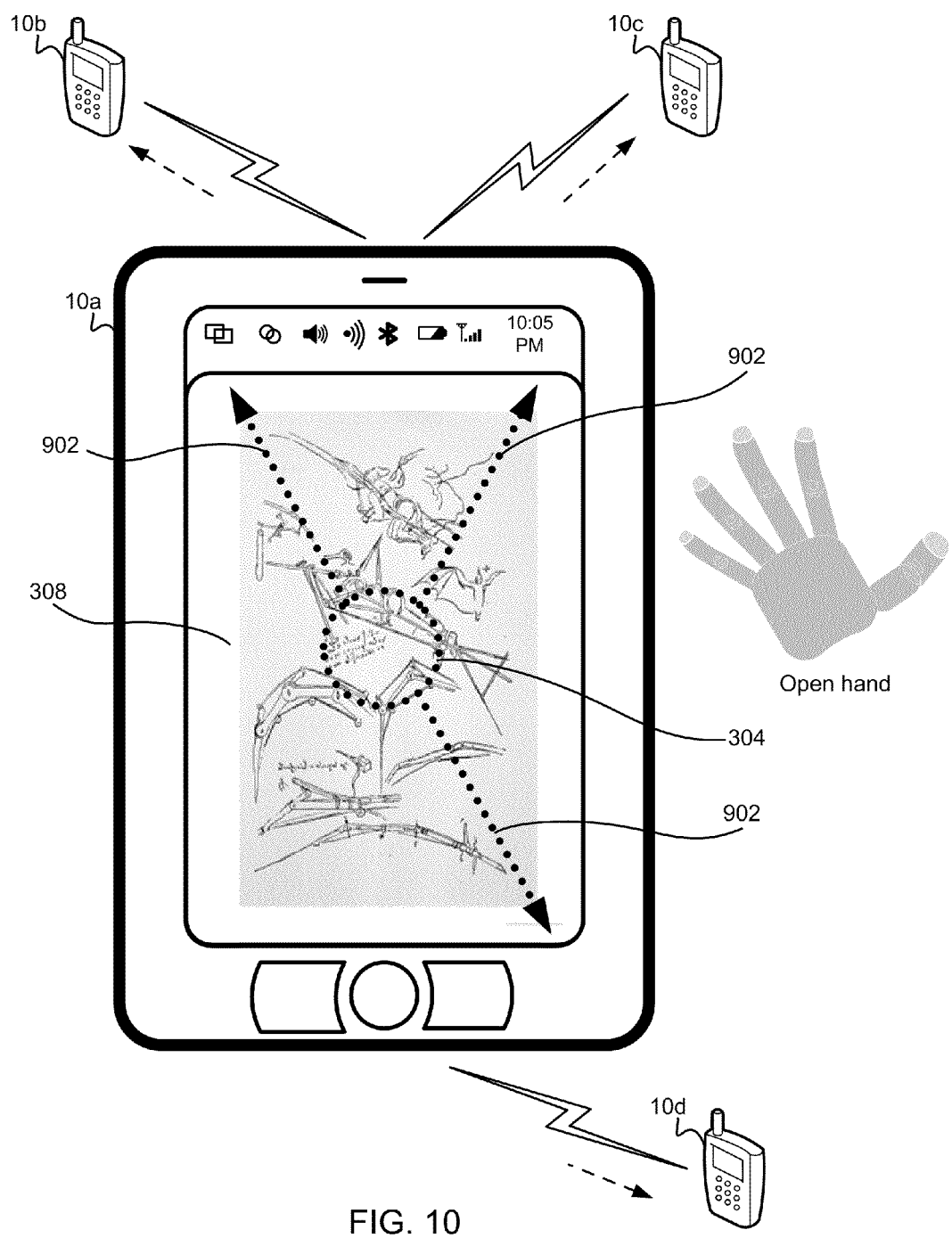
FIG. 10 is a frontal view of a portable computing device illustrating transmitting files using a hand flick gesture according to an aspect.

In an aspect shown in FIG. 10, the transmitting computing device 10a may be configured to simultaneously transmit one or more files to all or a subset of the nearby computing devices 10b, 10c, 10d which are wirelessly linked to the transmitting computing device 10a. The transmitting computing device 10a may be configured to recognize an opening hand gesture to mean that the selected files may be shared with all or a subset of the discovered nearby computing devices 10b-10d. To perform an opening hand gesture, a user may place all fingertips of one hand in the launch pad 304 on the touchscreen 308 and, while continuing to touch the surface, extend the fingers towards the boarders of the touchscreen display as though to open the hand. The path of the hand gesture is shown in FIG. 10 by three dashed lines with arrows 902, indicating the transmission of selected files to the three receiving computing devices 10b-10d. Such dashed lines may or may not be presented on the touchscreen display 308.

Figure 11:
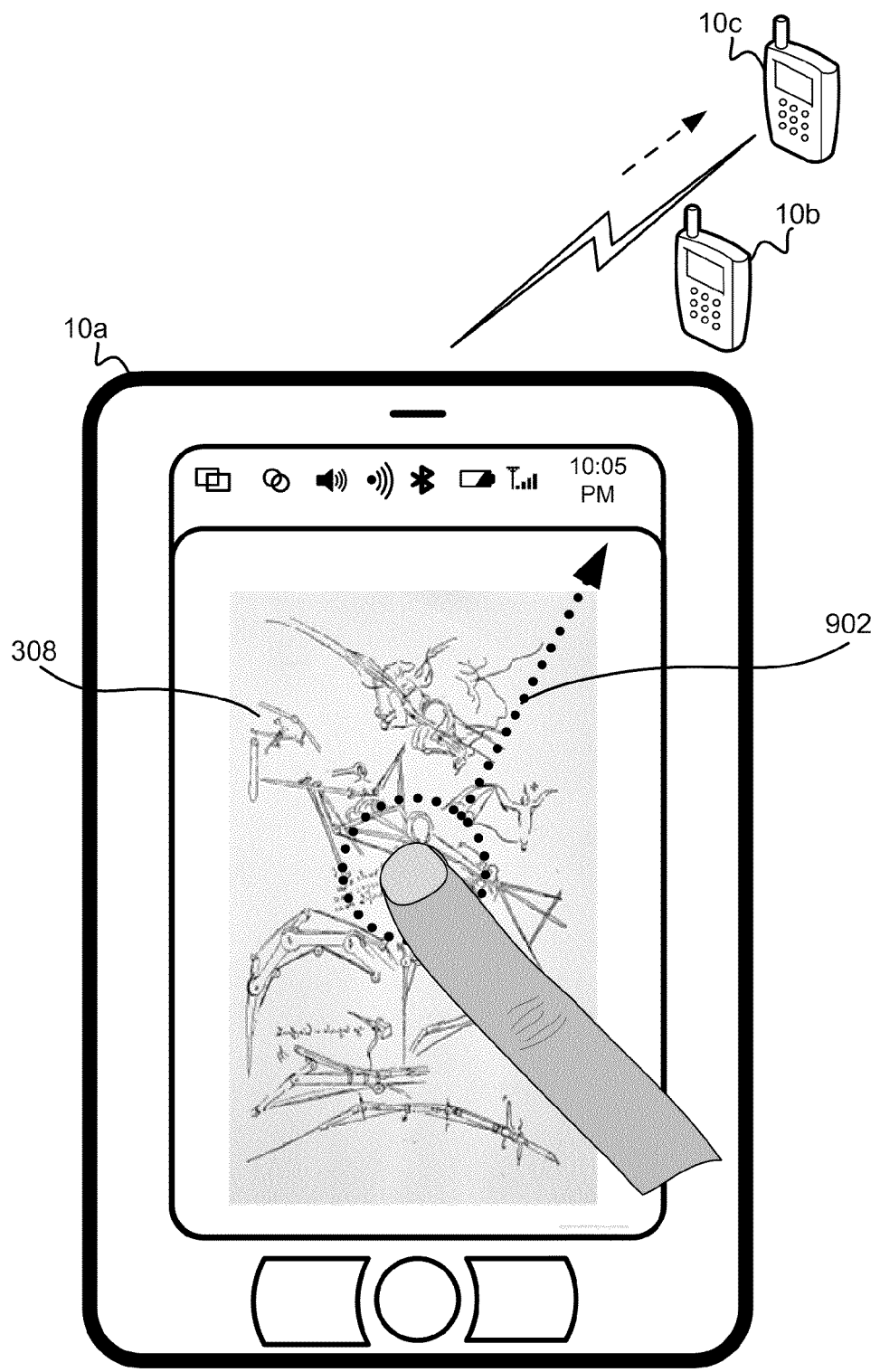
FIG. 11 is a frontal view of a portable computing device illustrating transmitting files based on direction and speed of flick gestures according to an aspect.

In an aspect shown in FIG. 11, the transmitting computing device 10a may be configured to transmit messages to a receiving computing device 10c based on the orientation and distance of the receiving computing device 10c as compared to the transmitting computing device 10a. The transmitting computing device 10a may be configured to determine the direction of a gesture and calculate the distance that a file would travel if it were a real object based on the speed of the flick gesture across the touchscreen 308. Based on the direction and calculated travel distance based on the speed of the flick gesture, the processor of the transmitting computing device 10a may identify a particular computing device 10c to which the user wants to send a file. This aspect may be useful in situations where two nearby computing devices are situated along the same line direction. Without this aspect, the transmitting computing device 10a might transmit the file to the first computing device 10b along the line of the flick gesture, when the user actually intended the file to go to the second computing device 10c. The aspect illustrated in FIG. 10 enables users to select among multiple potential target computing devices along a line of direction by varying the speed of the flick gesture, just as if the user were flicking an real object with a finger. The user's traced gesture is shown in FIG. 9 as a dotted line with an arrow 902 which is shown here only to illustrate the direction of the traced gesture.

In this aspect, the computing device 10 may be configured to be trainable so that each user can correlate flick gesture speeds with intended travel distances. Over time as the user shares files by executing flick gestures on the touchscreen, the computing device 10 may learn the user's habits and the different path trace speeds to calibrate the device to more accurately identify file sharing devices targeted by a user's flick gestures.

Figure 12:
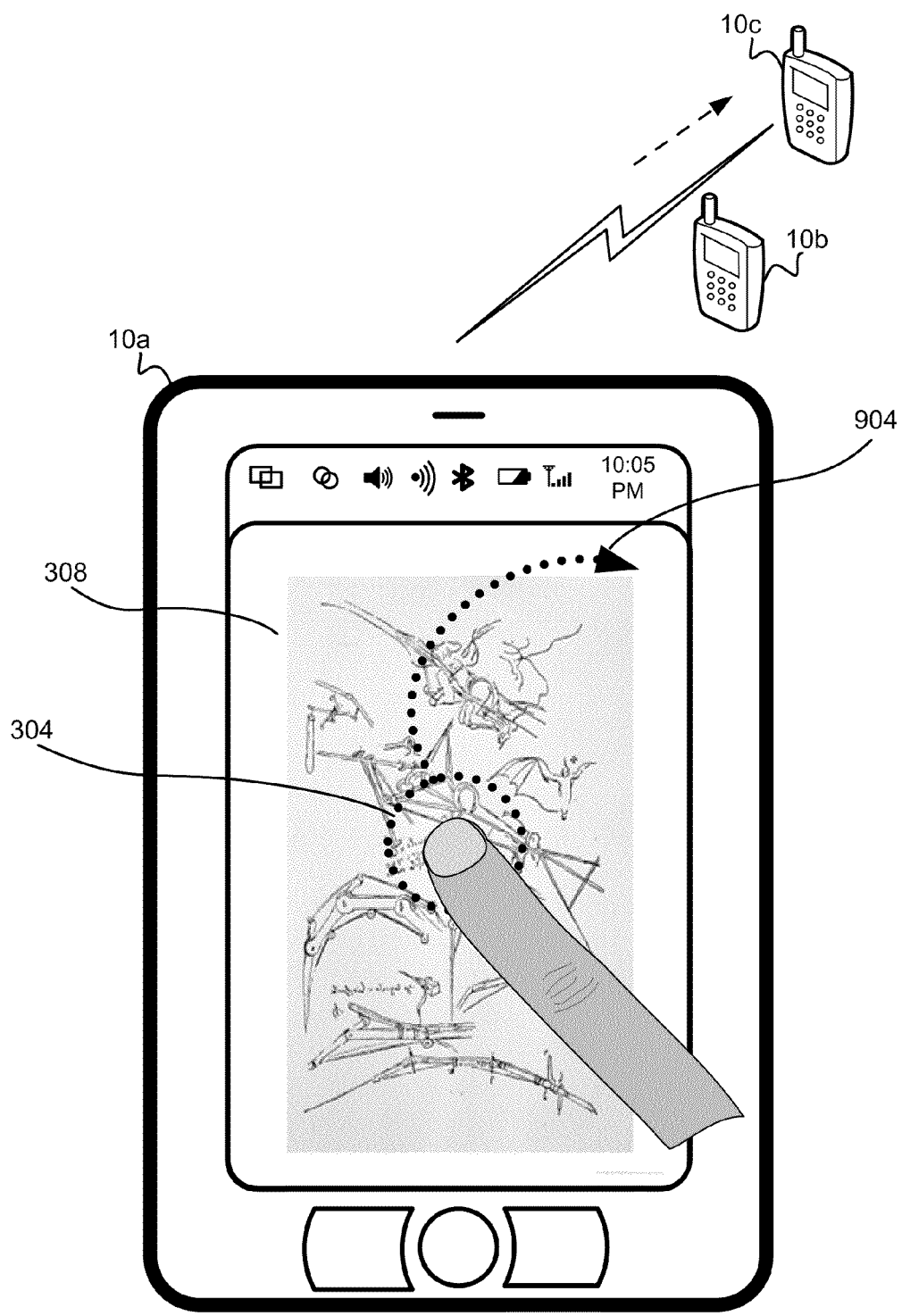
FIG. 12 is a frontal view of a portable computing device illustrating a curved shape gesture for transmitting files according to an aspect.

FIG. 12 illustrates a further aspect gesture which enables users to direct a file transmission to a second computing device 10c along a line of direction by tracing a curved flick gesture. In situations where multiple computing devices 10b-10c are located along the same general direction relative to the transmitting computing device 10a, the transmitting computing device 10a may be configured to allow a user to trace a curve gesture on the touchscreen 308 to indicate that a file should be transmitted to a targeted computing device 10c by bypassing or going around another computing device 10b that is in the way. The path of the curved flick gesture is illustrated in FIG. 12 as a dotted curve line with an arrow 904 which may begin at the launch pad 304 and end at the right hand corner of the touchscreen display 308 of the computing device 10a, which is the direction of the intended nearby computing device 10c.

Figure 13:
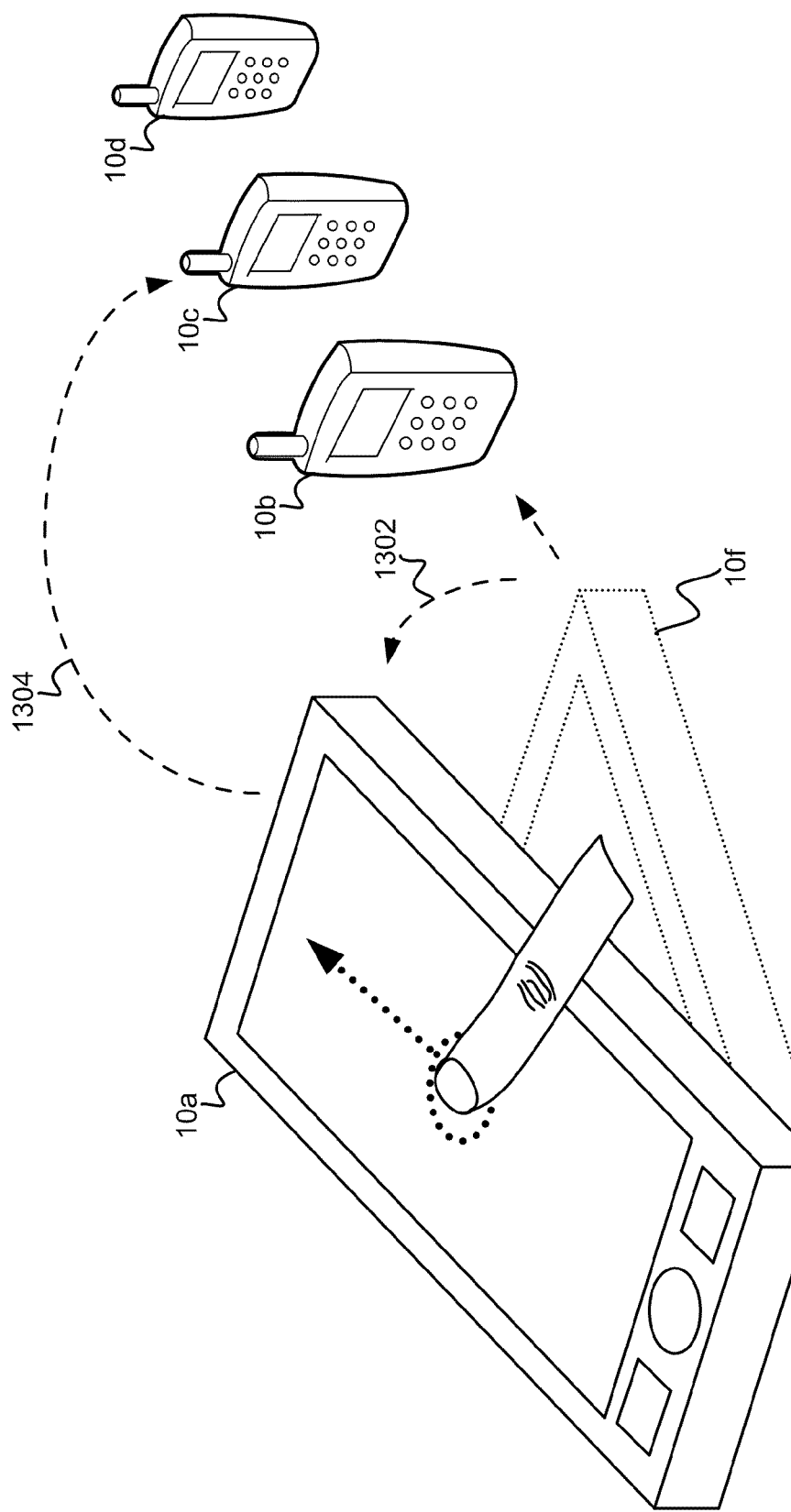
FIG. 13 is a frontal view of a portable computing device illustrating transmitting files to a targeted device based on the flick gesture parameters and the tilt angle according to an aspect.

FIG. 13 illustrates a further aspect gesture which enables a computing device user to share a file with an intended recipient computing device 10c positioned behind another computing device 10b by tilting the transmitting computing device 10a upward while performing the flick gesture. This aspect provides an intuitive mechanism for indicating that a more distant computing device should receive the filed by emulating how the user might flick a real object a further distance. This aspect may be useful in situations where multiple computing devices 10b-10d are located along the same general direction in relation to the transmitting computing device 10a. To enable this aspect, the transmitting computing device 10a may be configured with accelerometers that can detect a tilt of the device with respect to the gravity gradient. By determining the tilt of the computing device, and the direction and speed of the flick gesture, the computing device processor can determine the targeted computing device 10c based on a calculated travel distance of a real object and bypass intervening computing devices. FIG. 13 illustrates the tilt angle 1302 by showing the computing device 10a in relation to its horizontal orientation 10f shown in dotted lines. The computing device 10a may be configured to determine the tilt angle, and based on the speed and direction of the gesture traced by the user, calculate the travel distance of a real object following a ballistic trajectory 1304 to identify the targeted computing device 10c. This aspect provides an intuitive mechanism for indicating that a file should skip over one or more computing device 10b to be delivered to a more distant computing device 10c.

Figure 14:
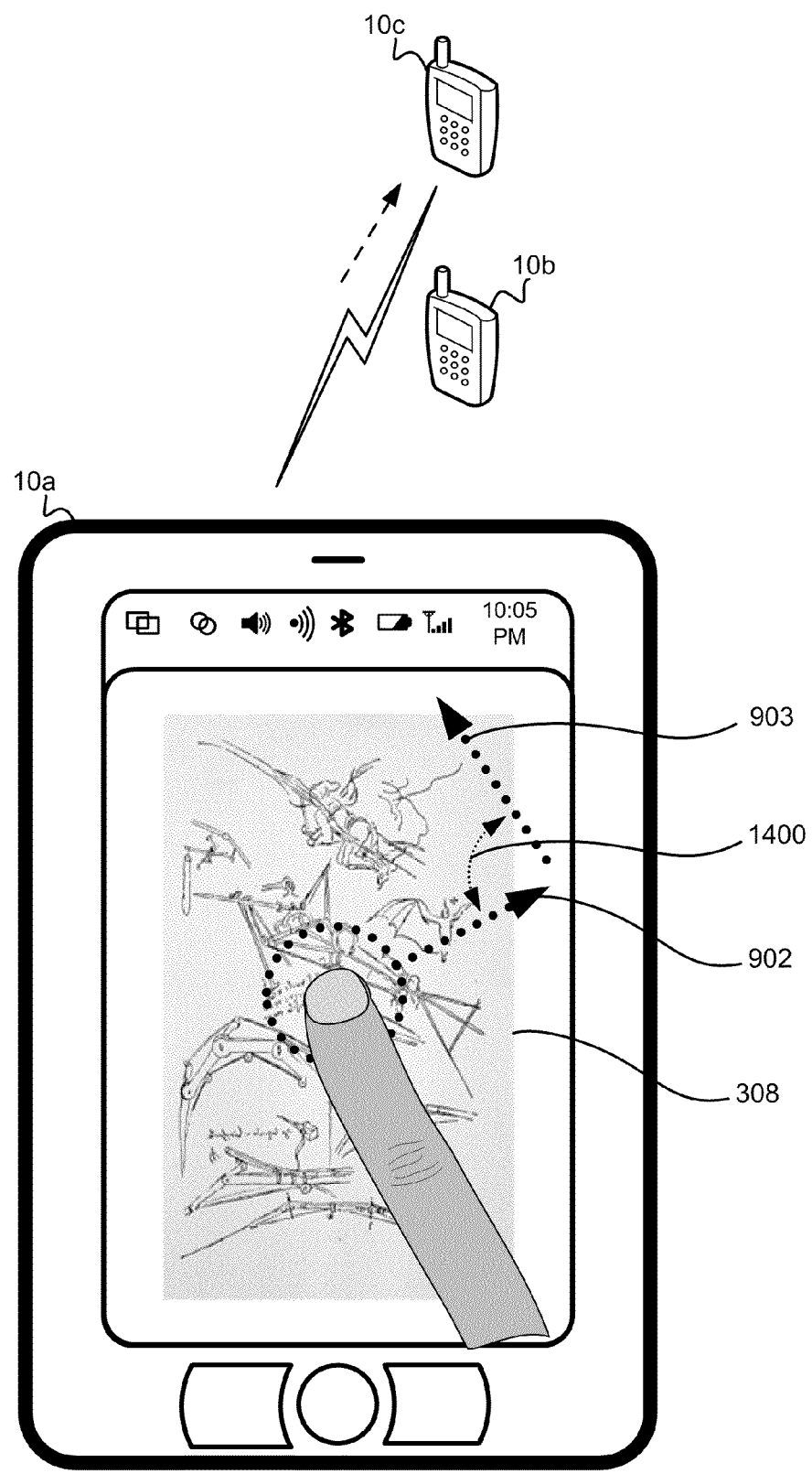
FIG. 14 is a frontal view of a portable computing device illustrating transmitting files using bounce gestures according to an aspect.

FIG. 14 illustrates a further aspect gesture for enabling users to direct the transmission of a file to an intended recipient computing device 10c that is blocked by another computing device 10b by appearing to bounce the file off of a virtual wall to carom towards the targeted computing device. In a situation where multiple computing devices 10b-10c are located along the same general direction in relation to the transmitting computing device 10a, the computing device 10a may be configured to determined when a flick gesture is directed away from nearby computing devices, and to calculate a bounce angle that an object would follow if it bounced off an edge of the touchscreen display 308 along the direction of the flick gesture. The path of the flick gesture and the rebounding path off the edge of the display are shown by the dotted lines 902 and 903. The computing device 10a may be configured to detect a flick gesture towards one of the sidewalls of the touchscreen display, determine the angle of reflection 1400, and identify the targeted computing device 10c based upon the direction of the reflected path 903.

Figure 15:
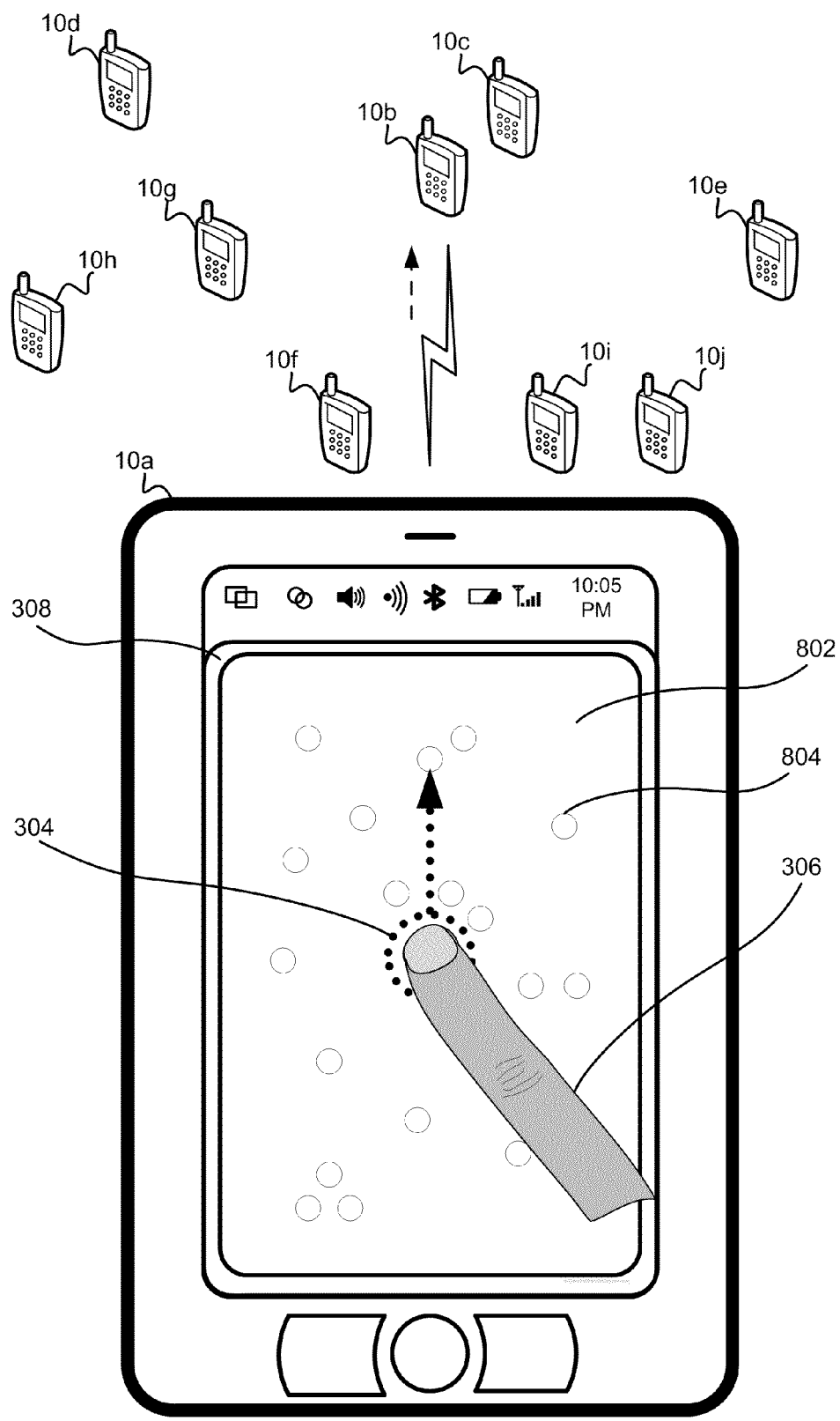
FIG. 15 is a frontal view of a portable computing device illustrating transmitting files based on the direction in which the computing device is pointing and the flick gesture according to an aspect.

In an aspect shown in FIG. 15, the transmitting computing device 10a may be configured to identify the targeted computing device 10b, which is directly in front of the transmitting computing device. In this aspect, the transmitting computing device 10a may display a radar map 802 including graphical indicators 804 that identify the relative location of nearby computing devices 10b-10j, which are wirelessly linked to the computing device 10a. As the user moves the computing device 10a to point it at the targeted computing device 10b, the computing device 10a may be configured to detect the change in its orientation (e.g., via a compass sensor), and to adjust positions of the graphical indicators 804 to reflect the relative locations of the nearby computing devices 10b-10j. The computing device 10a may be configured to detect a touch of a finger 306 in the touchscreen 308 launch pad 304, and to identify the computing device 10b that is located in front of the transmitting computing device 10a. For instance, the transmitting computing device 10a may be configured to receive data from an electronic compass sensor to determine the direction to which the computing device 10a is pointing and identify the targeted computing device 10b. The computing device 10a may further be configured to detect a flick gesture towards the targeted computing device 10b and interpret this gesture to begin the process of transmitting the file to the identified computing device 10b.

Figure 16A:
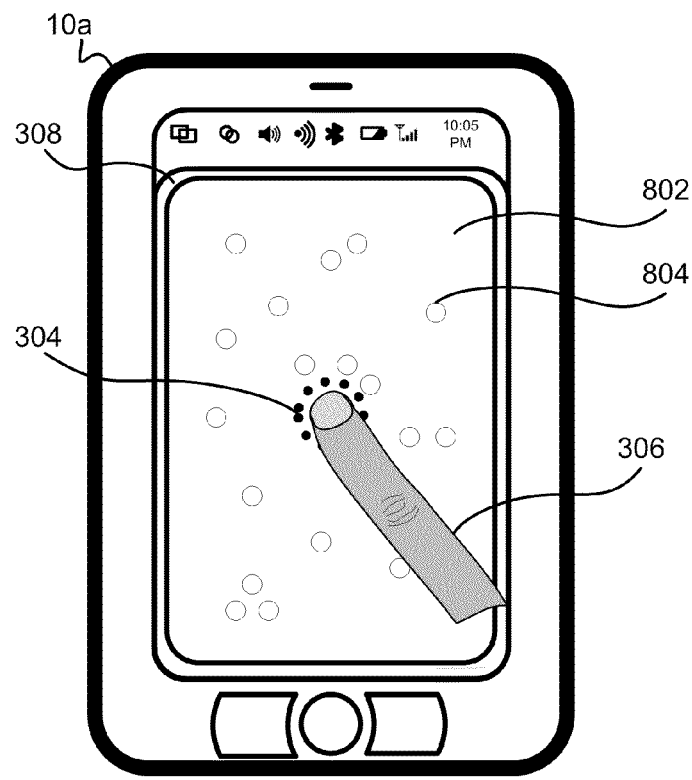
FIGS. 16A-16B are frontal views of a portable computing device illustrating transmitting files by dragging-and-dropping action according to an aspect.
Figure 16B:
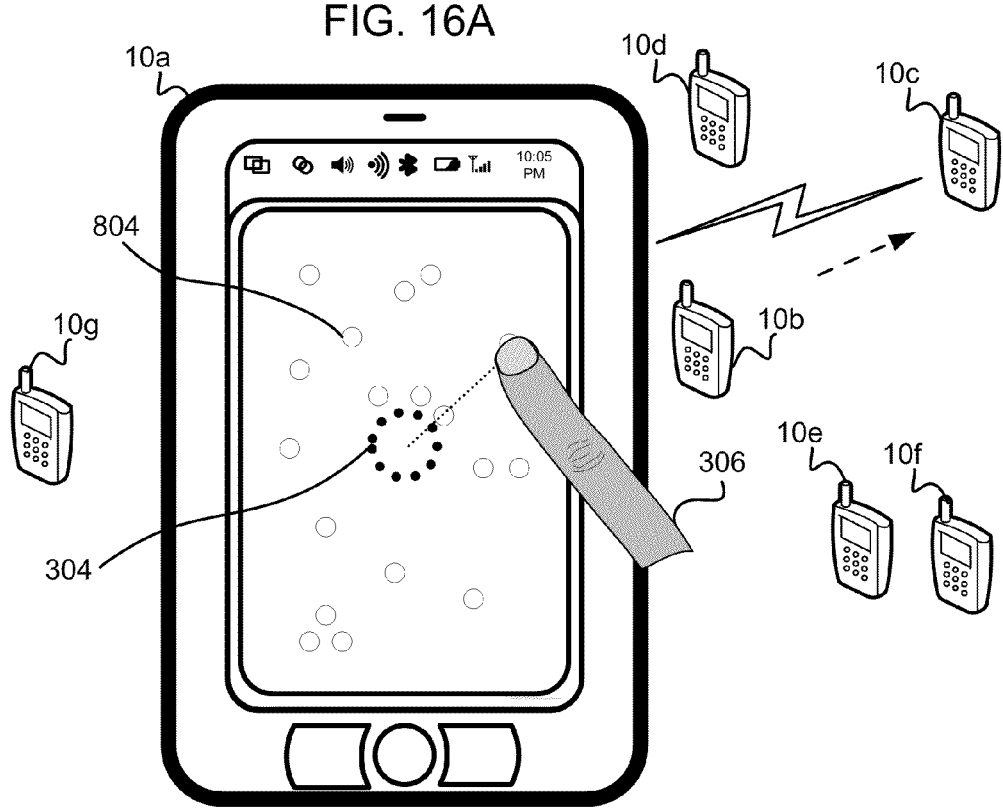

In a further aspect illustrated in FIGS. 16A and 16B, the transmitting computing device 10a may be configured to allow a user to transfer files to a targeted computing device 10b by a drag-and-drop gesture. In this aspect, the transmitting computing device 10a may be configured to display a radar map 802, graphical indicators 804 and a launch pad 304 as shown in FIG. 16A. The transmitting computing device 10a may be configured to detect the touch of a user's finger 306 on the launch pad 304 of the touchscreen display. As illustrated in FIG. 16B, the user may trace a drag gesture by tracing a path from the launch pad 304 to the graphical indicator 804 corresponding to the intended recipient computing device 10c. Once the finger 306 touches the graphical indicator 804 corresponding to a targeted computing device 10c, the computing device 10a may detect the discontinuation of the touch (i.e., the drop gesture), identify the targeted computing device 10b based on the location of the finger 306 touch release and interpret this gesture to begin the process of transmitting the file to that computing device 10c. Since the radar map display illustrates the location of nearby computing devices that the user can also see in reality, this aspect provides an easy to use and intuitive GUI gesture for transmitting a file to a particular computing device in a crowded room.

Figure 17:
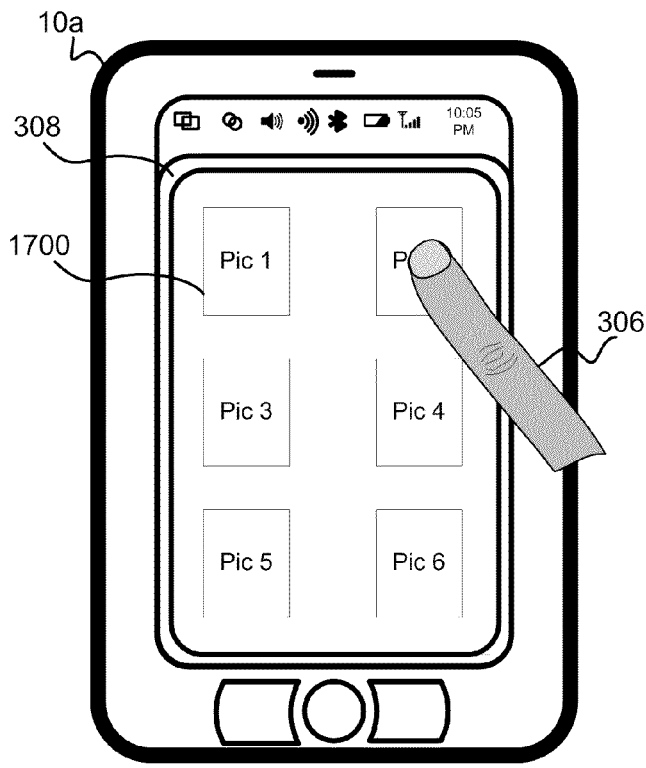
FIG. 17 is a frontal view of a portable computing device illustrating transmitting files based on displayed profile pictures according to an aspect.

A further aspect is shown in FIG. 17, in which the transmitting computing device 10a is configured to identify the other computing devices 10 by showing a profile picture 1700 of its owner instead of displaying the location of the device. The owner pictures 1700 may be obtained from contact information in the computing device 10a contact database, or may be provided to the transmitting computing device 10a during the device discovery and link establishment process. If a nearby computing device is not included in the contact database and does not provide a profile picture of its owner, the transmitting computing device 10a may be configured to use a default picture 1700. To fit within the display area of the device, the computing device 10a may be configured to scroll the pictures and allow the user to brows through the pictures using standard scroll and browse gestures. The user may then select a particular computing device to receive a file by touching the picture of the device owner using a finger 306. Using this input, the transmitting computing device 10a may determine the target computing device and begin the process of transmitting files to the targeted computing device.

Figure 18:
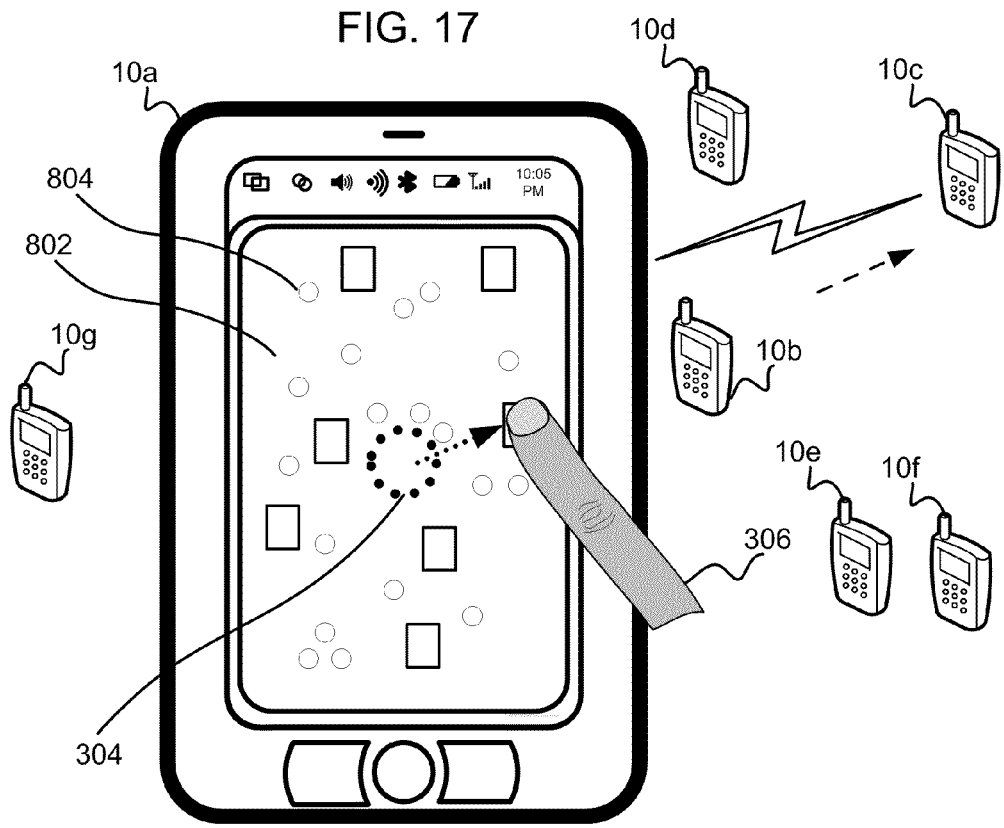
FIG. 18 is a frontal view of a portable computing device illustrating transmitting files using drag-and-drop action in a radar map display according to an aspect.

In an aspect shown in FIG. 18, the transmitting computing device 10a may be configured to display a radar map 802, and identify the location and presence of other computing devices 10b-10g by displaying graphical indicators 804. The graphical indicators may include dots or owner pictures 1700. Pictures may be displayed on the locations of computing devices for which the owner's picture is contained in the contact database or that have communicated owner profile photos to the transmitting computing device 10a. In this aspect, the user may identify the computing device to which he wishes to transmit a file by touching or tracing a path to the picture or dot of the destination device. For example, the computing device 10a may be configured to detect a traced touch gesture starting from the launch pad 304 and ending at the graphical indicator 804 designating another computing device 10b, and interpret this gesture to begin the process of transmitting a file to the computing device 10b.

Figure 19:
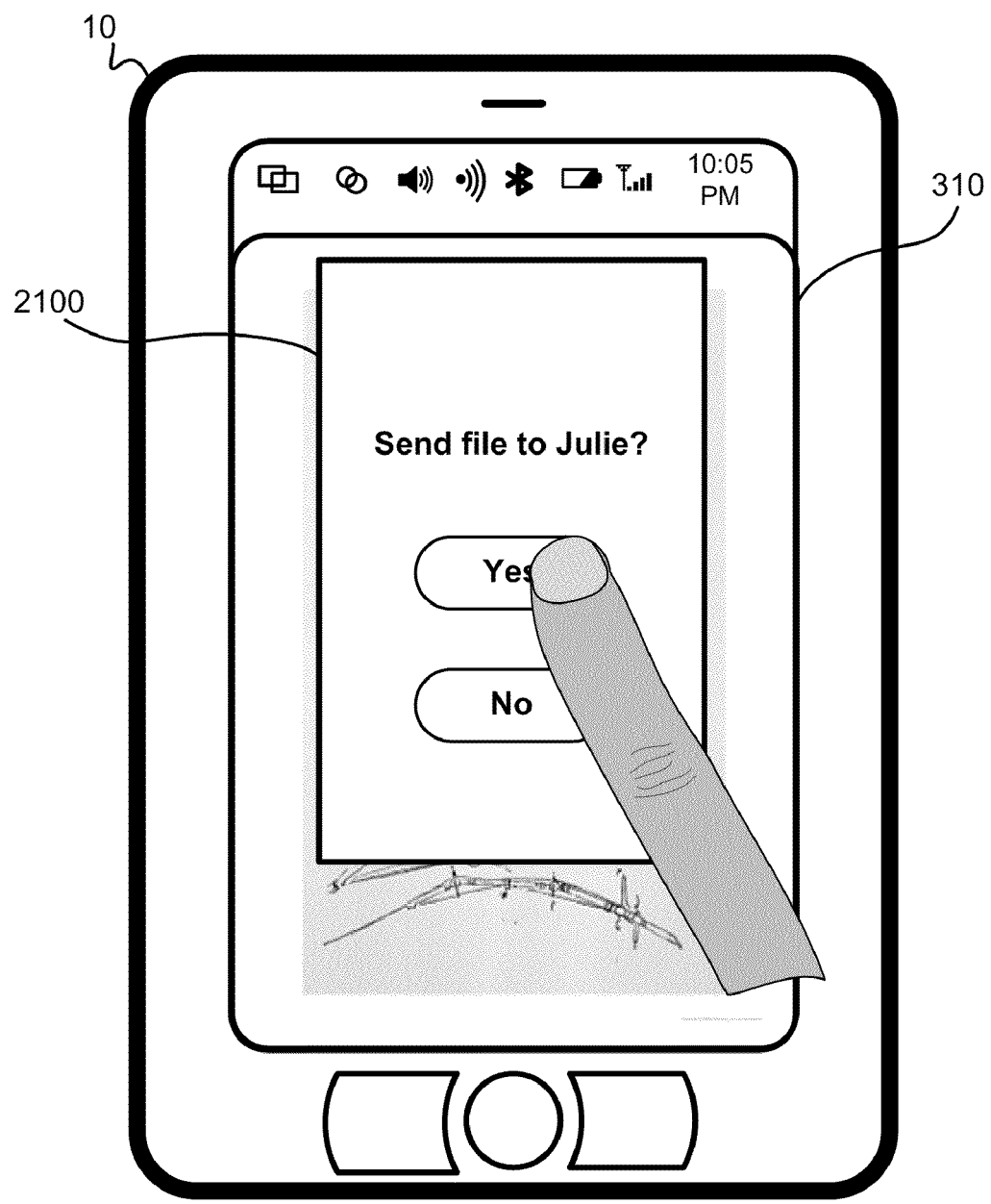
FIGS. 19-20 are frontal views of a portable computing device illustrating verifying transmission of files according to an aspect.
Figure 20:
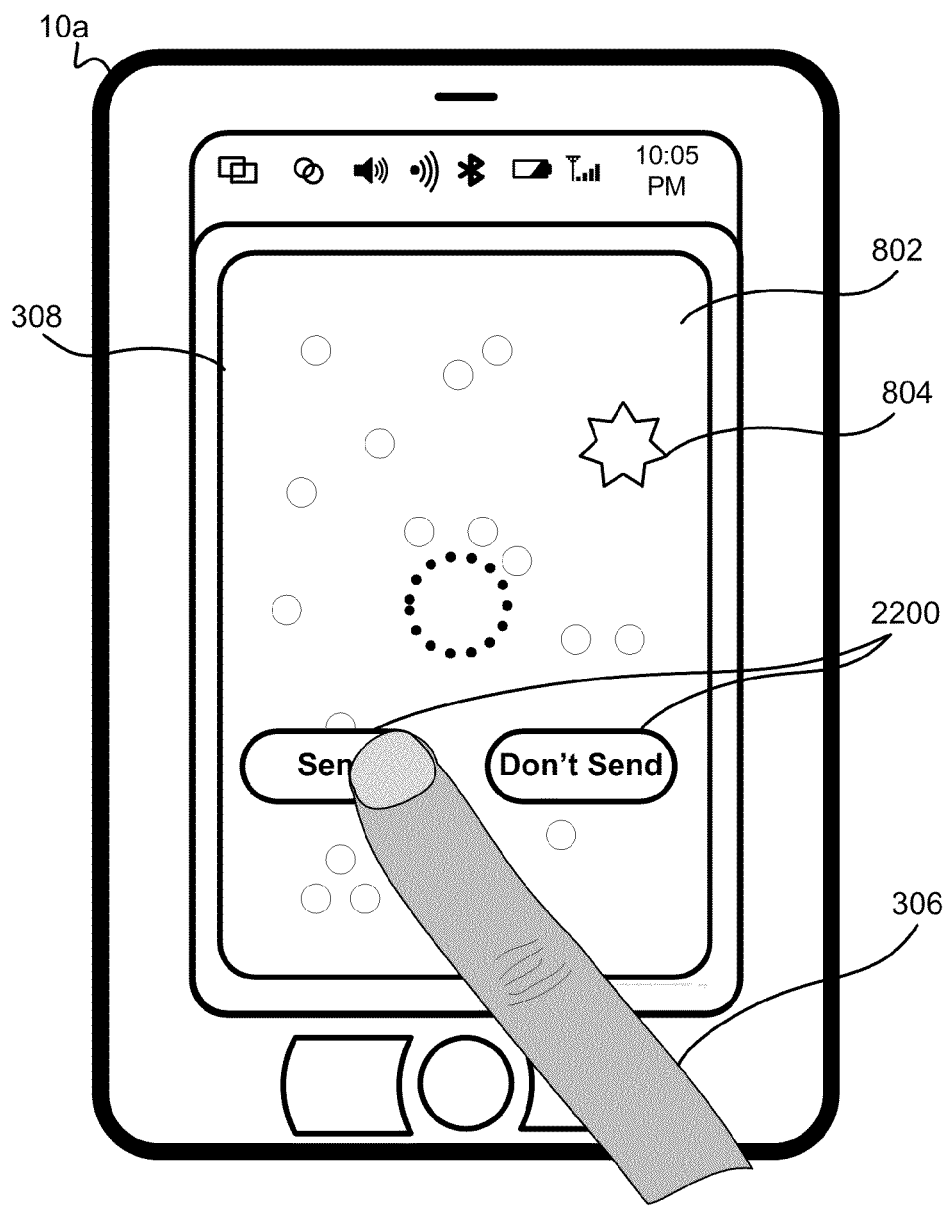

In an aspect shown in FIGS. 19-20, the transmitting computing device 10 may be configured to prompt the user to verify transmission of files to a particular computing device before the transmission is begun. Once the targeted computing device 10 is identified based on the user's gestures and location of the other computing devices 10 as described above, the transmitting computing device 10 may generate a display prompting the user to verify the identity of the targeted computing device 10. In an exemplary aspect illustrated in FIG. 19, the transmitting computing device 10 may be configured to present an identity of the owner of the targeted computing device. The identity of the owner may be a name or photo, and the information may be obtained from the transmitting computing device's contact database, or from the targeted computing device, such as during the handshaking process or as part of the transmitted access data. For example, if the identity of the targeted computing device owner is known, a question pane 2100 may be presented on the display 310 prompting the user to indicate whether the file should be transmitted to the identified person. The user may select "Yes" to verify the transmission file, and "No" to repeat the process of identifying a targeted computing device 10.

In another aspect shown in FIG. 20, the transmitting computing device 10 may be configured to display a radar map 802 in which the identified targeted computing device 10 is identified with a graphical indicator 804, such as a star, in conjunction with a prompt requesting the user to verify the file transmission. The verification prompt may display a question pane 2200 to prompt the user to verify the transmission of a selected file to the indicated computing device. The user may touch the touchscreen 308 with a finger 306 to indicate that the file should be transmitted or to prevent transmission so a different computing device can be selected.

Figure 21A:
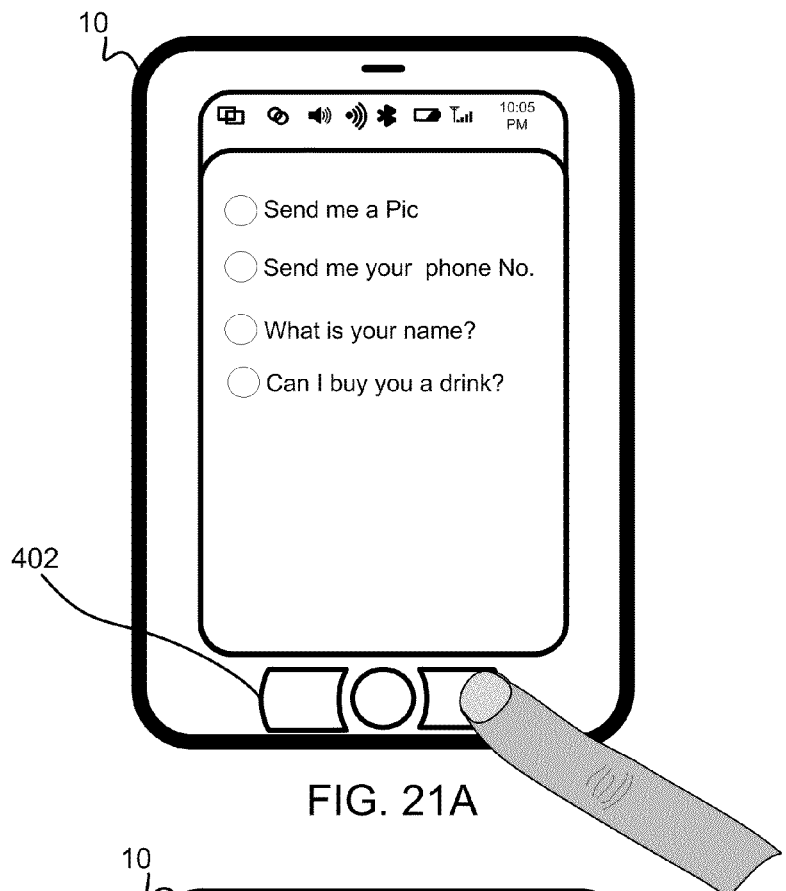
FIG. 21A-21B are frontal views of a portable computing device illustrating activating file requesting functionality and requesting file transmissions according to an aspect.
Figure 21B:
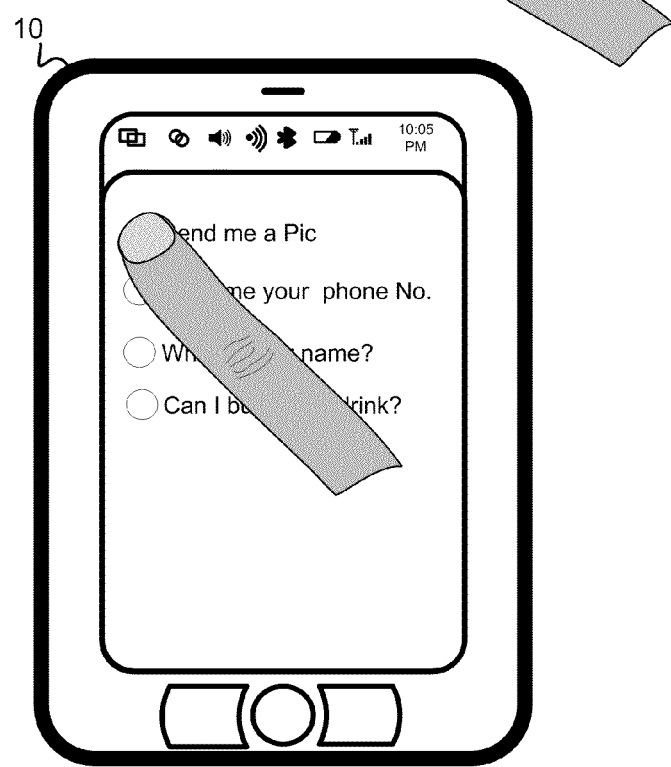

In an aspect illustrated in FIGS. 21A-21B, a computing device 10 may be configured to enable a user to activate a file request functionality by which the user can request files transmissions from other computing devices. The file request functionality may be activated by a variety of methods. In an aspect illustrated in FIG. 21A, the requesting computing device 10 may be configured to activate the file request functionality in response to the press of a function key 402. Alternatively, the file request functionality may be activated in response to the press of a soft key 502 or a particular touch to a touchscreen 308 (not shown). In an aspect, once the file request functionality is activated, the requesting computing device 10 may be configured to display to the user a list of requests that the user may desire to communicate to another computing device 10. For example, the request list may include a request for pictures, phone number, name, or an invitation to share a drink as illustrated in FIG. 21A. Other request types may be created and customized based on user preferences. As illustrated in FIG. 21B, the requesting computing device 10 may be configured to detect a user's selection of the request type and, in response, transmit the request to a targeted computing device 10. The request can be directed to a specific device because the computing device 10 may have established wireless communication links with nearby computing devices, as described above with reference to FIGS. 1-2B. The requesting computing device 10 may be configured to allow a user to designate another computing device to which the user desires to send the request using gesture methods similar to those described above with reference to FIGS. 9-18.

Figure 22:
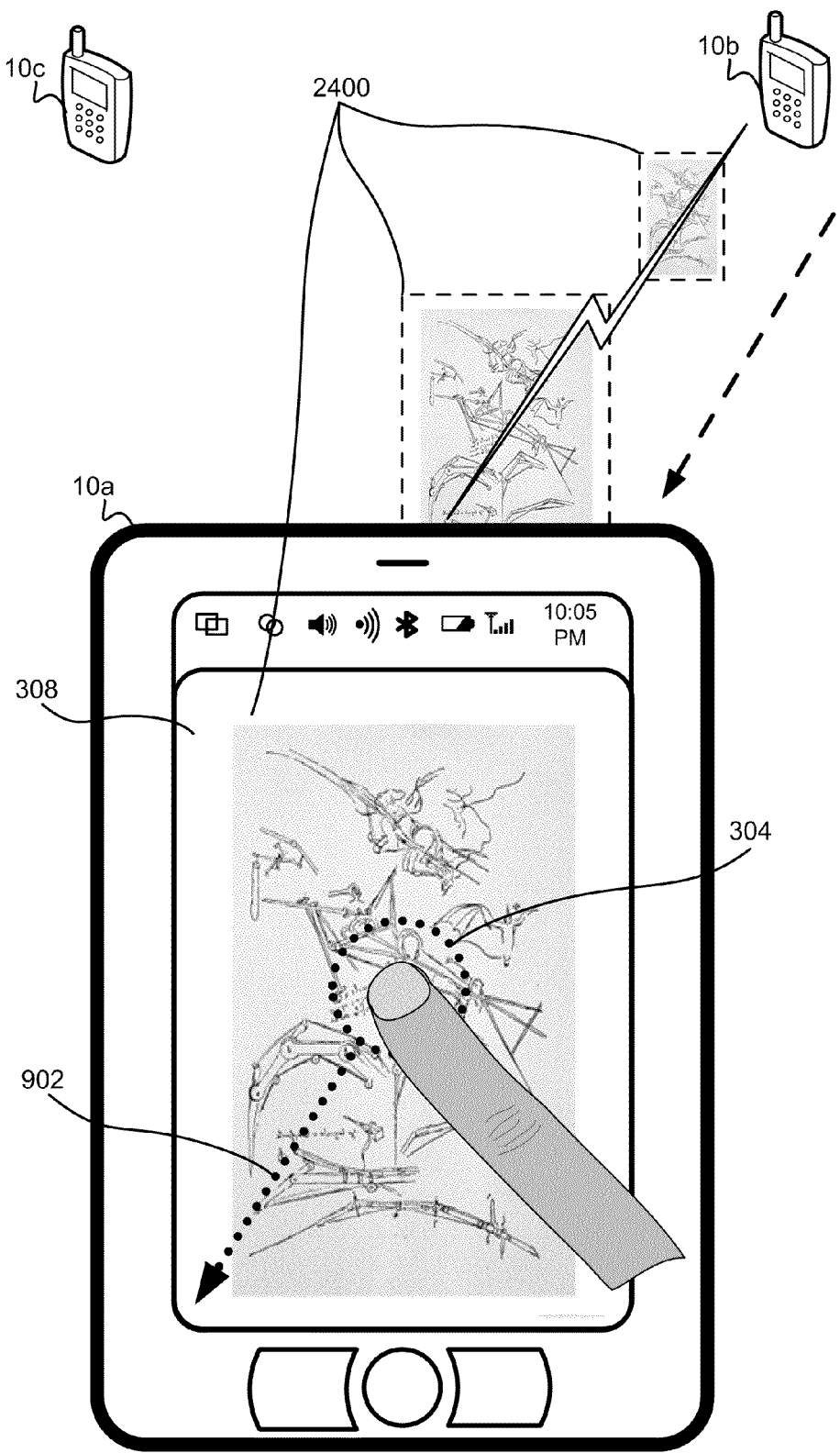
FIG. 22 is a frontal view of a portable computing device illustrating requesting a file transfer using flick gestures according to an aspect.

In an aspect shown in FIG. 22, the requesting computing device 10a may be configured to display a launch pad 304 when a file requesting functionality is activated. The requesting computing device 10a may be further configured to detect a touch gesture on the touchscreen 308, identify a targeted computing device 10b based upon the nature of the touch gesture, transmit a request for a file from the targeted computing device 10b, and receive the requested file.

To identify a targeted computing device 10b, the requesting computing device 10a may be configured to detect a flick gesture that begins in the launch pad 304 and moves away from the targeted computing device 10b (i.e., along a direction away from the location of the target at computing device 10b). The dotted line and arrow 902 shows the direction of movement a finger 306 to request a file from the computing device 10b. The dotted line and arrow 902 is shown to identify the direction of the finger 306 movement, and may not be part of the display 310. In alternative aspects, a dotted line and arrow 902 may be presented on the display as a visual cue to enable a user to verify that the flick gesture was properly interpreted by the computing device 10. The computing device 10a detecting such a file request flick gesture may configure and transmit a file request message to the targeted computing device 10b. The file request message of the various aspects may include access data so the receiving computing device has the information needed to transmit files to the requesting computing device 10a. In response to receiving the file request, the targeted computing device 10b may transmit a file 2400 to the requesting computing device 10a using the communicated access data and the transmission methods described herein. The requesting computing device 10a may receive and display the file. In this manner, the file request flick gesture operates in an intuitive manner, enabling users to download a file without engaging in the complex actions usually involved in initiating a file download.

Figure 23:
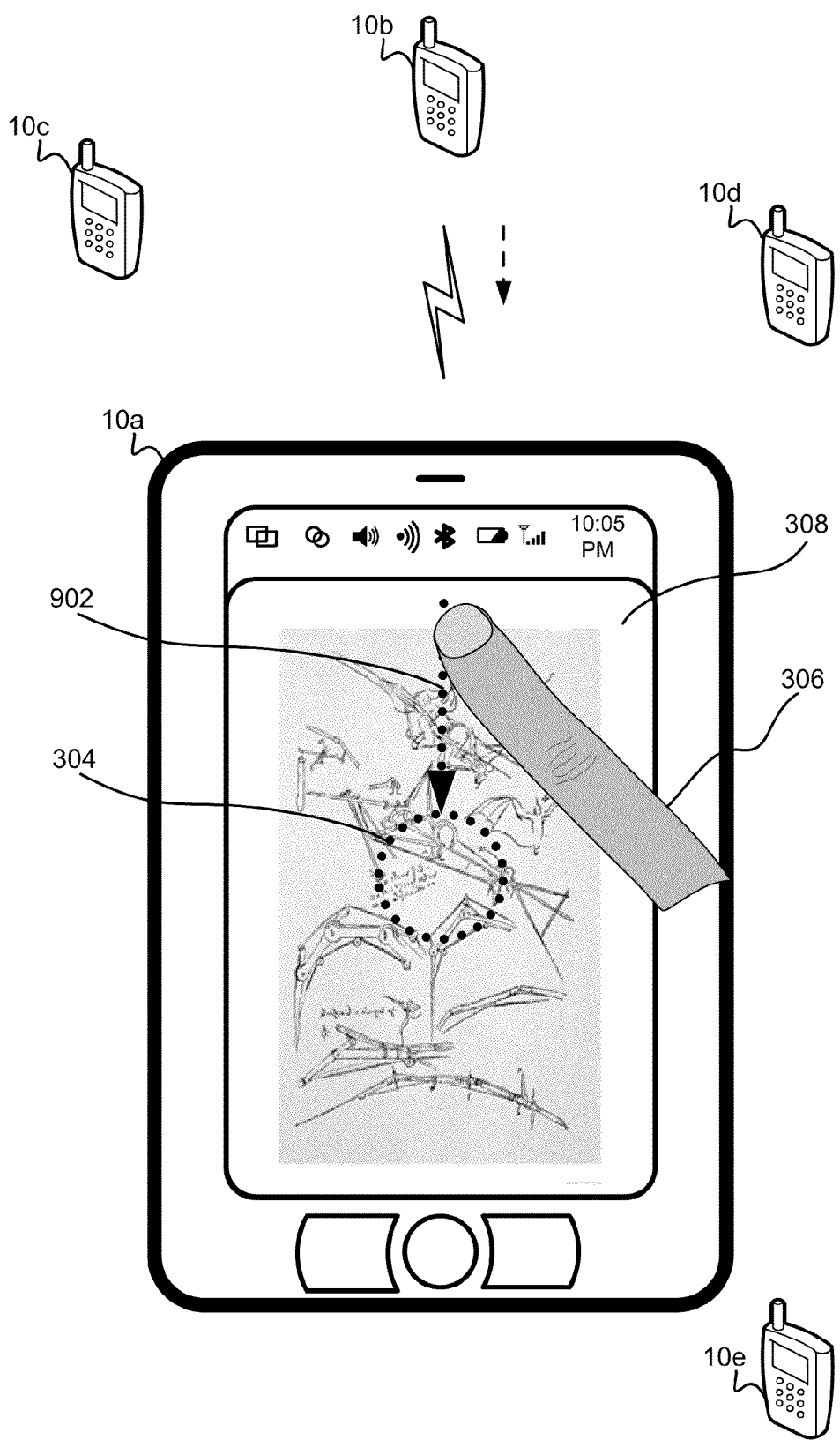
FIG. 23 is a frontal view of a portable computing device illustrating requesting a file transfer by pointing the computing device and using flick gestures according to an aspect.

In an aspect illustrated in FIG. 23, the requesting computing device 10a may be configured to identify a targeted computing devices 10 based on the direction in which the requesting computing device 10a is pointing. For example, the requesting computing device 10a may enable a user to point the device towards a targeted computing device 10b and trace a self-directed flick gesture from outside the launch pad 304 to the inside of the launch pad 304 to initiate the transmission of a file request message to the target at computing device 10b.

Figure 24:
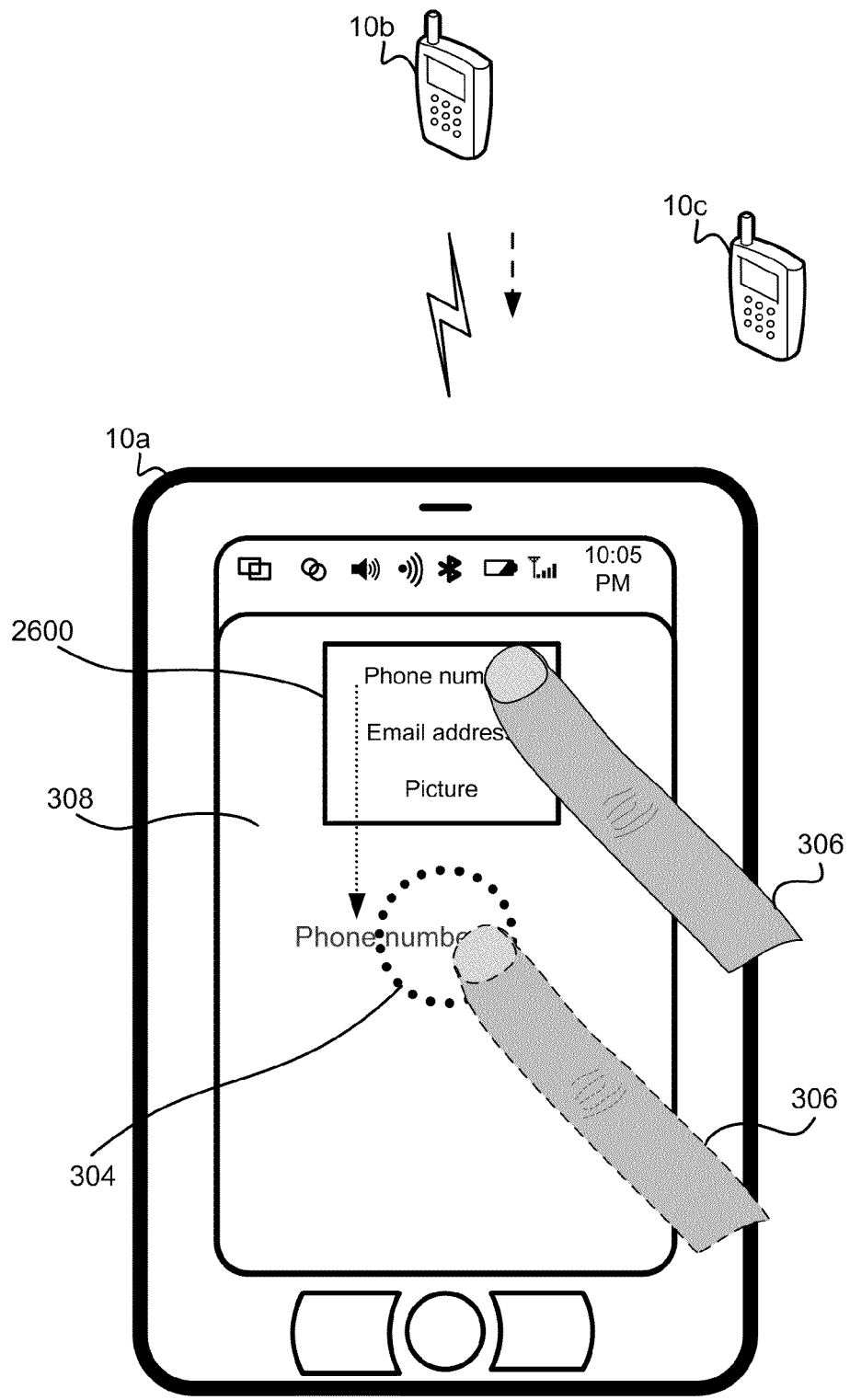
FIG. 24 is a frontal view of a portable computing device illustrating requesting a file transfer by pointing the computing device and dragging-and-dropping a predetermined request parameter into a launch pad according to an aspect.

In an aspect shown in FIG. 24, upon activation of the file requesting functionality, the requesting computing device 10a may display a menu pane 2600, including a list of requests that a user may send to a targeted computing device 10b. As described above with reference to FIG. 23, the requesting computing device 10a may be configured to identify a targeted computing device 10b based upon the direction in which the device is pointed. The requesting computing device 10a may further be configured to enable a user to send a selected type of request a targeted computing device 10b by selecting, dragging, and dropping a request from the menu pane 2600 onto the launch pad 304. The requesting computing device 10a may send the selected request to the targeted computing device 10b using the wireless may communication link established during the device discovery processes, and receive and display transmitted files. For example, when a user desires to request a phone number from a targeted computing device 10b, the user may activate the request functionality, point his computing device 10a at the targeted computing device 10b, and drag-and-drop the phone number request message type from the menu pane 2600 into the launch pad 304 using his finger 306 on the touchscreen 308.

In response to this gesture the user's computing device 10a may send a request to the targeted computing device 10b to receive a phone number. When a response is received the requesting computing device may display the response.

Figure 25:
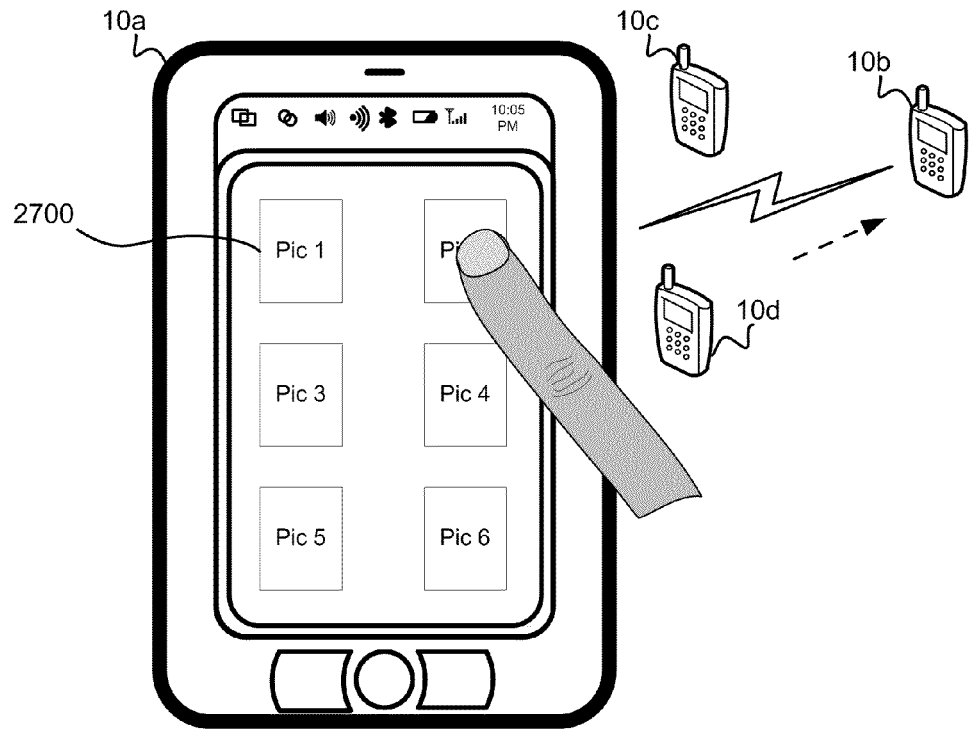
FIG. 25 is a frontal view of a portable computing device illustrating identifying a targeted device for requesting file transfers using profile pictures according to an aspect.

In an aspect shown in FIG. 25, the requesting computing devices 10a may be configured to establish wireless communication links with nearby computing devices 10b-10d and present a display identifying each computing device 10b-10d with a profile picture of its owner to enable a user to select a device from which to request a file transfer. As described above, profile pictures 2700 may be obtained from a contacts database or received from other computing devices 10b-10d when the wireless communication links are established. To identify a targeted computing device 10 for a file transfer request message, the user of the requesting computing device 10a may touch the profile picture 2700 of the targeted computing device 10b. In response, the requesting computing device 10a may format and transmit a request message to the targeted computing device 10b via the established wireless communication link.

Figure 26:
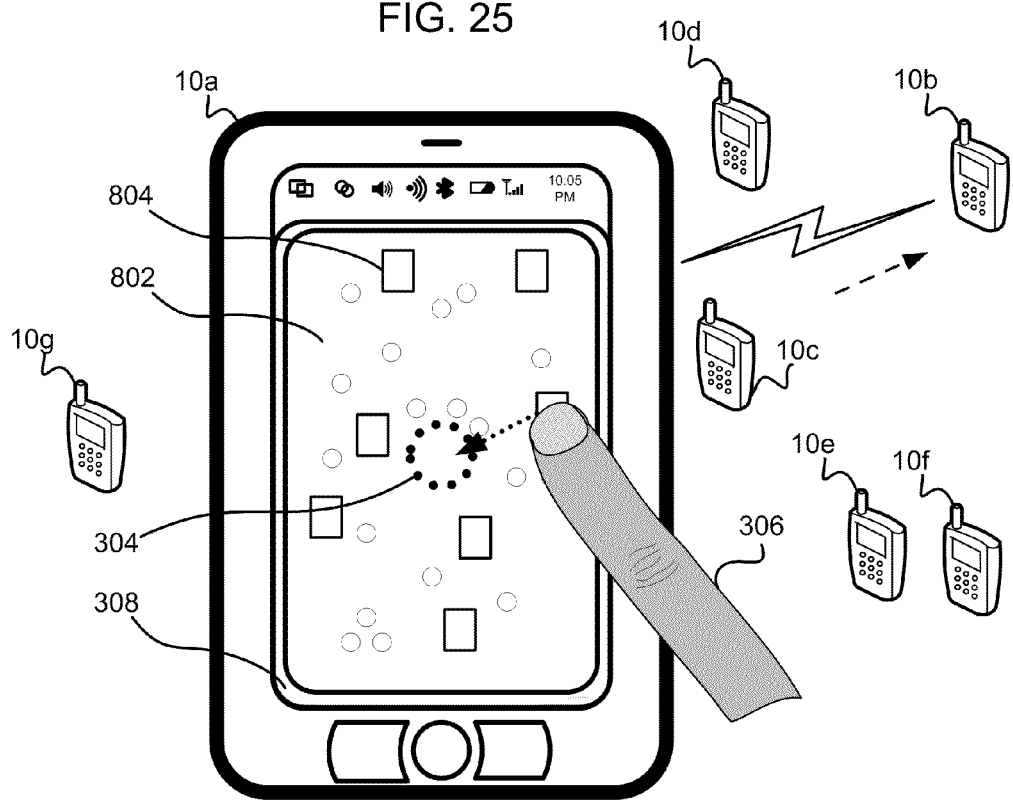
FIG. 26 is a frontal view of a portable computing device illustrating requesting a file transfer using dragging-and-dropping identified device icons into the launch pad in a radar map display according to an aspect.

In an aspect shown in FIG. 26, the requesting computing device 10a may be configured to display a radar map 802 including graphical indicators 804 such as dots and profile pictures to enable the user to identify a computing device 10b-10g to which a file request message should be transmitted. The user of the requesting computing device 10a may identify a targeted computing device 10b for the request message by selecting, dragging, and dropping the graphical indicator associated with the targeted computing device 10b into the launch pad 304. Once the targeted computing device 10b is selected, the request for file sharing may be sent to it.

Figure 27:
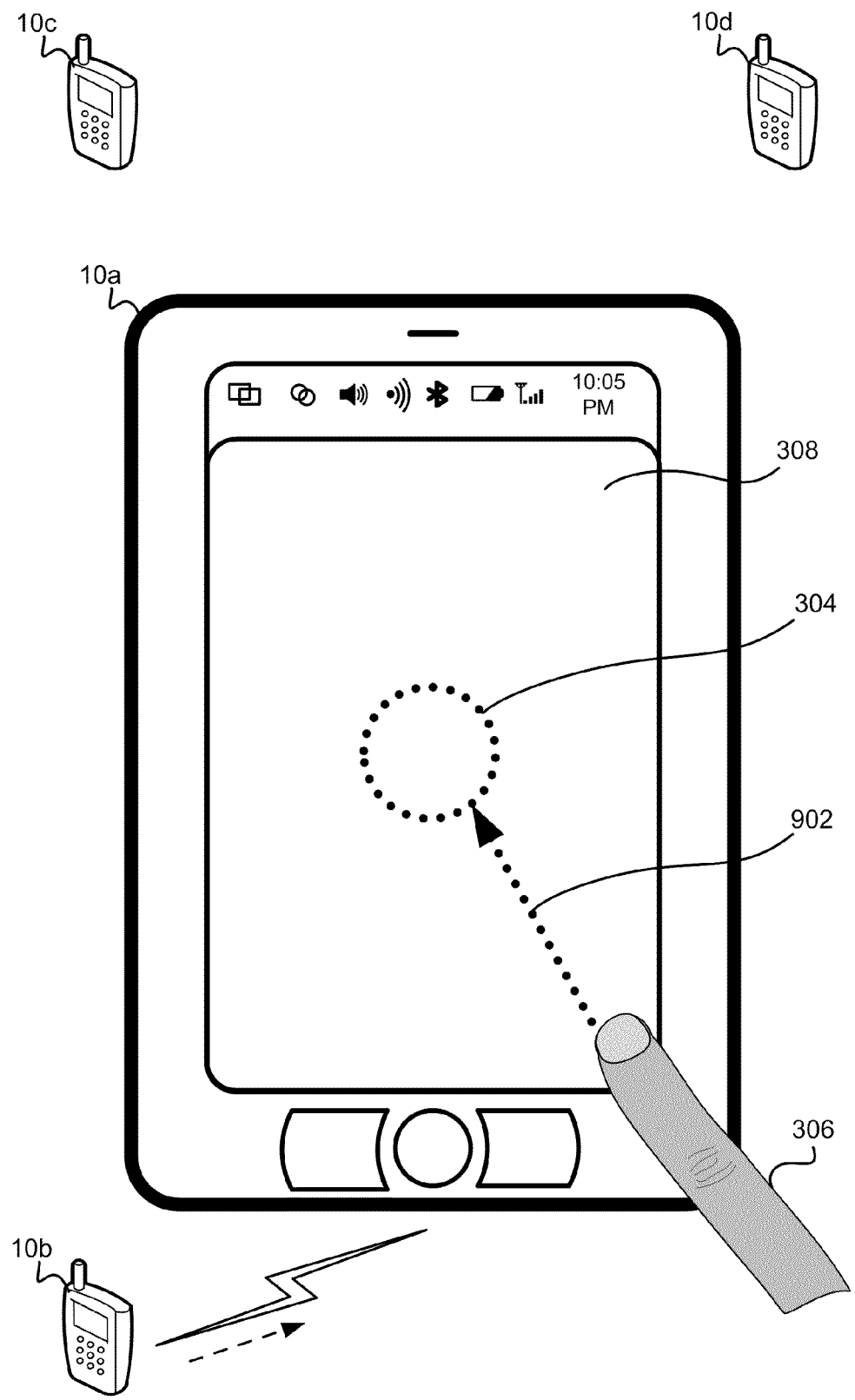
FIG. 27 is a frontal view of a portable computing device illustrating requesting a file transfer using flick gestures according to an aspect.

In an aspect shown in FIG. 27, the requesting computing device 10a may be configured to identify and request file sharing from a targeted computing device 10b based on the direction of a flick gesture. In this aspect, the touch path of a flick gesture may begin at a location on the touchscreen 308 outside of the launch pad 304 and end in the launch pad 304. The dotted line and arrow 902 shows the direction in which a finger 306 may trace a flick gesture for requesting a file transfer from the targeted computing device 10b in this aspect.

Figure 28:
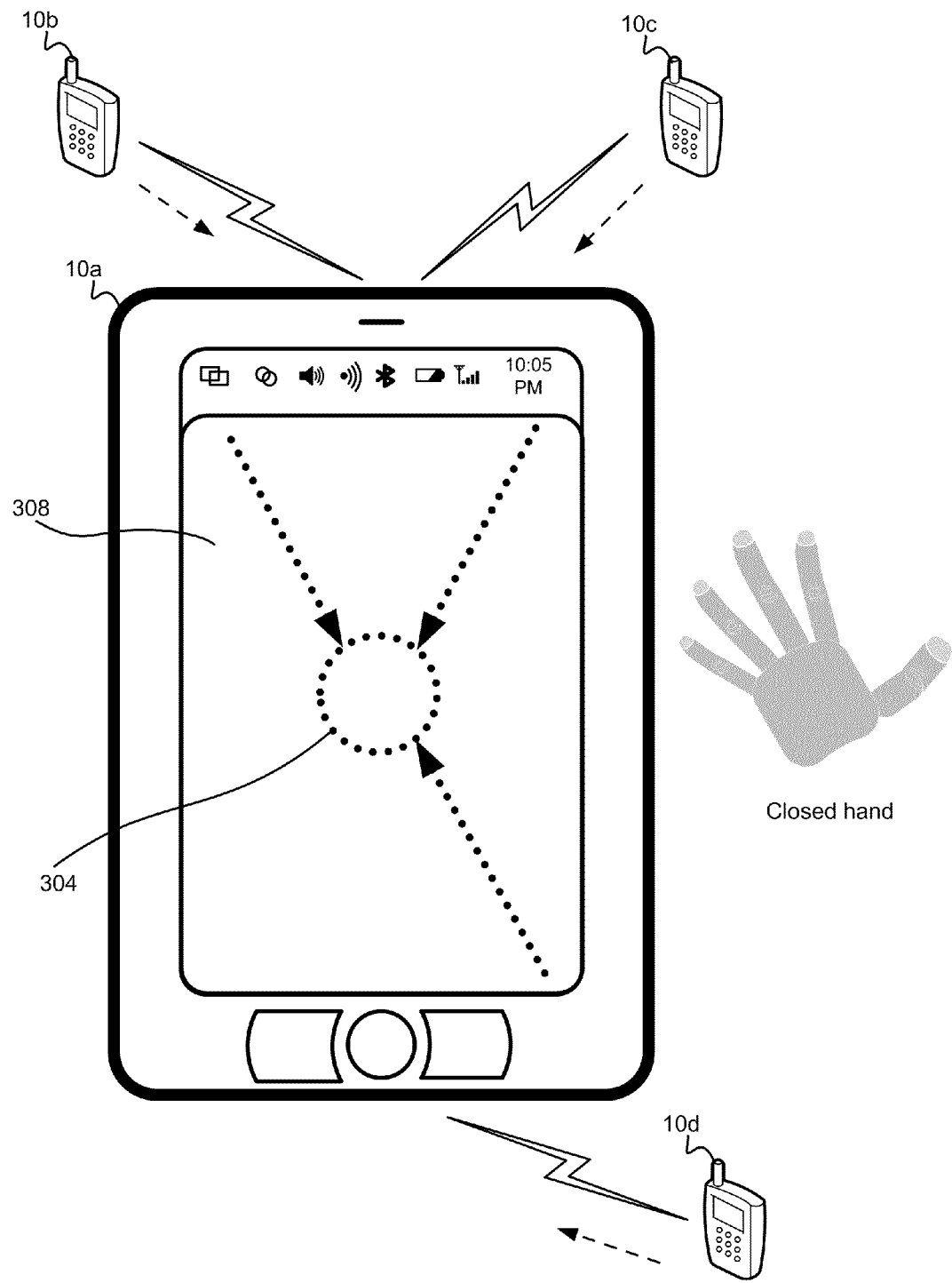
FIG. 28 is a frontal view of a portable computing device illustrating requesting a file transfer using a hand gestures according to an aspect.
Figure 29:
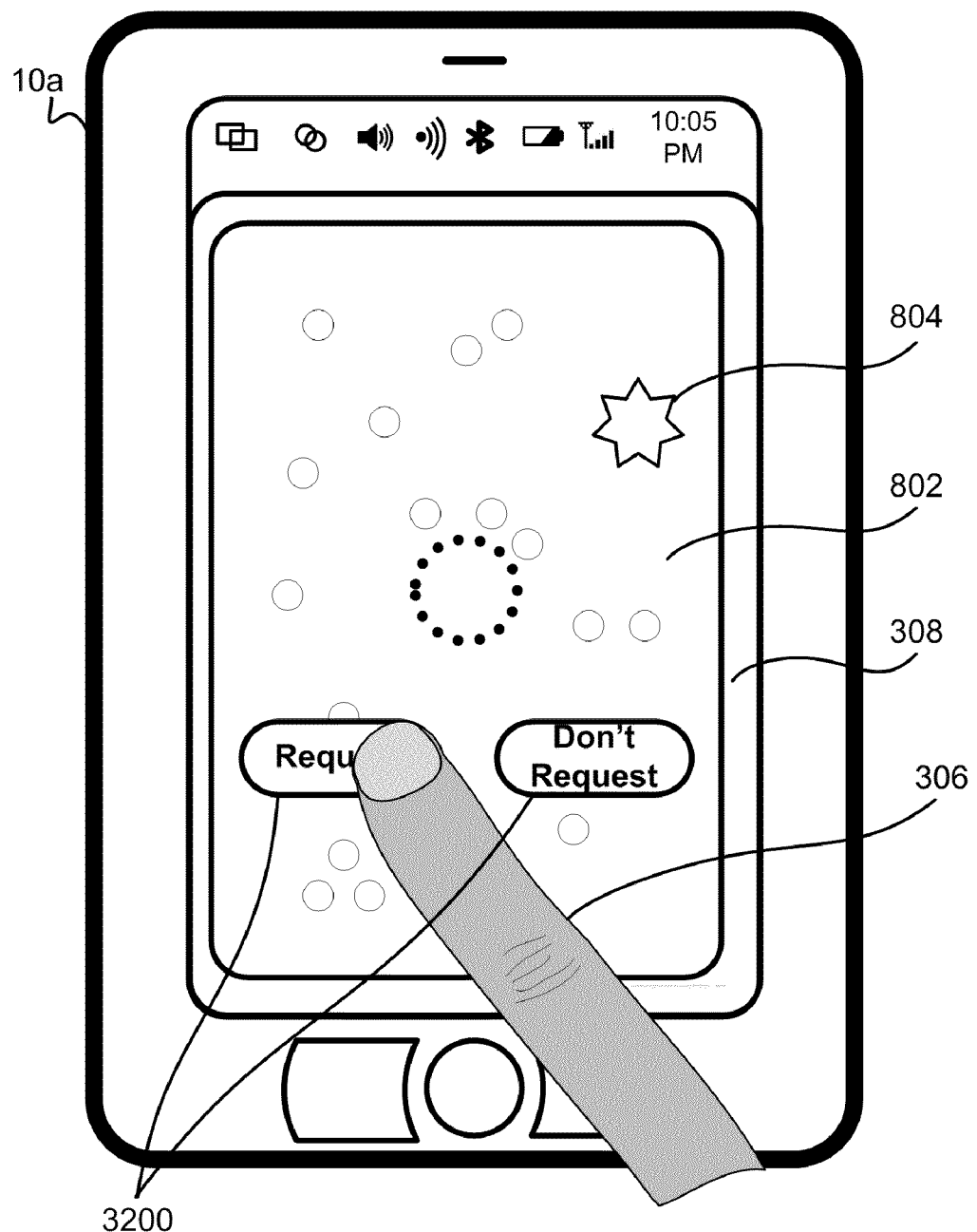
FIGS. 29-30 are frontal views of a portable computing device illustrating methods for verifying the identity of targeted devices according to an aspect.

In an aspect shown in FIG. 28, the requesting computing device 10a may be configured to identify and request file sharing simultaneously from many different targeted computing devices 10b-10d by recognizing a closing hand gesture. In this aspect, a user may place all fingers of one hand near the outside borders on the touchscreen 308 and bring the fingers toward the launch pad 304. The requesting computing device 10a may be configured to recognize such a closing hand gesture, and in response transmit a file sharing request to all linked computing devices 10b-10d. Upon receiving such a file sharing request, the other computing devices 10b-10d may transmit files to the requesting computing device 10a according to access data included in the file sharing request.

The requesting computing devices 10 may be configured to display a prompt to enable the user to verify the identity of the targeted computing devices 10 before a file transfer request message is transmitted. In an aspect shown in FIG. 29, a requesting computing device 10 may be configured to identify a targeted computing device 10a on a radar map 802 display using a graphical indicator 804, such as the star, and display a decision pane 3200 requesting the user to confirm or reject the device selection. In the illustrated example, two decision soft keys 3200 are displayed to allow the user to verify the action by pressing "Request" soft key, or stop the request, such as to select a different targeted computing device, by pressing the "Don't Request" soft key.

Figure 30:
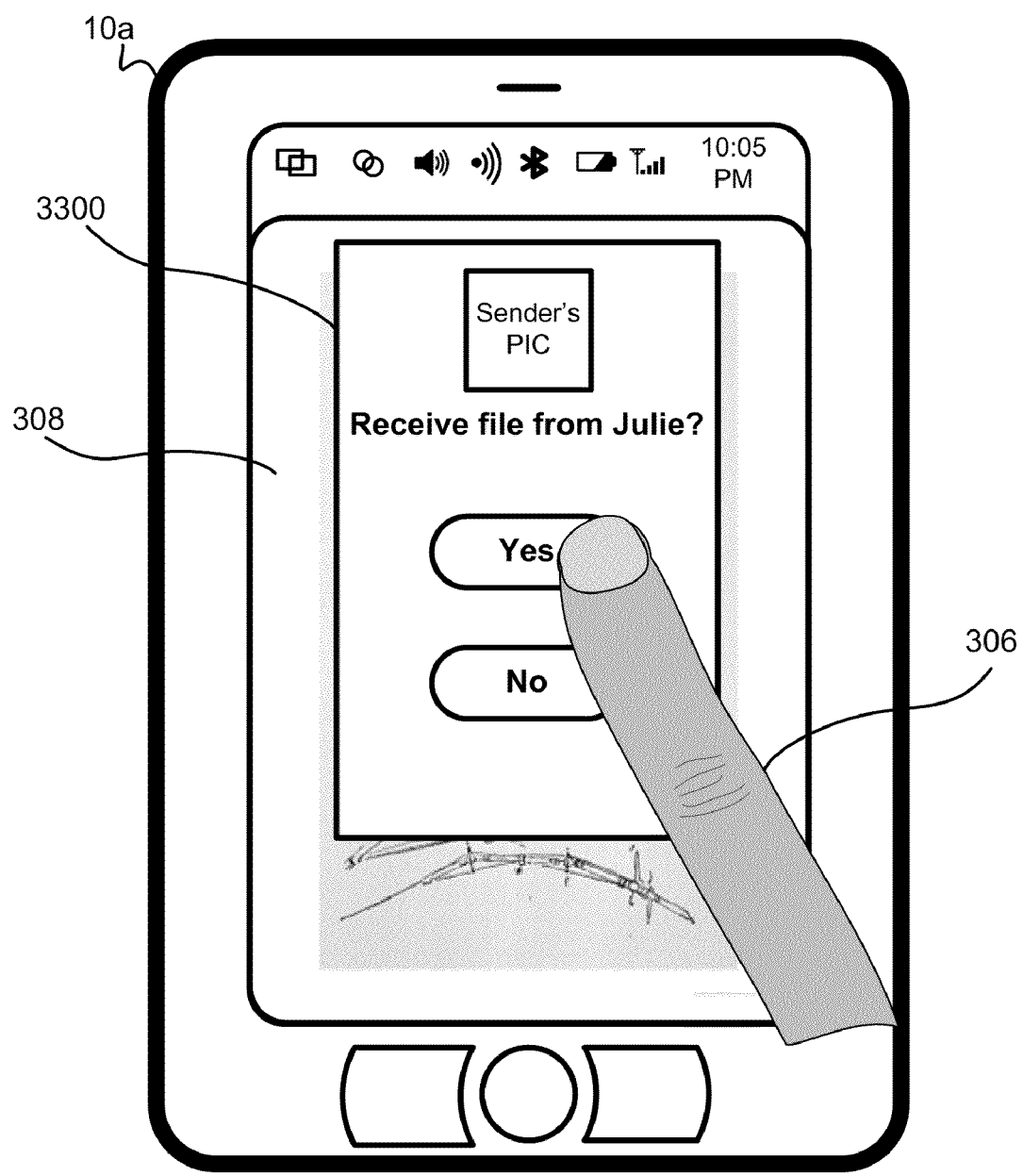

In an aspect shown in FIG. 30, when the identity of the owner of the targeted computing device 10 can be ascertained, such as by looking up the device in the user's contact database, the requesting computing device 10a may enable the user to verify the request transmission using that identification data. The identity of the owner of a targeted computing device 10 may displayed as a name, picture, telephone number or email address of the owner. For example, if the picture and name of the owner of the targeted computing device is available, such as in the contact database or transmitted by the targeted computing device, the requesting computing device 10a may display a verification prompt pane 3300 including the profile picture and the name of the owner of the targeted computing device 10 along with a prompt for the user to verify the transmission of the requests to the targeted computing device 10. For example, the user may press a "Yes" or "No" soft key to verify the transmission of the request message.

Figure 31:
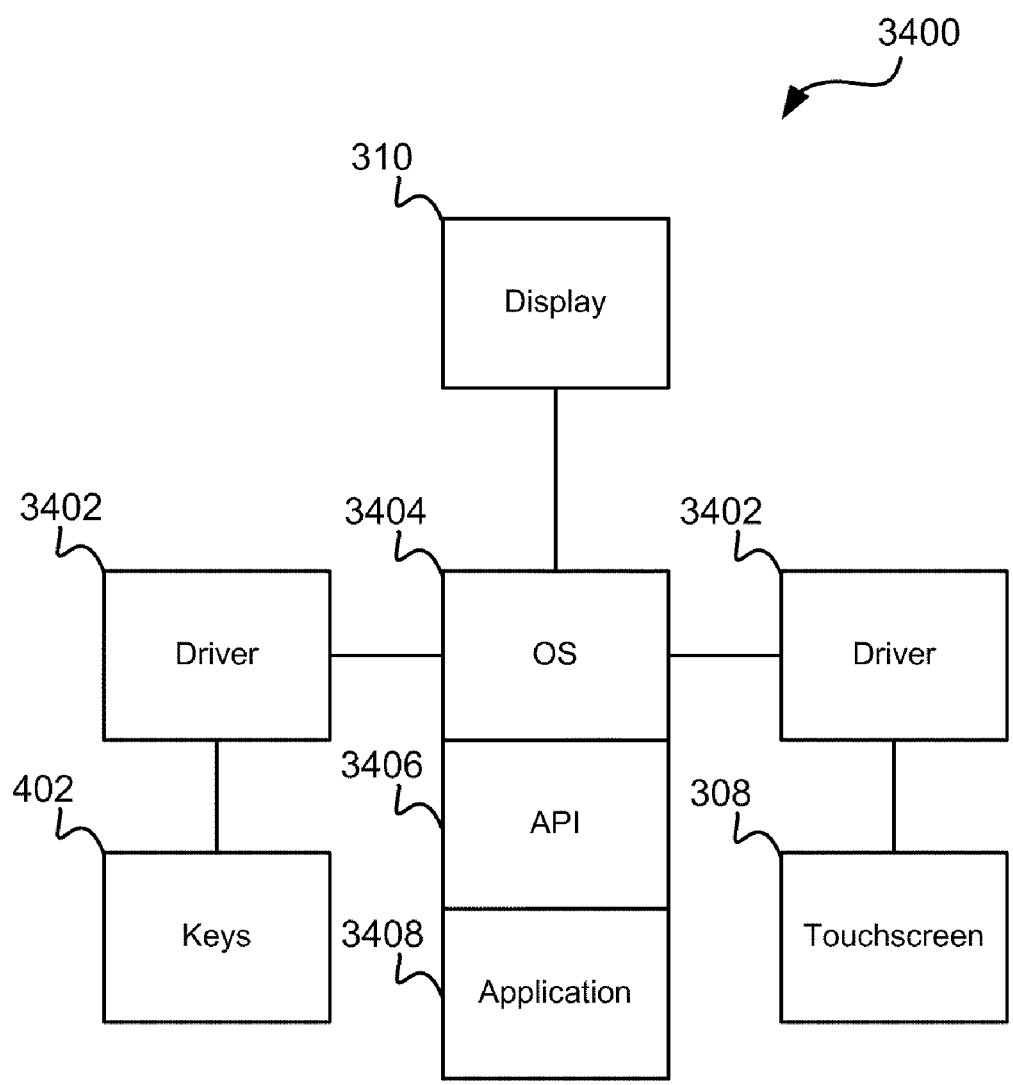
FIG. 31 is a system block diagram of a computing device suitable for use with the various aspects.

FIG. 31 illustrates hardware and software components 3400 of a computing device 10 suitable for use with the various aspects. A computing device 10 may be programmed with an application 3408 to provide the file sharing functionality of the various aspects. The application 3408 may communicate with the operating system (OS) 3404 through an application programming interface (API) 3406. An API 3406 is an interface that defines the ways by which an application program may request services from libraries and or OS 3404. Alternatively, the file sharing functionality may be implemented in a series of new APIs. The file sharing functionality application 3408 may communicate with users through the device display 310, touchscreen 308, and physical keys 402. For example, users may depress a key 402 or touch the touchscreen 308 to activate the file sharing functionality. Users may also use the touchscreen 308 to trace flick gestures to initiate file sharing communications. Information received through presses of the keys 402 and/or touchscreen 308 may be communicated to the operating system 3404 and via drivers 3402. Drivers 3402 act like translators between the keys 402 and touchscreen 308, and the OS 3402. The information received via the drivers 3402 may be communicated to the application 3408 via an API 3406. The application 3408 may provide information to the user on the display 310. The information that may be displayed to the user may include instructions for activating the file sharing functionality, graphical indicators to facilitate the use of the file sharing functionality, the location and identity of other computing devices 10, and verification questions.

Figure 32:
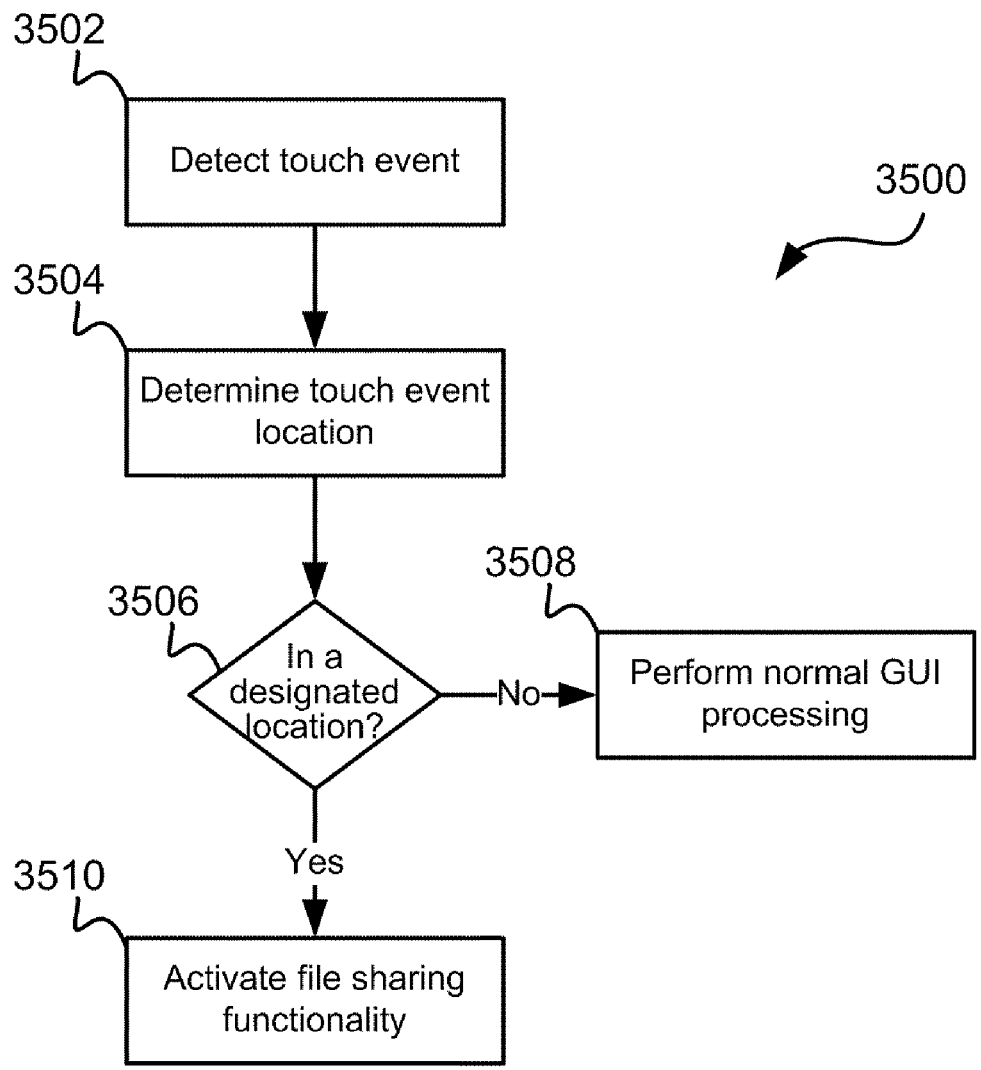
FIG. 32 is a process flow diagram of an aspect method for activating the file sharing functionality using a touch on a touch surface.
Figure 33:
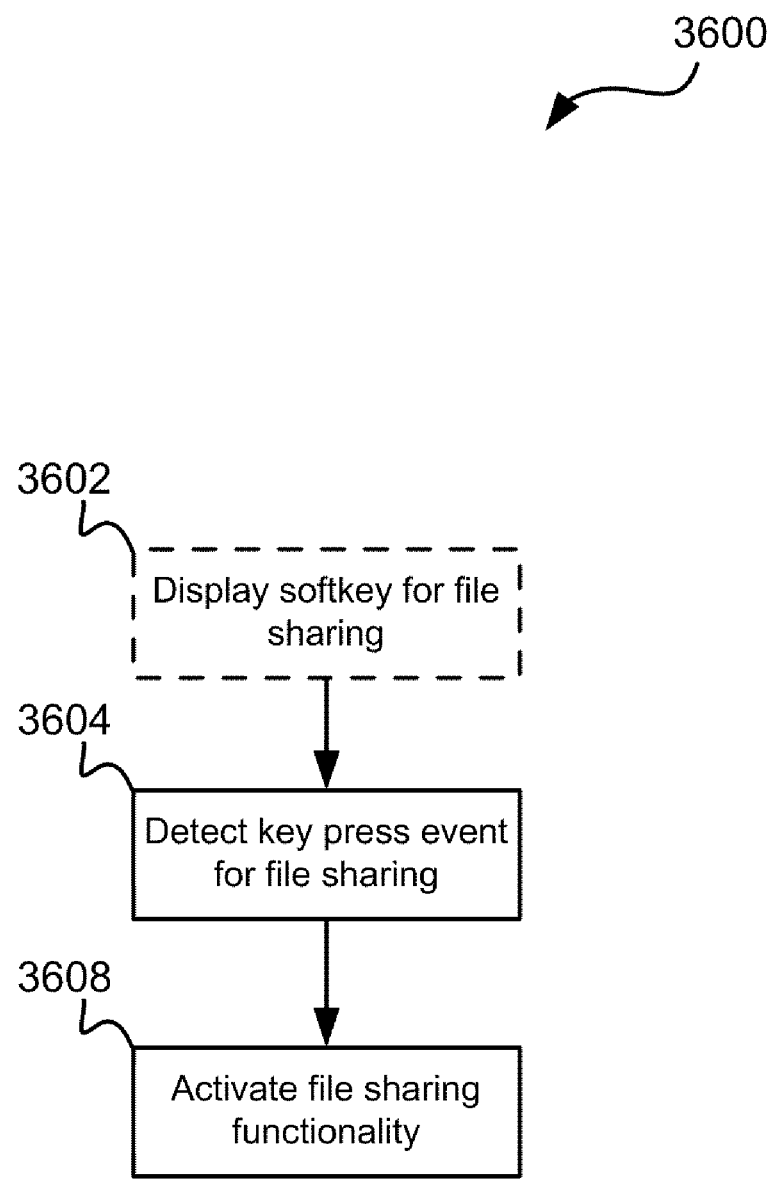
FIG. 33 is a process flow diagram of an aspect method for activating the file sharing functionality using function keys and soft keys.
Figure 34:
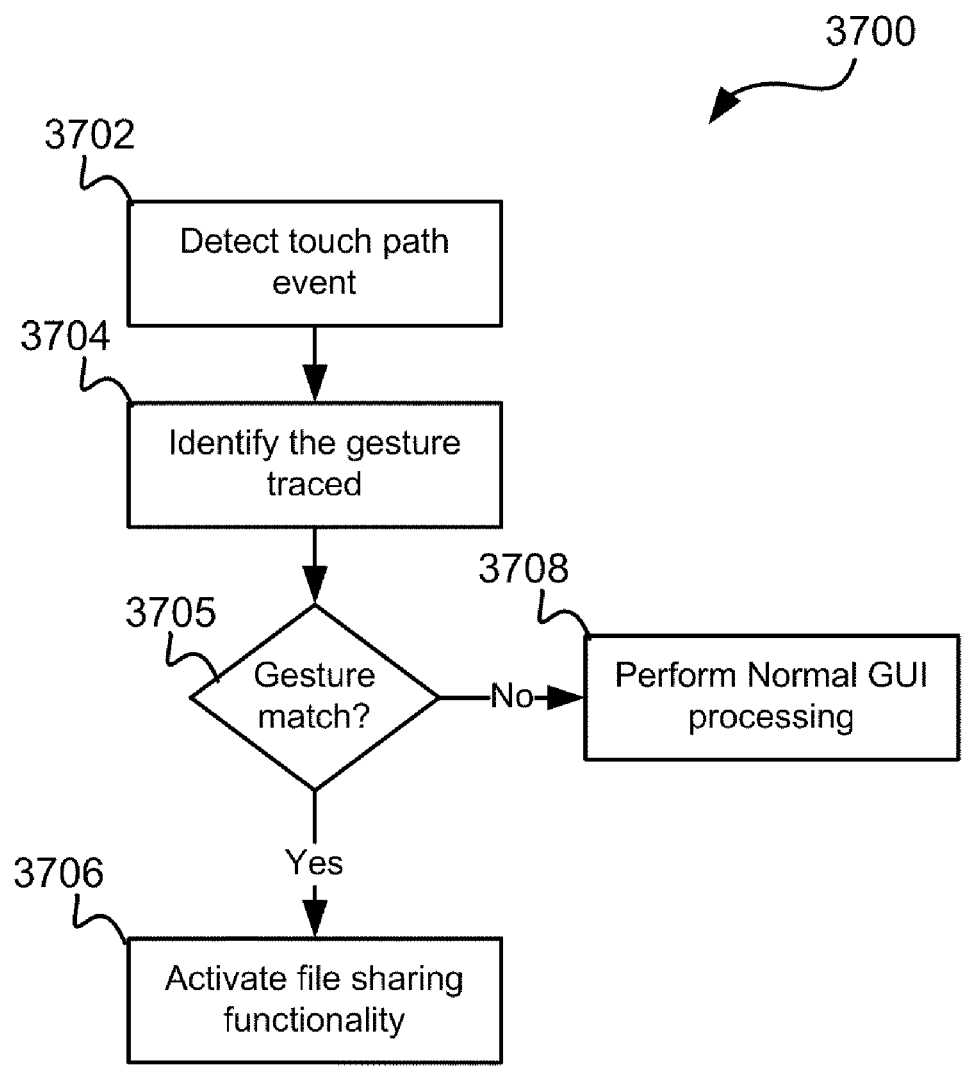
FIG. 34 is a process flow diagram of an aspect method for activating the file sharing functionality using a touch gesture.

The file sharing functionality, and the hand and flick gestures described above may be implemented using the methods described below with reference to FIGS. 32-46. FIGS. 32-34 illustrate different methods for implementing hand and flick gestures for activating the file sharing functionality.

FIG. 32 illustrates a process flow of an aspect method 3500 for activating the file sharing functionality using touch. In method 3500 at block 3502, a computing device 10 may be configured to detect a touch on the touchscreen 308, and to determine the location of the touch event at block 3504. At determination block 3506, the computing device may determine whether the touch event is within a designated area, such as in a launch pad 304. If the touch event is detected in the designated location (i.e., determination block 3506="Yes"), the computing device 10 may activate the file sharing functionality at block 3510. If the touch event is not detected in the designated location (i.e., determination block 3506="No"), the computing device 10 may perform normal graphical user interface (GUI) processing such as panning at block 3508.

FIG. 33 illustrates a process flow of an aspect method 3600 for activating the file sharing functionality in response to the press of a function key 402 or soft key 502. In method 3600 at block 3604, the computing device 10 may be configured to detect a key 402 press event for activating the file sharing functionality. Optionally, if a soft key is used to activate the file sharing functionality, the computing device 10 may be configured to display the soft key 502 at block 3602. A soft key 502 press event may also be detected for activating file sharing functionality at block 3602. At block 3608 the computing device may activate the file sharing functionality.

FIG. 34 illustrates a process flow diagram of an aspect method 3700 for activating the file sharing functionality using a pre-determined gesture traced on the touchscreen 308. A computing device 10 may be configured to detect a touch path event at block 3702, and analyze the traced path of the touch path event at block 3704 to determine whether the touch path event matches a predetermined gesture at determination block 3705. For example, an elliptical gesture may be designated to activate the file sharing functionality. If the gesture traced by the user matches the predetermined gesture correlated to the file sharing functionality (i.e. determination block 3704="Yes"), the computing device 10 may activate the file sharing functionality at block 3706. If the gesture traced by the user does not match a predetermined gesture (i.e. determination block 3704="No"), the computing device 10 may perform normal GUI processing at block 3708.

Figure 35:
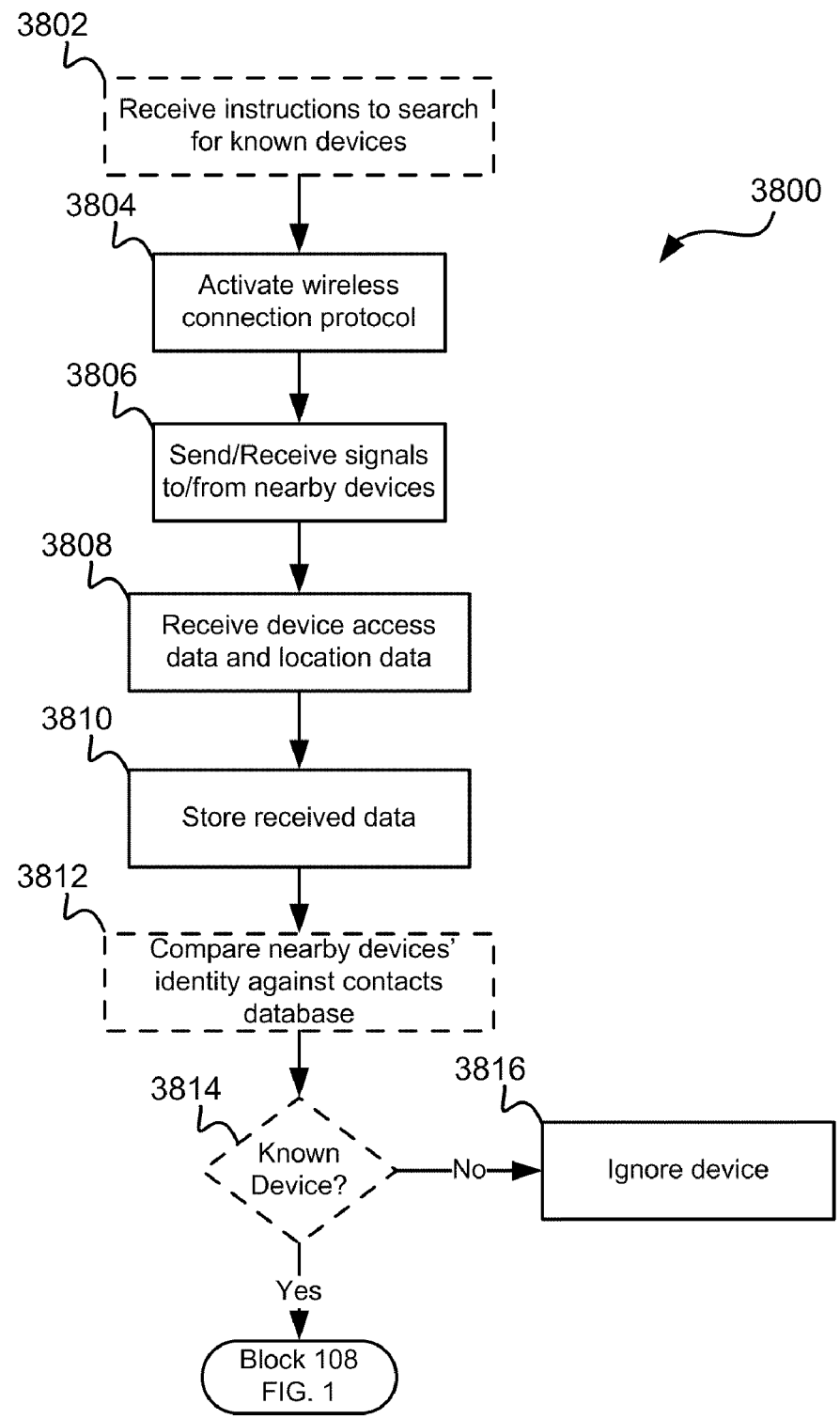
FIG. 35 is a process flow diagram of an aspect method for discovering nearby devices.

FIG. 35 illustrates a process flow of an aspect method 3800 for discovering nearby computing devices and establishing wireless communication links with discovered devices. Activation of the file sharing functionality may cause the computing device processor to activate a wireless transceiver (if not already activated) at block 3804, and to begin sending device discovery signals to and receiving response signals from nearby computing devices at block 3806, as defined by the wireless communication protocol of the activated transceiver (e.g., Bluetooth®). As discussed above, this exchange of device discovery and response signals allows nearby computing devices 10 to discover one another's presence and establish wireless communication links. As part of establishing the communication links, the computing devices may exchange access data and location data at block 3808. This exchange of device data may include identification data and photographs. For example, the computing device 10 may receive identifying data such as profile pictures of the owners of nearby computing devices at block 3808. Access data may include information that may be used by the computing device to communicate with the targeted computing device 10, such as Bluetooth® identification data, telephone numbers, and e-mail addresses. Alternatively, transmission of access data may depend on the user authorizing a file transfer operation, and thus may not occur before a computing device is authorized to receive files from a transmitting computing device. The process of requesting and granting access authorization between transmitting targeted computing devices is described in more detail below with reference to FIGS. 42-43. The computing device may store the received data at block 3810, and use the received data to determine the presence of the nearby computing device 10.

Optionally at block 3802, the computing device 10 may receive user instructions to search only for known nearby computing devices. For example, a computing device 10 may be instructed to search only for devices whose device data match those in the device's contact database. In this aspect, once nearby devices are discovered, the computing device 10 may compare the nearby devices' identity against the contact database at block 3812, to determine whether the nearby computing device is known at determination block 3814. If the detected nearby computing device is not known (i.e., determination block 3814="No"), the computing device 10 may ignore that device at block 3816. If the detected nearby computing device is known (i.e., determination block 3814="Yes"), the computing device 10 may determine the location of the nearby device at block 108 in FIG. 1.

The location of computing devices 10 may be determined using various methods. For example, Global Positioning System (GPS) coordinate data receivers received from nearby computing devices may be used to determine their location relative to the device's own location. Alternatively or in addition, signal triangulation methods may be used in determining the relative location of the nearby computing devices 10.

Figure 36:
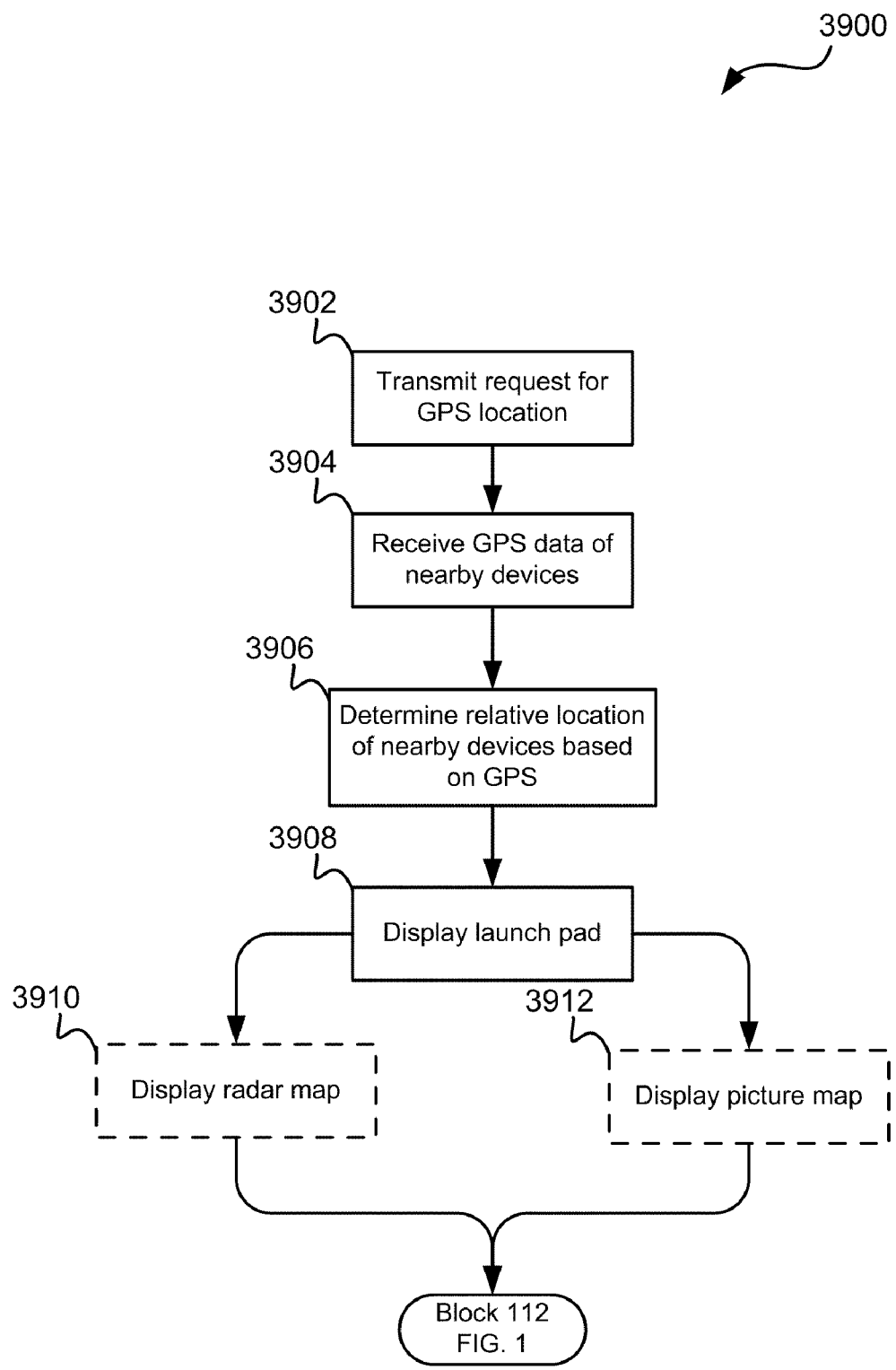
FIG. 36 is a process flow diagram of an aspect method for requesting location data from and displaying the relative location of the nearby devices with respect to the computing device.

FIG. 36 illustrates a process flow of an aspect method 3900 for determining location using GPS coordinates. In method 3900 at block 3902 the computing device 10 may send a request for location data from the nearby computing devices 10, and receive GPS coordinates from nearby computing devices 10 equipped with GPS navigation receivers at block 3904. The requesting computing device 10 may determine the relative location of nearby devices based on the received GPS data and position information obtained from the device's own GPS receiver at block 3906. At block 3908, the computing device may display a launch pad 304 image to indicate to the user that device is ready for receiving user commands for file sharing. The computing device 10 may then detect a file sharing gesture at block 112 in FIG. 1.

Optionally, the computing device 10 may employee different GUI displays to show the relative locations of nearby computing devices 10. For example, the computing device 10 may display a radar map 802 including graphical indicators that show the location of all the nearby computing devices 10 with respect to the location of the computing device 10 at block 3910. Alternatively, the computing device 10 may display a picture map including pictures of the owners of the nearby computing devices 10 at block 3912. The computing device 10 may then detect a file sharing gesture at block 112 in FIG. 1.

Figure 37:
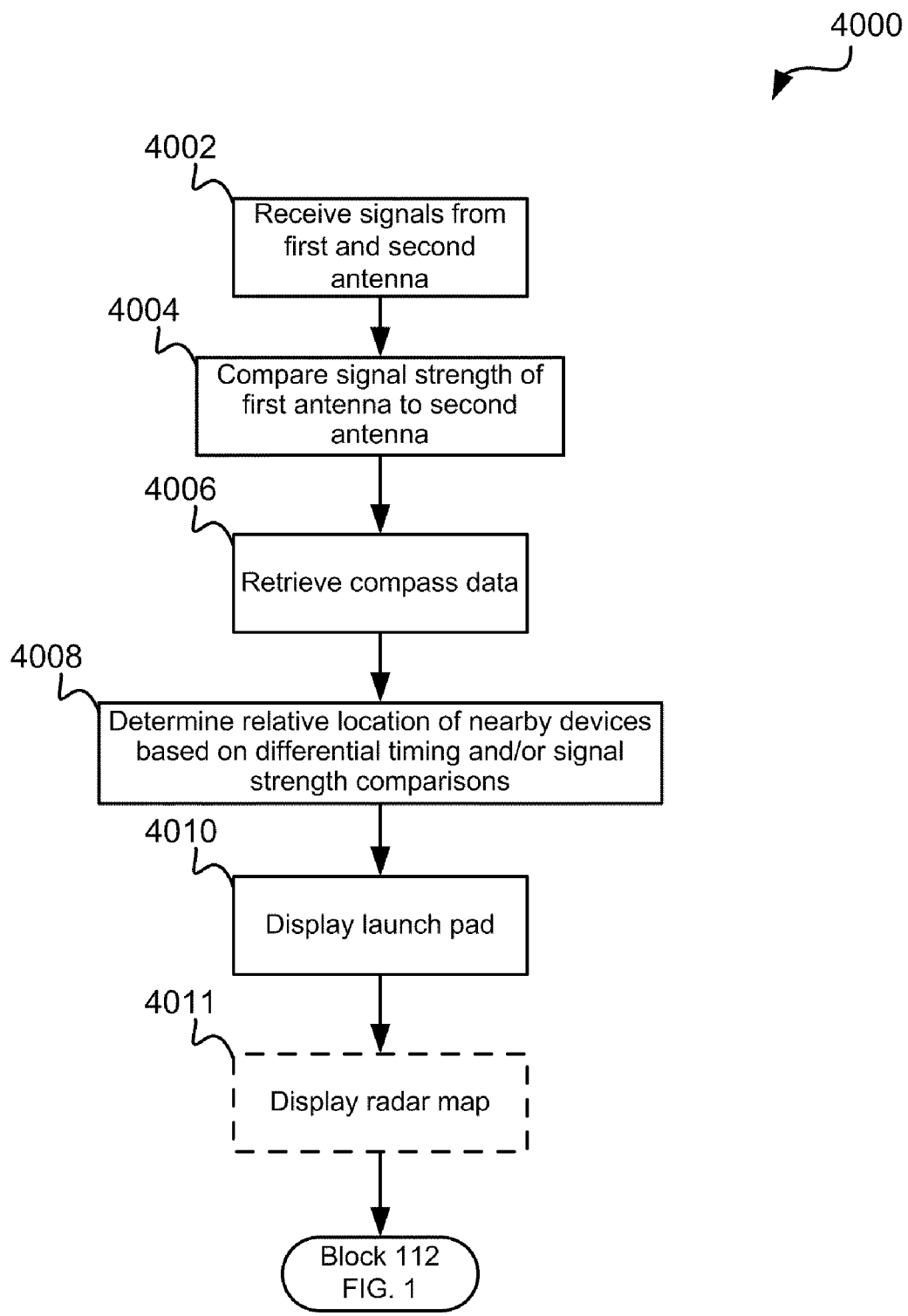
FIG. 37 is a process flow diagram of an aspect method for determining locations of nearby devices using signal triangulation.

FIG. 37 illustrates a process flow diagram of an aspect method 4000 for determining the relative location of nearby computing devices 10 using triangulation. Computing devices 10 may include two antennas and a compass to enable determination of the location of nearby devices using triangulation. The computing devices 10 may receive signals on a first and a second antenna at block 4002, and compare the timing or signal strength of signals received by the two antennas at block 4004. The computing device 10 may also receive data from the compass sensor at block 4006, and determine the relative location of nearby devices based on differential timing and/or signal strengths and the compass data at block 4008. The triangulation analyses that can be used to determine relative locations are well known. Once the location of the nearby computing devices 10 is determined, at block 4010 the computing device 10 may display a launch pad 304 to allow the user to trace file sharing gestures. The computing device 10 may then detect a file sharing gesture at block 112 in FIG. 1. Optionally, at block 4011 the computing device 10 may display a radar map 802 display, including graphical indicators to show the relative location of the nearby computing devices with respect to the computing device 10.

Once file gesture functionality is activated and nearby computing devices are discovered, different gestures may be used command the computing device 10 to share files with nearby computing devices 10. These gestures may include those that require the user to move the computing device 10, and those that require the user to trace a shape on the touchscreen 308 of the computing device 10 using a finger 306.

Figure 38:
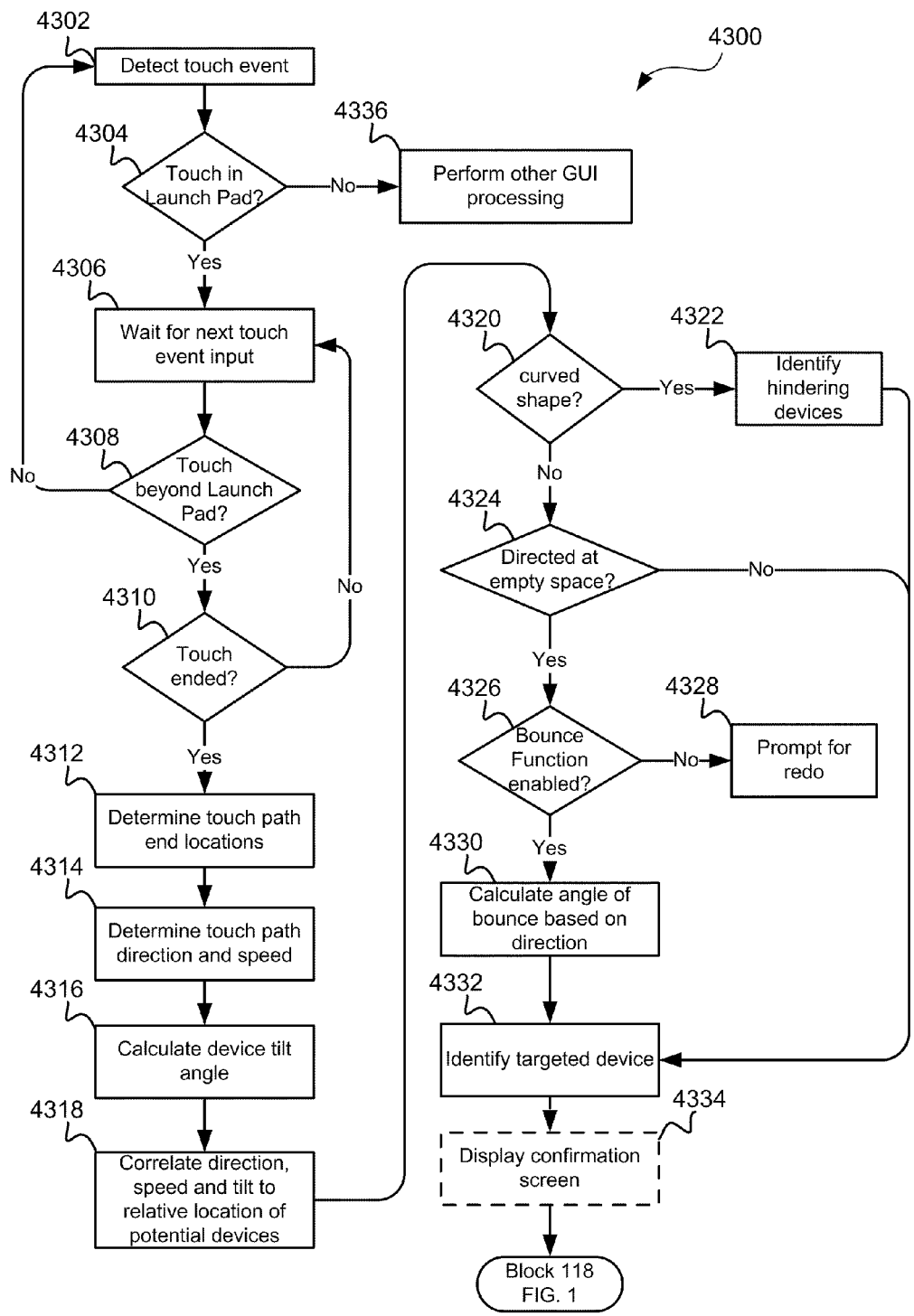
FIG. 38 is a process flow diagram of an aspect method for initiating transmitting files based on touch gestures.

FIG. 38 illustrates a process flow of an aspect method 4300 for recognizing and interpreting a flick gesture for initiating a file sharing process. In method 4300 at block 4302, the computing device 10 may detect a touch event and determine whether the touch is in the launch pad 304 at determination block 4304. If the touch event is not within the launch pad 304 (i.e., determination block 4304="No"), the computing device 10 may perform other GUI processing at block 4336. If the touch is in the launch pad 304 (i.e., determination block 4304="Yes"), the computing device 10 may wait to detect the next touch event input at block 4306, and determine whether the touch goes beyond the launch pad 304 area at determination block 4308. If the touch path event does not go beyond the launch pad 304 area (i.e., determination block 4308="No"), the computing device 10 may detect a touch event by return to block 4302.

If the touch path event goes beyond the launch pad 304 area (i.e., determination block 4308="Yes"), the computing device 10 may determine whether the touch event has ended at determination block 4310. If the touch event has not ended (i.e., determination block 4310="No"), the computing device may wait for next touch event input by returning to block 4306. If the touch has ended (i.e., determination block 4310="Yes"), the computing device 10 may determine the touch path event end location at block 4312, determine the touch path event direction and speed at block 4314, and calculate the computing device's tilt angle based upon accelerometer sensor data at block 4316. At block 4318 the computing device process may use the direction and speed of the flick gesture, and the measured tilt angle of the device to calculate a ballistic trajectory, and use that result to correlate the gesture to a particular relative nearby computing devices. To calculate tilt angles, the computing device 10 may include a set of accelerometers that can sense the gravity gradient and provide such measurements to the processor for use in simple geometric calculations. At determination block 4320 the computing device 10 may determine whether the touch path event traces a curved shape. If the traced touch path event is determined to be curved (i.e., determination block 4320="Yes"), the computing device may identify the intended recipient computing device based on the measured path curvature, direction, speed, and device tilt angle at block 4322, and the relative locations of other computing device 10 at block 4332. Once the targeted device is identified, the computing device 10 may initiate the processes to transmit the file to the targeted computing device at block 118 in FIG. 1. Optionally, at block 4334 the computing device 10 may display a prompt requesting the user to confirm that the correct device has been identified as the targeted computing device at block 4334 before the file is transmitted.

If the traced touch path event is not curved (i.e., determination block 4320="No"), the computing device 10 may determine whether the touch path event is directed towards empty space at determination block 4324. This determination may be based on the relative locations of nearby computing devices 10 as determined by the transmitting computing device 10. If the traced touch path event is not directed at an empty space (i.e., determination block 4324="No"), the computing device 10 may identify the targeted device based on the direction and speed of the touch path event, and the tilt angle of the computing device 10 at block 4332. Once the targeted device is identified, the computing device 10 may transmit the file to the targeted device at block 118 in FIG. 1. Optionally, at block 4334 the computing device 10 may display a prompt requesting the user to confirm that the correct device has been identified as the targeted computing device at block 4334 before the file is transmitted.

If the traced touch path event is directed at an empty space (i.e. at determination block 4324="Yes"), the computing device 10 may determine whether the bounce functionality is enabled at determination block 4326. If the bounce functionality is not enabled (i.e., determination block 4326="No"), the computing device 10 may prompt the user to retrace the gesture at block 4328. If the bounce functionality is enabled (i.e., determination block 4326="Yes"), the computing device may calculate the angle of the bounce based in the direction of the traced path at block 4330, and identify the targeted computing device at block 4332. Once the targeted computing device is identified, the computing device 10 may begin the processes to transmit the file to the targeted device at block 118 in FIG. 1. Optionally, at block 4334 the computing device 10 may display a prompt requesting the user to confirm that the correct device has been identified as the targeted computing device at block 4334 before the file is transmitted.

Figure 39:
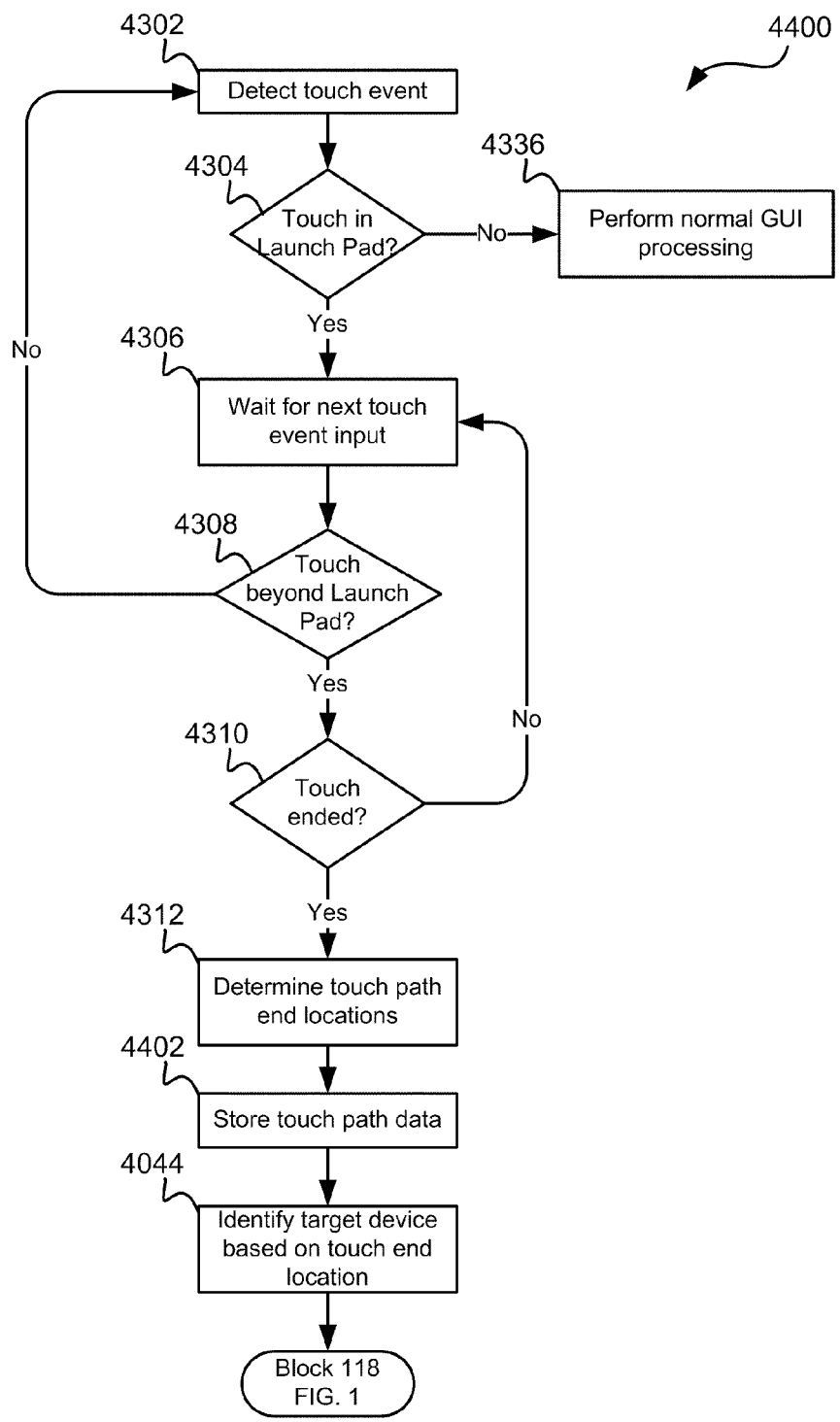
FIG. 39 is a process flow diagram of an aspect method for initiating transmitting files based on drag-and-drop touch gestures.

FIG. 39 illustrates a process flow of an aspect method 4400 for implementing drag-and-drop gesture to identify a nearby computing device 10 to which files may be transmitted. In method 4400 at block 4302, the computing device 10 may detect a touch event and determine whether the touch is within the launch pad 304 at determination block 4304. If the touch event is not in the launch pad 304 (i.e., determination block 4304="No"), the computing device 10 may perform other GUI processing at block 4336. If the touch it is in the launch pad 304 (i.e., determination block 4304="Yes"), the computing device 10 may wait to detect the next touch event input at block 4306, and determine whether a touch event goes beyond the launch pad 304 area at determination block 4308. If the touch path event does not go beyond the launch pad 304 area (i.e., determination block 4308="No"), the computing device 10 may detect a touch event by returning to block 4302.

If the touch path event goes beyond the launch pad 304 area (i.e., determination block 4308="Yes"), the computing device 10 may determine whether the touch event has ended at determination block 4310. If the touch event has not ended (i.e., determination block 4310="No"), the computing device may wait for the next touch event by returning to block 4306. If the touch event has ended (i.e., determination block 4310="Yes"), the computing device 10 may determine the touch path event end location at block 4312, store touch path data at block 4402, and identify the targeted device based on the touch end location at block 4044. Once the targeted device is identified, the computing device 10 may initiate the processes to transmit the files to the targeted device at block 118 in FIG. 1.

Figure 40:
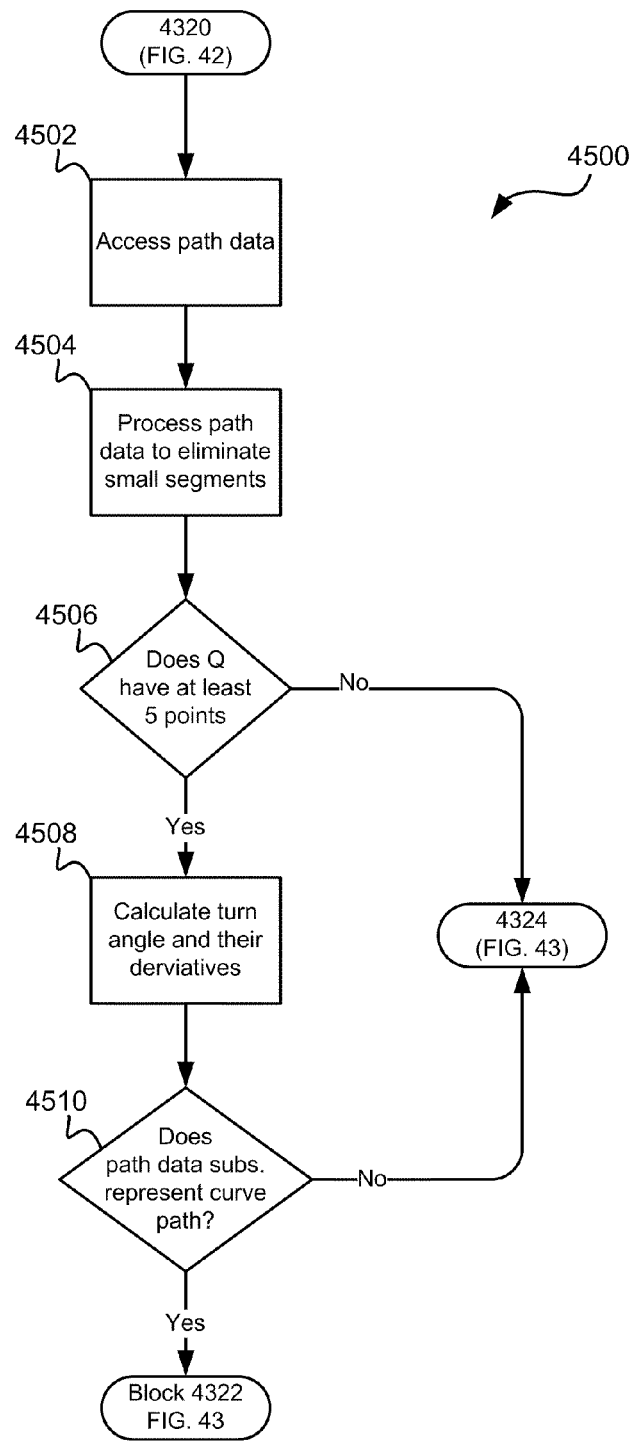
FIG. 40 is a process flow diagram of an aspect method for determining whether a traced touch gesture is ellipsoidal.

FIG. 40 illustrates a process flow diagram of an aspect method 4500 for determining whether a traced path is curved in shape included in block 4320 of FIG. 38. The computing device processor may access path data stored in memory at block 4502, and may process the data using known methods to interpolate among small path segments to "smooth" the path at block 4504. Once the small segments have been smoothed, the processor may determine whether the smoothed path data includes a series of touch locations Q including at least a minimum number of points, such as a minimum of five points, at determination block 4506. In alternative aspects, the minimum number of stroke point array Q may be 3, 10 or more points. If the series of touch locations Q does not include the minimum number of touch points (i.e., determination block 4506="No"), the path data processing may continue as if the path is not an ellipsoid-type or is an ambiguous shape, such as with normal GUI processing at block 4324 in FIG. 38. However, if the series of touch locations Q includes the minimum number of points (i.e., determination block 4506="Yes"), the processor may calculate the turn angles and the derivatives of the turn angles of the traced path using the path data stored in memory at block 4508. By using known methods, the processor may then determine whether the path data represents a curve touch path event at determination block 4510. If the path data does not represent a curved touch path event (i.e., determination block 4510="No") the path data is assumed not to constitute a curved shape and the processing of the flick gesture may continue at block 4324 in FIG. 38. If the path data is determined to represent a curved shape (i.e., determination block 4510="Yes"), the process continues at block 4322 to identify intervening computing devices as described above with reference to FIG. 38.

Figure 41:
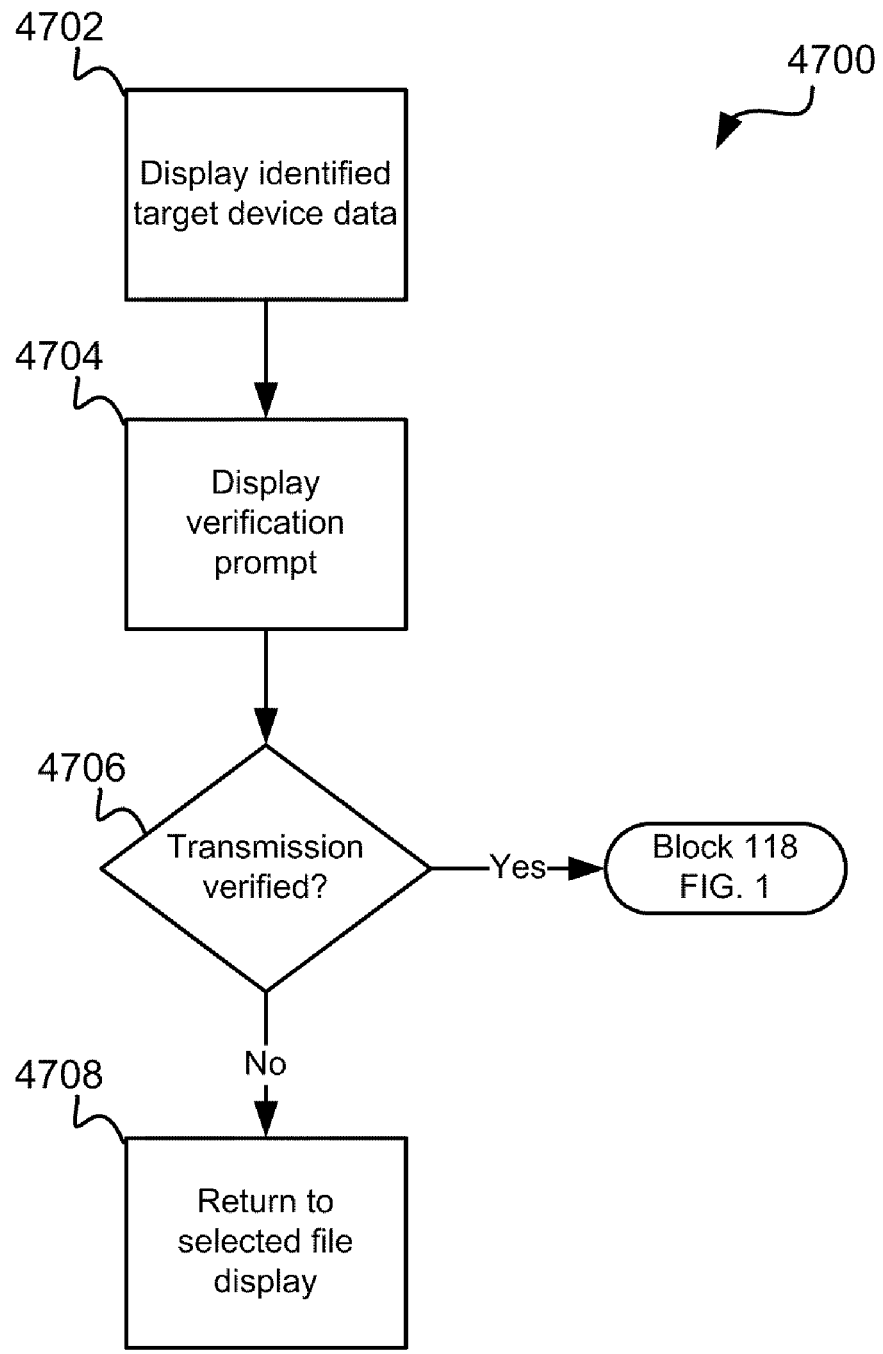
FIG. 41 is a process flow diagram of an aspect method for verifying identities of nearby devices.

Optionally, the transmitting computing device 10 may be configured to prompt the user to verify the identity of the targeted computing device 10 before beginning the processes for transmitting the file. FIG. 41 illustrates a process flow of an aspect method 4700 for prompting a device user to verify the identity of the targeted computing device 10 before transmitting a file. The computing device 10 may be configured to display identifying information about the targeted computing device at block 4702, and display a verification prompt at block 4704. Identifying information may include the location of the targeted computing device in a radar map 802, a picture profile of the owner of the targeted computing device and the cellular telephone number of the targeted computing device. For example, once a targeted computing device is identified, the computing device may provide the location of that identified device on the radar map 802. Because the location of nearby computing devices is displayed relative to the transmitting computing device 10, a user may verify the identity of the targeted computing device by comparing its position on the displayed radar map 802 to the position of the other nearby device users. The computing device 10 may determine whether file transmission is verified by the user based upon an appropriate user input at determination block 4706. If file transmission is verified by the user (i.e., determination block 4706="Yes"), the computing device 10 may begin the process of transmitting the file to the targeted computing device at block 118 in FIG. 1. If file transmission is not verified by the user (i.e., determination block 4706="No"), computing device 10 may returned to the selected file display at block 4708.

Figure 42:
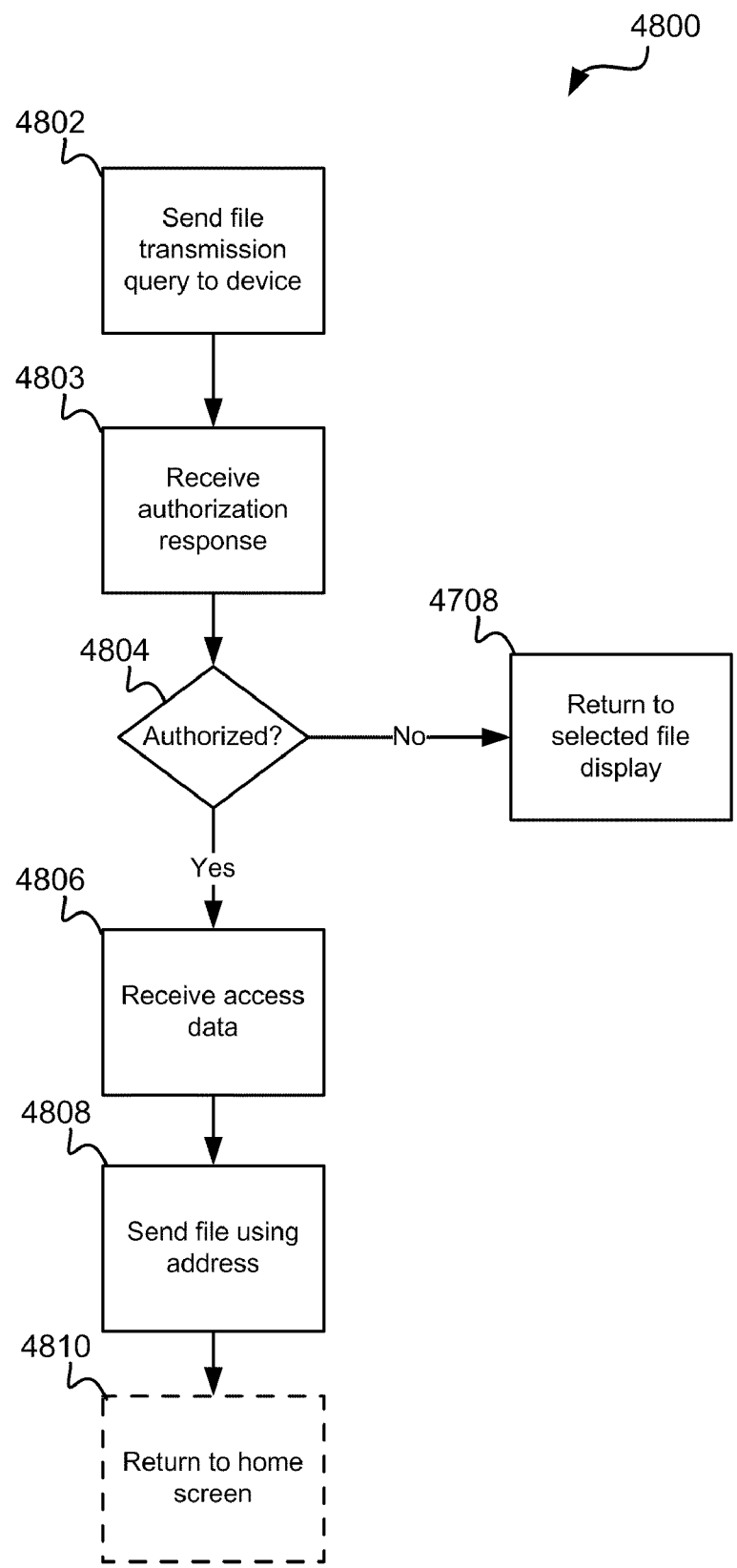
FIG. 42 is a process flow diagram of an aspect method for obtaining user authorization of file transmissions.

FIG. 42 illustrates a process flow of an optional aspect method 4800 for requesting authorization access data on a targeted computing device 10. In method 4800 at block 4802, the transmitting computing device 10 may send a file transmission query to the targeted computing device before transmitting a file. The computing device may receive an authorization response from the targeted computing device at block 4803, and determine whether authorization is granted at determination block 4804. If authorization is not granted in the response (i.e., determination block 4804="No"), a computing device 10 may returned to the selected file display at block 4708. If authorization is granted in the response (i.e., determination block 4804="Yes"), the computing device 10 may receive access data as part of the response, such as an address or authorization number at block 4806. At block 4808, the computing device may use the received access data to transmit the selected files to the targeted computing device. As discussed above, the method used to transmit the selected files may depend on access data received from the targeted computing device. For example, if the access data includes a telephone number, the transmitting computing device 10 may transmit the selected file as SMS or MMS messages. Optionally, once a selected file is transmitted, the transmitting computing device may return to the home screen at block 4810.

Figure 43:
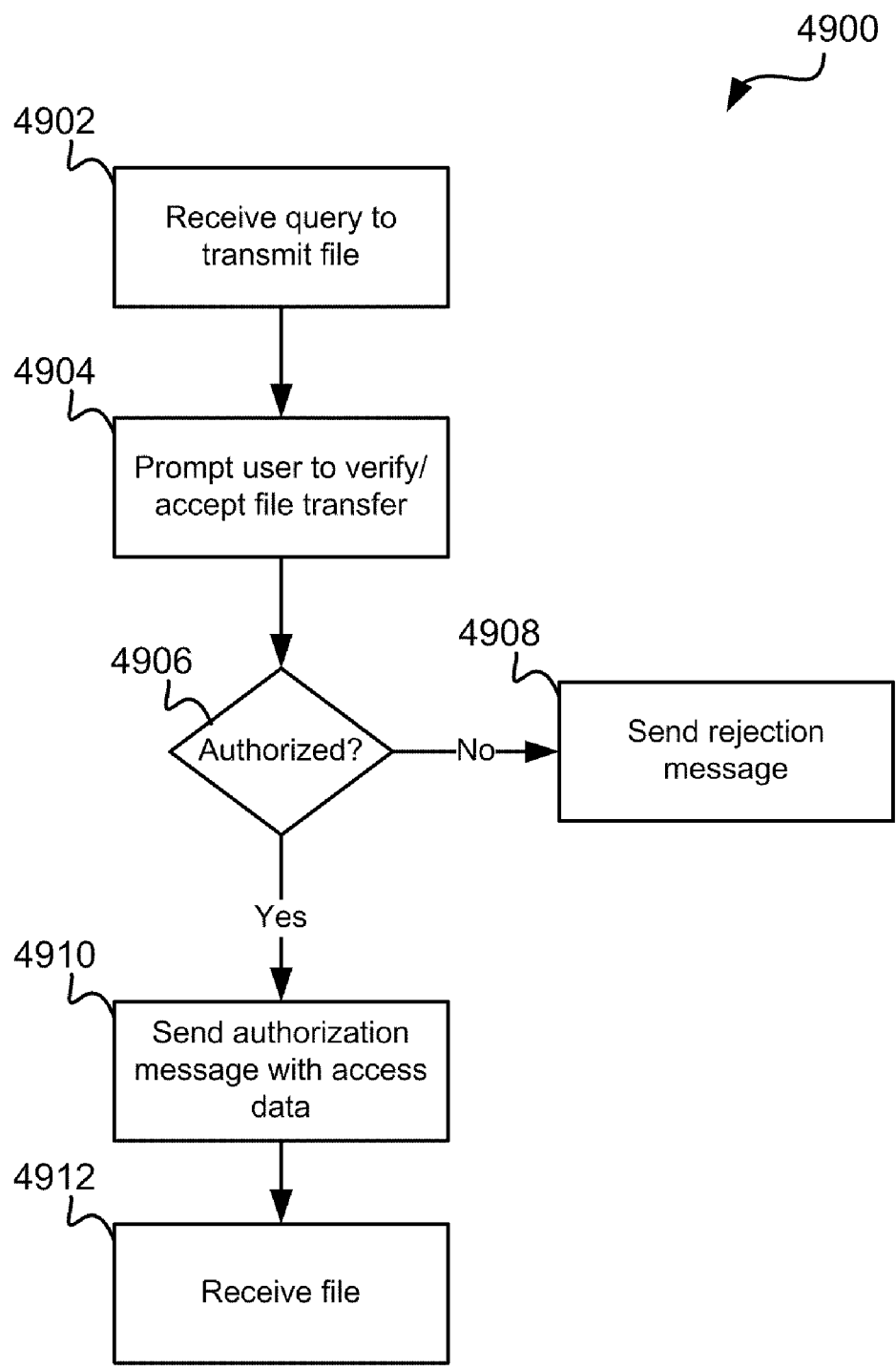
FIG. 43 is a process flow diagram of an aspect method for obtaining user authorization to receive file transmissions.

FIG. 43 illustrates a process flow of an optional aspect method 4900 for authorizing and sending access data to a transmitting computing device 10. In method 4900 at block 4902, the targeted computing device may receive a message from the transmitting computing device 10 requesting permission to transmit files to it. At block 4904, the targeted computing device 10 may generate a display prompting the user to authorize or deny this request. The targeted computing device 10 may receive the user input via a GUI selection and determine whether the user authorized receiving file transmissions at determination block 4906. If authorization is denied by the user (i.e., determination block 4906="No"), the targeted computing device 10 may send a rejection message to the transmitting computing device 10 at block 4908. If authorization is granted (i.e., determination block 4906="Yes"), the targeted computing device 10 may send an authorization response along with appropriate access data at block 4910. The targeted computing device 10 may receive the file from the transmitting computing device at block 4912. In an aspect, the authorization prompt presented to the user may further offer the user choices for how files should be transmitted. For example, a menu prompt may enable the user to choose among receiving the files as an SMS or MMS message, as an attachment to an e-mail message or as a direct file transfer via the established wireless communication link. The targeted computing device may receive the user's selection and include the appropriate address within the access data transmitted along with the response message. The transmitting computing device then uses the access data to transmit the files using the transmission method selected by the targeted user.

Figure 44:
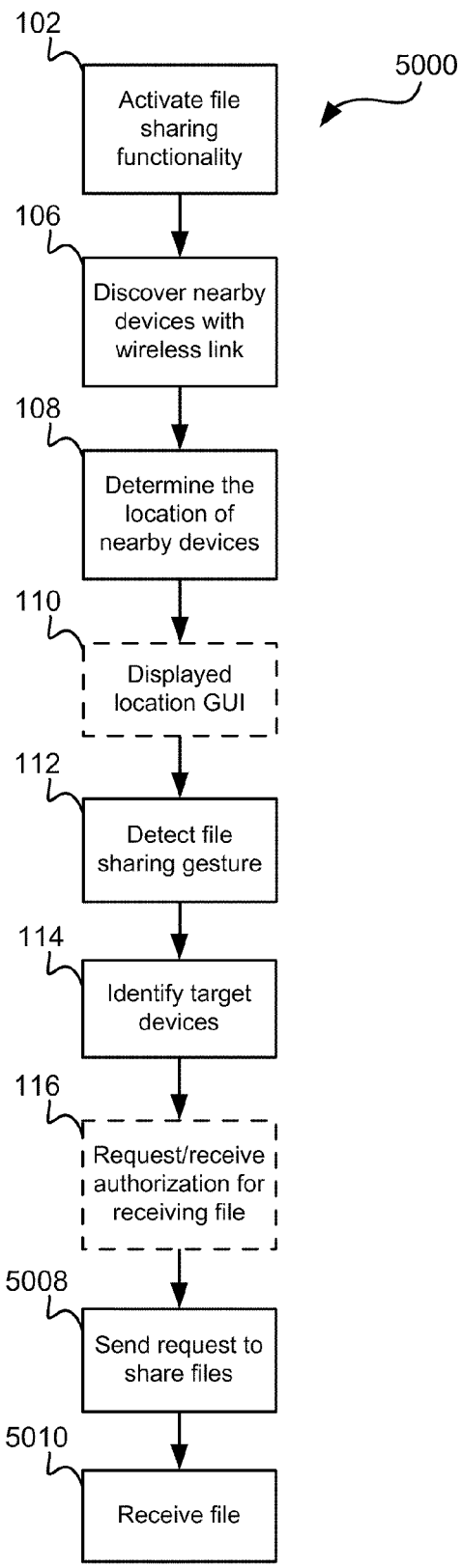
FIG. 44 is a process flow diagram of an aspect method for implementing a file request functionality.

FIG. 44 illustrates a process flow of an aspect method 5000 for requesting files from targeted computing devices 10. In method 5000 at block 102, a computing device 10 may activate the file sharing functionality. Activation of the file sharing functionality may prompt the computing device 10 to discover nearby devices at block 106, and to determine the location of the nearby computing devices based upon received responses at block 108. Optionally, at block 110, once locations of the nearby devices are determined, the computing device 10 may display a radar map 802 indicating the relative locations of discovered nearby computing devices. At block 112 the computing device 10 may detect a file sharing gesture (e.g., a self-directed flick gesture) traced on the touchscreen 308, as described above with reference to FIG. 1. At block 114, the computing device may identify the nearby computing device targeted for a request for files based on the parameters of the detected file sharing gesture and the locations of nearby computing devices. At block 5008, the requesting computing device may send a message to the targeted computing device requesting files, and receive files from the targeted computing device 10 at block 5010. Optionally, the computing device may be configured to request and receive authorization for receiving files from the targeted device at block 116 in FIG. 1.

Figure 45:
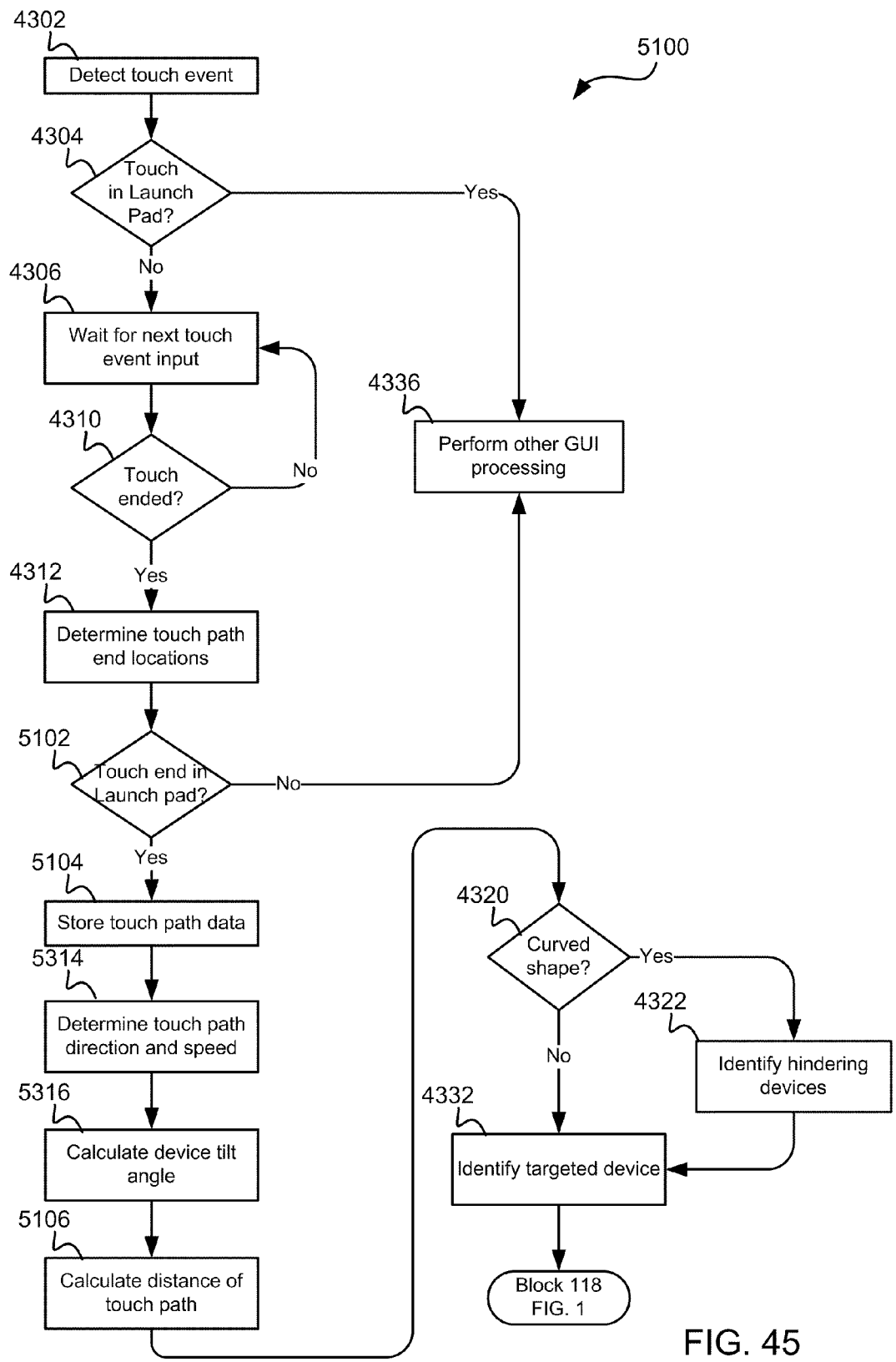
FIG. 45 is a process flow diagram of an aspect method for requesting file transmissions using a touch gesture.

FIG. 45 illustrates a process flow of an aspect method 5100 for detecting and identifying file sharing gestures for requesting files when the computing device has the request file sharing functionality activated. In method 5100 at block 4302, the computing device 10 may detect a touch event, and determine whether the touch is within the launch pad 304 at determination block 4304. If the touch event is in the launch pad 304 (i.e., determination block 4304="Yes"), the computing device 10 may perform other GUI processing at block 4336. Note that this logic is opposite to that presented in the method described above with reference to FIG. 38 which related to a transmit file sharing functionality. If the touch it is not in the launch pad 304 (i.e., determination block 4304="No"), the computing device 10 may wait to detect the next touch event input at block 4306, and determine whether the touch is ended at determination block 4310. If the touch has not ended (i.e., determination block 4310="No"), the computing device 10 may wait for a next touch event input, returning to block 4306. If the touch has ended (i.e., determination block 4310="Yes"), the computing device 10 may determine the touch path event end location at block 4312, and determine whether the touch ends in the launch pad 304 at determination block 5102. If the touch does not end in the launch pad 304 (i.e., determination block 5102="No"), the computing device 10 may perform other GUI processing at block 4336.

If the touch event ends in the launch pad 304 (i.e., determination block 5102="Yes"), the computing device 10 may store the touch path data at block 5104. The computing device 10 may determine the touch path direction and speed at block 5314, calculate the device tilt angle at block 5316, and calculate the length of the touch path based on the direction, speed, and the tilt angle values at block 5106. The computing device 10 may determine whether the touch path event traces a curve shaped gesture at determination block 4320. If the traced touch path event trace is a curve shaped gesture (i.e., determination block 4320="Yes"), the computing device 10 may identify intervening nearby computing devices at block 4322, and identify the targeted device based on the calculated the distance of the touch path event at block 4332. At block 118 in FIG. 1, the computing device may then begin the processes of transmitting the file to targeted device. If the traced touch path event is not a curve shaped gesture (i.e., determination block 4320="No"), the computing device 10 may identify the targeted device based on the calculated distance of the touch path event at block 4332, and begin the processes for transmitting the file to the targeted device at block 118 in FIG. 1.

Figure 46:
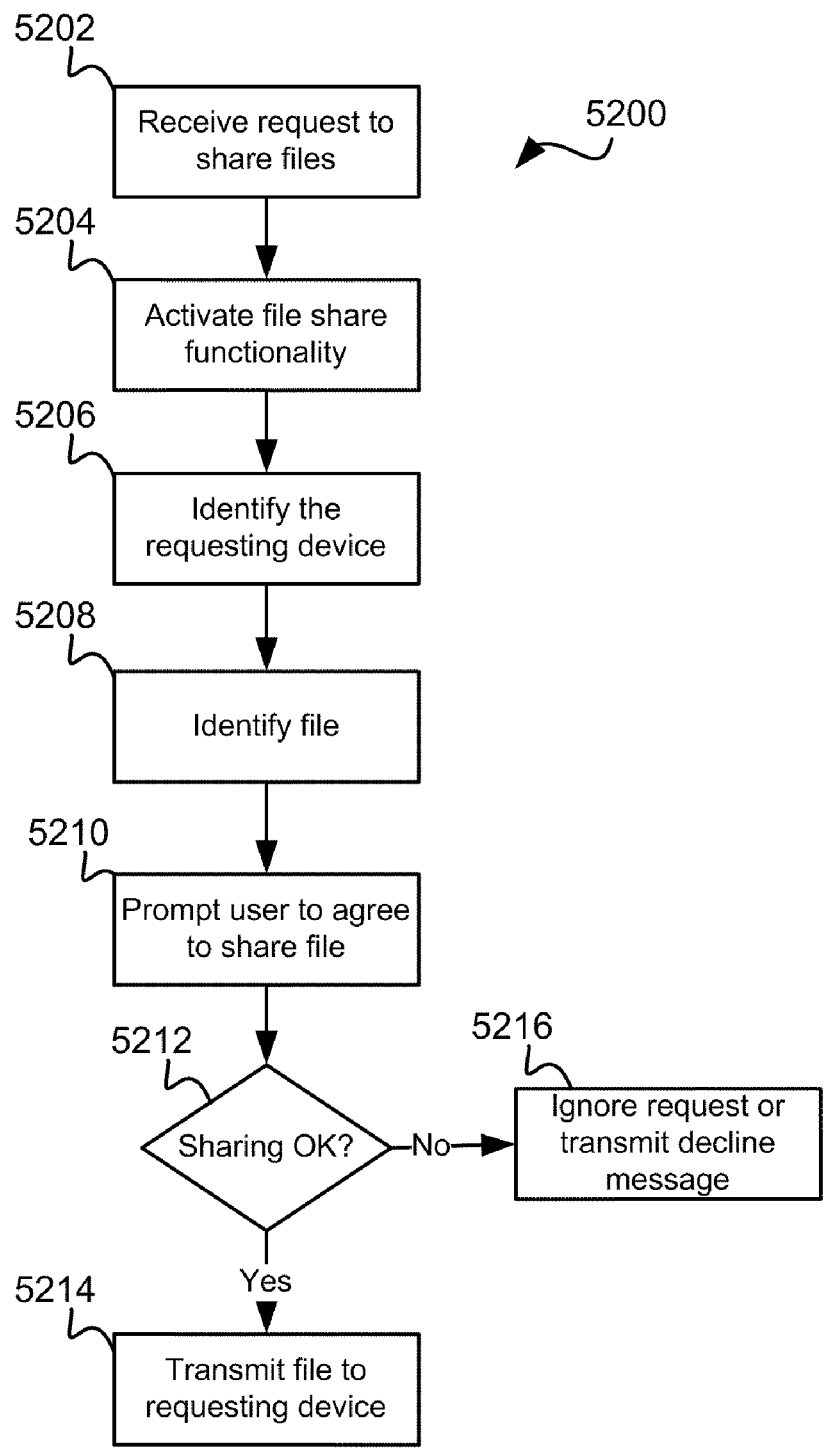
FIG. 46 is a process flow diagram of an aspect method for transmitting files in response to a file sharing request.

FIG. 46 illustrates a process flow of an aspect method 5200 for receiving a request to share files and transmitting a file to the requesting computing device 10. In method 5200 at block 5202, the request receiving computing device may receive a request to share files, and in response may activate the file sharing functionality at block 5204, and identify the requesting device at block 5206. At block 5208 the request-receiving computing device 10 may identify a file that may be transmitted to the requesting computing device 10. The file may be identified based on the designations received from the requesting computing device such as a picture, phone number, specific document, another person's contact number, or a response to a question. At block 5210 the request receiving computing device may display a prompt requesting the user to authorize transmitting the identified file to the identified requesting computing device. This prompt may identify the requesting computing device using any of the methods described in the various aspects, including, for example, a radar map, a user name, a user photograph, etc. At determination block 5212, the request receiving computing device may determine whether the user has agree to file sharing or declined to share the identified file with the identified computing device. If the user has agreed to share the file (i.e., determination block 5212="Yes"), the request-receiving computing device may begin the process of transmitting the identified file to the requesting computing device 10 at block 5214. If the user has not agreed to share the file (i.e., determination block 5212="Yes"), the request receiving computing device may ignore the request or transmit a message declining the request at block 5216.

In a further aspect a computing device to which a file is transmitted may be configured to redirect the file to another computing device if it is busy, such as involved in a telephone call or transmitting data. In a further aspect, a network delivering a file to the targeted computing device may be configured to redirect the file to another computing device if the targeted computing device is busy, such as involved in a telephone call or transmitting data.

Figure 47:
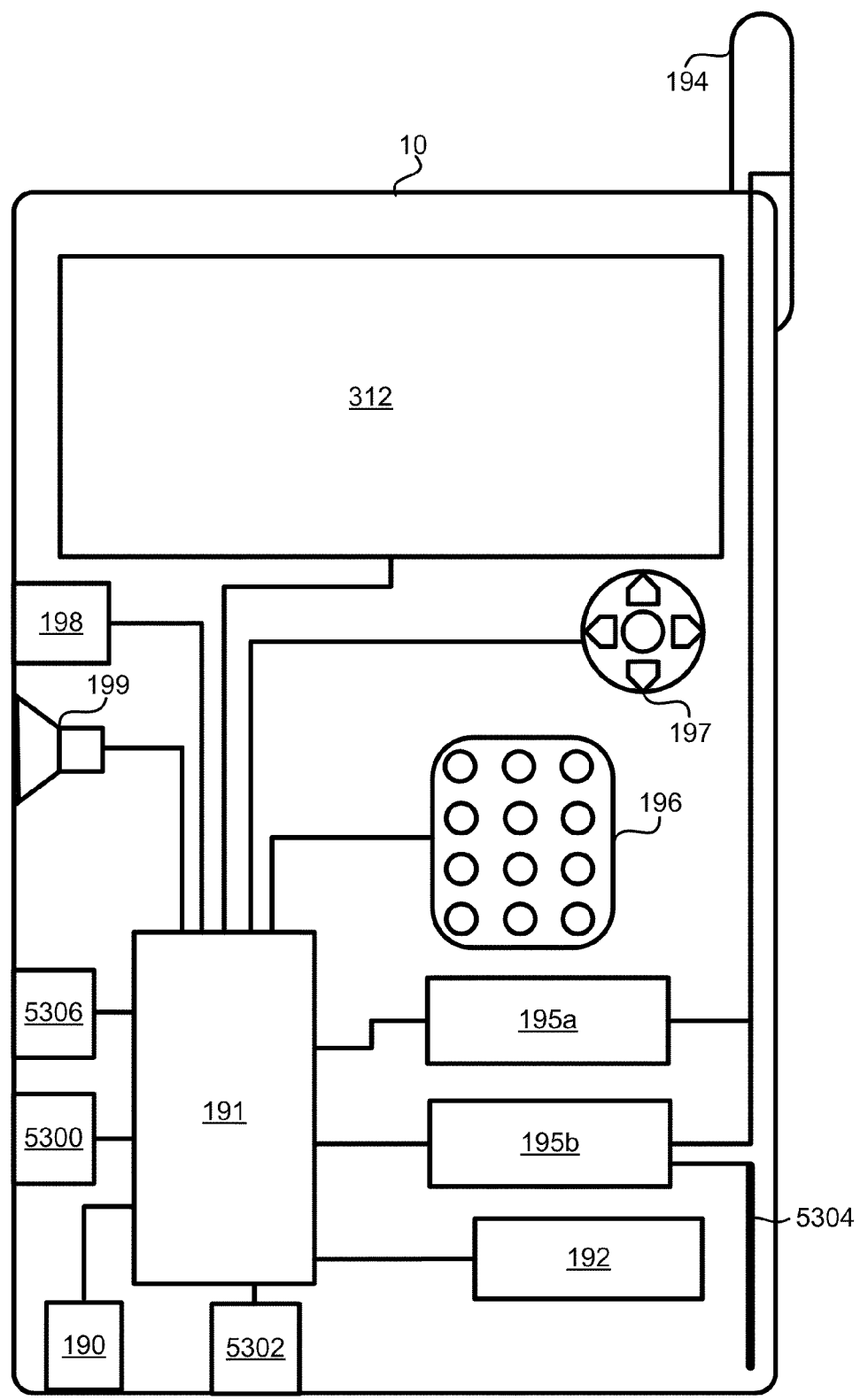
FIG. 47 is a component block diagram of an example portable computing device suitable for use with the various aspects.

The aspects described above may be implemented on any of a variety of portable computing devices 10. Typically, such portable computing devices 10 will have in common the components illustrated in FIG. 47. For example, the portable computing devices 10 may include a processor 191 coupled to internal memory 192 and a touch surface input device. The touch surface input device may be any type of touchscreen display 312, such as a resistive-sensing touchscreen, capacitive-sensing touchscreen, infrared sensing touchscreen, acoustic/piezoelectric sensing touchscreen or the like. The various aspects are not limited to any particular type of touchscreen display 312 or touchpad technology. Additionally, the portable computing device 10 may have an antenna 194 for sending and receiving electromagnetic radiation that is connected to one or more wireless transceivers 195*a*, 195*b* coupled to the processor 191. For example, one wireless transceiver 195*a* may be cellular telephone transceiver 195*a* configured to establish a wireless communication link with a cellular telephone and data communication network, and another may be a Bluetooth® transceiver configured to establish wireless communication links with other Bluetooth® enabled computing devices. Portable computing devices 10 which do not include a touchscreen input device 312 typically include a key pad 196 or miniature keyboard and menu selection keys or rocker switches 197 which serve as pointing devices. The processor 191 may further be connected to a wired network interface 198, such as a universal serial bus (USB) or FireWire® connector socket, for connecting the processor 191 to an external touchpad or touch surfaces or external local area network. The computing device 10 may further include a microphone 199 coupled to the processor 191 to receive voice and commands from the user.

The computing device 10 may further include other circuit components and sensors to enable the file sharing functionality of the various aspects. An accelerometer sensor assembly 190 may be coupled to the processor 191 to detect acceleration of the computing device. Such an accelerometer sensor assembly 190 may include three accelerometers configured to sense accelerations along three mutually perpendicular directions. A gyroscope sensor 5300 may be coupled to the processor 191 to detect rapid rotational movements of the computing device 10. An electronic compass sensor 5302 may be coupled to the processor to detect the direction in which the computing device is pointing with respect to the Earth's magnetic field. In an aspect, the computing device 10 may also include a second antenna 5304 coupled to one of the wireless transceivers 195*b* to enable the transceiver 195*b* or processor to compare the timing and/or signal strength of signals received from nearly computing devices to support triangulation calculations. A GPS receiver 5306 may also be coupled to the processor 191 to determine the location of a computing device. In an aspect, the GPS receiver 5306 and the processor 191 may be configured to determine location using enhanced GPS services supported by a cellular telephone network.

In some implementations, a touch surface can be provided in areas of the computing device 10 outside of the touchscreen display 312. For example, the keypad 196 can include a touch surface with buried capacitive touch sensors. In other implementations, the keypad 196 may be eliminated so the touchscreen display 312 provides the complete GUI. In yet further implementations, a touch surface may be an external touchpad that can be connected to the computing device 10 by means of a cable to a cable connector 198 or a wireless transceiver 195*b* coupled to the processor 191.

The processor 191 may be any programmable microprocessor, microcomputer or multiple processor chip or chips that can be configured by software instructions (applications) to perform a variety of functions, including the functions of the various aspects described above. In some portable computing devices 10, multiple processors 191 may be provided, such as one processor dedicated to wireless communication functions and one processor dedicated to running other applications. The processor may also be included as part of a communication chipset. Typically, software applications may be stored in the internal memory 195 before they are accessed and loaded into the processor 191. In some portable computing devices 10, the processor 191 may include internal memory sufficient to store the application software instructions. For the purposes of this description, the term memory refers to all memory accessible by the processor 191, including internal memory 195 and memory within the processor 191 itself. Application data files are typically stored in the memory 195. In many portable computing devices 10, the memory 195 may be a volatile or nonvolatile memory, such as flash memory, or a mixture of both.

Those of skill in the art would appreciate that the various illustrative logical blocks, modules, circuits, and algorithm blocks described in connection with the aspects disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The order in which the blocks of a process are described and appear in the figures is for example purposes only as the order of some blocks may be changed from that described herein without changing the scope of the present invention and the claims.

The blocks of a method or algorithm described in connection with the aspects disclosed herein may be embodied directly in hardware, in a software module executed by a processor, or in a combination of the two. A software module may reside in processor readable memory which may be any of RAM memory, flash memory, ROM memory, EPROM memory, EEPROM memory, registers, hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal or computing device. In the alternative, the processor and the storage medium may reside as discrete components in a user terminal or computing device. Additionally, in some aspects, the blocks and/or actions of a method or algorithm may reside as one or any combination or set of codes and/or instructions on a machine readable medium and/or computer readable medium, which may be incorporated into a computer program product.

The foregoing description of the various aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein, and instead the claims should be accorded the widest scope consistent with the principles and novel features disclosed herein.

What is claimed is:

1. A method for sharing files among a mobile device and nearby computing devices, comprising:
    activating a file sharing functionality;
    discovering nearby computing devices within range of device discovery signals transmitted by the mobile device;
    establishing a wireless link with the discovered nearby computing devices;
    determining locations of the discovered nearby computing devices;
    detecting a file sharing gesture on a touch surface of the mobile device;
    determining whether the detected file sharing gesture includes a curved path;
    identifying a targeted computing device based on the detected file sharing gesture, wherein the targeted computing device comprises one of the discovered nearby computing devices that is positioned, relative to the mobile device, behind another one of the discovered nearby computing devices along a line of direction of the detected file sharing gesture, based upon the determination that the detected file sharing gesture includes a curved path; and
    transmitting a file sharing message to the targeted computing device.

2. The method of claim 1, wherein establishing the wireless link is accomplished using a wireless technology selected from Bluetooth®, ZigBee®, Near Field Communication (NFC), wide-area-wireless IEEE 802.11 (WiFi), infrared (IrDA), and ultrasound.

3. The method of claim 2, wherein:
    determining locations of the discovered nearby computing devices comprises receiving location coordinates provided by Global Positioning System (GPS) receivers in each of the discovered nearby computing devices via the established wireless link; and
    transmitting the file sharing message to the targeted computing device is accomplished using a wireless technology different from the wireless technology used to establish the wireless link.

4. The method of claim 1, wherein determining locations of the discovered nearby computing device comprises:
    determining a difference in arrival times of signals received from the discovered nearby computing devices using a first and second antennae; and
    using triangulation calculations based on the determined difference in arrival times of signals to determine a direction to each of the discovered nearby computing devices.

5. The method of claim 1, wherein determining locations of the nearby discovered computing device comprises:
    receiving location coordinates provided by Global Positioning System (GPS) receivers in each of the discovered nearby computing devices; and
    comparing the received location coordinates to location coordinates from a GPS receiver within the mobile device.

6. The method of claim 1, wherein detecting a file sharing gesture comprises detecting one of a flick gesture and a hand gesture.

7. The method of claim 1, wherein identifying the targeted computing device comprises:
    determining a shape of the detected file sharing gesture;
    determining a direction and speed of the detected file sharing gesture;
    calculating a location where an object would land based on the determined shape, direction and speed of the detected file sharing gesture; and
    comparing the calculated location to the determined locations of the discovered nearby computing devices to identify a computing device closest to the calculated location where an object would land.

8. The method of claim 1, wherein identifying the targeted computing device comprises:
    determining a tilt angle of the mobile device;
    determining a direction and speed of the detected file sharing gesture;
    calculating a location where an object would land based on the determined tilt angle, direction and speed of the detected file sharing gesture; and
    comparing the calculated location to the determined locations of the nearby discovered computing devices to identify a computing device closest to the calculated location where an object would land.

9. The method of claim 1, wherein transmitting a file sharing message comprises transmitting a selected file to the targeted computing device, the method further comprising:
    transmitting a request to transmit the file to the targeted computing device; and
    receiving a response from the targeting computing device including access data specifying an address to which the file should be transmitted,
    wherein transmitting the file to the targeted computing device comprises:
        determining a wireless communication link over which the file should be transmitted based upon the address specified in the received access data; and
        transmitting the file to the address via the determined wireless communication link.

10. The method of claim 9, wherein the request to transmit the file to the target computing device is accomplished using the established wireless link, and the determined wireless communication link used to transmit the file uses a wireless technology that is different than the established wireless link technology.

11. The method of claim 1, wherein transmitting a file sharing message comprises transmitting a selected file to the targeted computing device, the method further comprising:
    displaying a prompt for a user verification of the targeted computing device; and
    determining whether a user input indicates user verification of the targeted computing device,
    wherein transmitting the file to the targeted computing device is accomplished when the user input indicates user verification of the targeted computing device.

12. The method of claim 11, wherein displaying a prompt for a user verification of the targeted computing device comprises:
receiving a user identifier from discovered nearby computing devices via the established wireless link;
using the received user identifier to obtain an image from a contact database; and
displaying an obtained image as the prompt for the user verification of the targeted computing device.

13. The method of claim 1, wherein the touch surface is a touchscreen user interface, the method further comprising:
displaying a launch pad on the touchscreen user interface, wherein detecting a file sharing gesture comprises comparing one of a touch event start point and an end point to the displayed launch pad.

14. The method of claim 1, further comprising:
displaying a radar map image including graphical indicators for the determined relative locations of the discovered nearby computing devices.

15. The method of claim 1, wherein transmitting a file sharing message comprises transmitting a message requesting the targeted computing device to transmit a file.

16. The method of claim 15, further comprising:
transmitting access data to the targeted computing device, the access data including an address to which the requested file should be transmitted.

17. The method of claim 1, further comprising:
determining whether the detected file sharing gesture is directed away from the discovered nearby computing devices; and
calculating an indirect path based on the direction of the file sharing gesture and an edge of the touch surface of the mobile device,
wherein identifying the targeted computing device is based upon the calculated indirect path and the determined locations of the discovered nearby computing devices.

18. A mobile device, comprising:
a processor;
a display coupled to the processor;
a touch sensitive surface coupled to the processor;
a memory coupled to the processor; and
a first wireless transceiver coupled to the processor,
wherein the processor is configured with processor-executable instructions to perform operations comprising:
activating a file sharing functionality;
discovering nearby computing devices within range of device discovery signals transmitted by the mobile device via the first wireless transceiver;
establishing a wireless link with the discovered nearby computing devices via the first wireless transceiver;
determining locations of the discovered nearby computing devices;
detecting a file sharing gesture on the touch sensitive surface;
determining whether the detected file sharing gesture includes a curved path;
identifying a targeted computing device based on the detected file sharing gesture, wherein the target computing device comprises one of the discovered nearby computing devices that is positioned, relative to the mobile device, behind another one of the discovered nearby computing devices along a line of direction of the detected file sharing gesture, based upon the determination that the detected file sharing gesture includes a curved path; and
transmitting a file sharing message to the targeted computing device via the first transceiver.

19. The mobile device of claim 18, wherein the first transceiver is configured to communicate according to a wireless technology selected from Bluetooth®, ZigBee®, Near Field Communication (NFC), wide-area-wireless IEEE 802.11 (WiFi), infrared (IrDA), and ultrasound.

20. The mobile device of claim 19, wherein the processor is further configured with processor-executable instructions such that:
determining locations of the discovered nearby computing devices comprises receiving location coordinates provided by Global Positioning System (GPS) receivers in each of the discovered nearby computing devices via the established wireless link; and
transmitting the file sharing message to the targeted computing device is accomplished using a wireless technology different from the wireless technology used to establish the wireless link.

21. The mobile device of claim 18, further comprising:
a first antenna and a second antenna, wherein at least one of the first antenna and the second antenna is coupled to the first transceiver,
wherein the processor is further configured with processor-executable instructions such that determining locations of the discovered nearby computing device comprises:
determining a difference in arrival times of signals received from the discovered nearby computing devices via the first and second antennae; and
using triangulation calculations based on the determined difference in arrival times of signals to determine a direction to each of the discovered nearby computing devices.

22. The mobile device of claim 18, further comprising a Global Positioning System (GPS) receiver coupled to the processor,
wherein the processor is further configured with processor-executable instructions such that determining locations of the discovered nearby computing device comprises:
receiving location coordinates provided by GPS receivers in the discovered nearby computing devices; and
comparing the received location coordinates to location coordinates received from the GPS receiver.

23. The mobile device of claim 18, wherein the processor is further configured with processor-executable instructions such that detecting a file sharing gesture comprises detecting one of a flick gesture and a hand gesture on the touch sensitive surface.

24. The mobile device of claim 18, wherein the processor is further configured with processor-executable instructions such that identifying the targeted computing device comprises:
determining a shape of the detected file sharing gesture;
determining a direction and speed of the detected file sharing gesture;
calculating a location where an object would land based on the determined shape, direction and speed of the detected file sharing gesture; and
comparing the calculated location to the determined locations of the nearby discovered computing devices to identify a computing device closest to the calculated location where an object would land.

25. The mobile device of claim 18, further comprising an accelerometer coupled to the processor configured to measure a tilt angle of the mobile device,
wherein the processor is further configured with processor-executable instructions such that identifying the targeted computing device comprises:

determining a tilt angle of the mobile device using an input from the accelerometer;

determining a direction and speed of the detected file sharing gesture;

calculating a location where an object would land based on the determined tilt angle, direction and speed of the detected file sharing gesture; and comparing the calculated location to the determined locations of the nearby discovered computing devices to identify a computing device closest to the calculated location where an object would land.

26. The mobile device of claim 18, wherein the processor is further configured with processor-executable instructions such that transmitting a file sharing message comprises:

transmitting, via the first transceiver, a request to transmit a selected file to the targeted computing device;

receiving, via the first transceiver, a response from the targeting computing device including access data specifying an address to which the selected file should be transmitted, determining a wireless communication link over which the selected file should be transmitted based upon the address specified in the received access data; and transmitting the selected file to the address via the determined wireless communication link.

27. The mobile device of claim 26, wherein the processor is configured with processor-executable instructions to transmit the selected file to the target computing device via the first transceiver.

28. The mobile device of claim 26, further comprising a second transceiver coupled to the processor, wherein:

the second transceiver is configured to communicate using a wireless communication technology different from that of the first transceiver; and the processor is further configured with processor-executable instructions to transmit the selected file via the second transceiver.

29. The mobile device of claim 18, wherein:

the processor is configured with processor-executable instructions to perform further operations comprising displaying on the display a prompt for a user verification of the targeted computing device, and determining whether a user input indicates user verification of the targeted computing device; and the processor is further configured with processor-executable instructions such that:

transmitting a file sharing message comprises transmitting a selected file to the targeted computing device; and transmitting the file to the targeted computing device is accomplished when the user input indicates user verification of the targeted computing device.

30. The mobile device of claim 29, wherein the processor is further configured with processor-executable instructions such that displaying a prompt for a user verification of the targeted computing device comprises:

receiving a user identifier from discovered nearby computing devices via the established wireless link via the first transceiver;

using the received user identifier to obtain an image from a contact database stored in the memory; and displaying on the display the obtained image as the prompt for the user verification of the targeted computing device.

31. The mobile device of claim 18, wherein:

the display and the touch sensitive surface are a touchscreen display;

the processor is configured with processor-executable instructions to perform further operations comprising displaying a launch pad on the touchscreen display; and the processor is further configured with processor-executable instructions such that detecting a file sharing gesture comprises comparing one of a touch event start point and an end point to the displayed launch pad.

32. The mobile device of claim 18, wherein the processor is configured with processor-executable instructions to perform further operations comprising displaying a radar map image on the display including graphical indicators for the determined relative locations of the discovered nearby computing devices.

33. The mobile device of claim 18, wherein the processor is further configured with processor-executable instructions such that transmitting a file sharing message comprises transmitting a message requesting the targeted computing device to transmit a file.

34. The mobile device of claim 33, wherein the processor is configured with processor-executable instructions to perform further operations comprising:

transmitting access data to the targeted computing device, the access data including an address to which the requested file should be transmitted.

35. The mobile device of claim 18, wherein the processor is configured with processor-executable instructions to perform further operations comprising:

determining whether the detected file sharing gesture is directed away from the discovered nearby computing devices; and calculating an indirect path based on the direction of the file sharing gesture and an edge of the touch sensitive surface of the mobile device display, wherein the processor is further configured with processor-executable instructions such that identifying the targeted computing device is accomplished based upon the calculated indirect path and the determined locations of the discovered nearby computing devices.

36. A mobile device, comprising:

means for activating a file sharing functionality;

means for discovering nearby computing devices within range of device discovery signals transmitted by the mobile device;

means for establishing a wireless link with the discovered nearby computing devices;

means for determining locations of the discovered nearby computing devices;

means for detecting a file sharing gesture;

means for determining whether the detected file sharing gesture includes a curved path;

means for identifying a targeted computing device based on the detected file sharing gesture, wherein the targeted computing device comprises one of the discovered nearby computing devices that is positioned, relative to the mobile device, behind another one of the discovered nearby computing devices along a line of direction of the detected file sharing gesture, based upon the determination that the detected file sharing gesture includes a curved path; and means for transmitting a file sharing message to the targeted computing device.

37. The mobile device of claim 36, wherein means for establishing the wireless link uses a wireless technology selected from Bluetooth®, ZigBee®, Near Field Communication (NFC), wide-area-wireless IEEE 802.11 (WiFi), infrared (IrDA), and ultrasound.

38. The mobile device of claim 37, wherein:
means for determining locations of the discovered nearby computing devices comprises means for receiving location coordinates provided by Global Positioning System (GPS) receivers in each of the discovered nearby computing devices via the established wireless link; and
means for transmitting the file sharing message to the targeted computing device comprises means for transmitting the file sharing message using a wireless technology different from the wireless technology used by the means for establishing the wireless link.

39. The mobile device of claim 36, wherein means for determining locations of the discovered nearby computing device comprises:
means for determining a difference in arrival times of signals received from the discovered nearby computing devices using a first and second antennae; and
means for using triangulation calculations based on the determined difference in arrival times of signals to determine a direction to each of the discovered nearby computing devices.

40. The mobile device of claim 36, wherein means for determining locations of the nearby discovered computing device comprises:
means for receiving location coordinates provided by Global Positioning System (GPS) receivers in each of the discovered nearby computing devices; and
means for comparing the received location coordinates to location coordinates from a GPS receiver.

41. The mobile device of claim 36, wherein means for detecting a file sharing gesture comprises means for detecting one of a flick gesture and a hand gesture.

42. The mobile device of claim 36, wherein means for identifying the targeted computing device comprises:
means for determining a shape of the detected file sharing gesture;
means for determining a direction and speed of the detected file sharing gesture;
means for calculating a location where an object would land based on the determined shape, direction and speed of the detected file sharing gesture; and
means for comparing the calculated location to the determined locations of the nearby discovered computing devices to identify a computing device closest to the calculated location where an object would land.

43. The mobile device of claim 36, wherein means for identifying the targeted computing device comprises:
means for determining a tilt angle of the mobile device;
means for determining a direction and speed of the detected file sharing gesture;
means for calculating a location where an object would land based on the determined tilt angle, direction and speed of the detected file sharing gesture; and
means for comparing the calculated location to the determined locations of the nearby discovered computing devices to identify a computing device closest to the calculated location where an object would land.

44. The mobile device of claim 36, wherein:
means for transmitting a file sharing message comprises means for transmitting a selected file to the targeted computing device; and
means for transmitting a selected file to the targeted computing device comprises:
means for transmitting a request to transmit the file to the targeted computing device; and
means for receiving a response from the targeting computing device including access data specifying an address to which the file should be transmitted,
means for determining a wireless communication link over which the file should be transmitted based upon the address specified in the received access data; and
means for transmitting the file to the address via the determined wireless communication link.

45. The mobile device of claim 44, wherein:
means for transmitting a request to transmit the file to the target computing device comprises means for transmitting the request using the established wireless link; and
means for transmitting the file via the determined wireless communication link comprises means for transmitting the file using a wireless technology that is different than the established wireless link technology.

46. The mobile device of claim 36, further comprising:
means for displaying a prompt for a user verification of the targeted computing device; and
means for determining whether a user input indicates user verification of the targeted computing device,
wherein means for transmitting a file sharing message comprises:
means for transmitting a selected file to the targeted computing device when the user input indicates user verification of the targeted computing device.

47. The mobile device of claim 46, wherein means for displaying a prompt for a user verification of the targeted computing device comprises:
means for receiving a user identifier from discovered nearby computing devices via the established wireless link;
means for using the received user identifier to obtain an image from a contact database; and
means for displaying an obtained image as the prompt for the user verification of the targeted computing device.

48. The mobile device of claim 36, wherein means for detecting a file sharing gesture comprises:
a display;
means for detecting touch events on the display;
means for displaying a launch pad on the display; and
means for comparing one of a touch event start point and an end point to the displayed launch pad.

49. The mobile device of claim 36, further comprising:
means for displaying a radar map image including graphical indicators for the determined relative locations of the discovered nearby computing devices.

50. The mobile device of claim 36, wherein means for transmitting a file sharing message comprises means for transmitting a message requesting the targeted computing device to transmit a file.

51. The mobile device of claim 50, further comprising:
means for transmitting access data to the targeted computing device, the access data including an address to which the requested file should be transmitted.

52. The mobile device of claim 36, further comprising:
means for determining whether the detected file sharing gesture is directed away from the discovered nearby computing devices; and
means for calculating an indirect path based on the direction of the file sharing gesture and an edge of the touch surface of the mobile device,
wherein means for identifying the targeted computing device comprises means for identifying the targeted computing device based upon the calculated indirect path and the determined locations of the discovered nearby computing devices.

53. A non-transitory computer-readable storage medium having stored thereon processor-executable instructions configured to cause a processor of a mobile device to perform operations comprising:
activating a file sharing functionality;
discovering nearby computing devices within range of device discovery signals transmitted by the mobile device;
establishing a wireless link with the discovered nearby computing devices;
determining locations of the discovered nearby computing devices;
detecting a file sharing gesture on a touch surface of the mobile device;
determining whether the detected file sharing gesture includes a curved path;
identifying a targeted computing device based on the detected file sharing gesture, wherein the targeted computing device comprises one of the discovered nearby computing devices that is positioned, relative to the mobile device, behind another one of the discovered nearby computing devices along a line of direction of the detected file sharing gesture, based upon the determination that the detected filed sharing gesture includes a curved path; and
transmitting a file sharing message to the targeted computing device.

54. The non-transitory computer-readable storage medium of claim 53, wherein the stored processor-executable instructions are configured such that establishing the wireless link is performed using a wireless technology selected from Bluetooth®, ZigBee®, Near Field Communication (NFC), wide-area-wireless IEEE 802.11 (WiFi), infrared (IrDA), and ultrasound.

55. The non-transitory computer-readable storage medium of claim 54, wherein the stored processor-executable instructions are configured such that:
determining locations of the discovered nearby computing devices comprises at least one instruction for receiving location coordinates provided by Global Positioning System (GPS) receivers in each of the discovered nearby computing devices via the established wireless link; and
transmitting the file sharing message to the targeted computing device is accomplished using a wireless technology different from the wireless technology used to establish the wireless link.

56. The non-transitory computer-readable storage medium of claim 53, wherein the stored processor-executable instructions are configured such that determining locations of the discovered nearby computing device comprises:
determining a difference in arrival times of signals received from the discovered nearby computing devices using a first and second antennae; and
using triangulation calculations based on the determined difference in arrival times of signals to determine a direction to each of the discovered nearby computing devices.

57. The non-transitory computer-readable storage medium of claim 53, wherein the stored processor-executable instructions are configured such that determining locations of the nearby discovered computing device comprises:
receiving location coordinates provided by Global Positioning System (GPS) receivers in each of the discovered nearby computing devices; and
comparing the received location coordinates to location coordinates from a GPS receiver.

58. The non-transitory computer-readable storage medium of claim 53, wherein the stored processor-executable instructions are configured such that at detecting a file sharing gesture comprises detecting one of a flick gesture and a hand gesture.

59. The non-transitory computer-readable storage medium of claim 53, wherein the stored processor-executable instructions are configured such that identifying the targeted computing device comprises:
determining a shape of the detected file sharing gesture;
determining a direction and speed of the detected file sharing gesture;
calculating a location where an object would land based on the determined shape, direction and speed of the detected file sharing gesture; and
comparing the calculated location to the determined locations of the nearby discovered computing devices to identify a computing device closest to the calculated location where an object would land.

60. The non-transitory computer-readable storage medium of claim 53, wherein the stored processor-executable instructions are configured such that at least one instruction for identifying the targeted computing device comprises:
determining a tilt angle of the mobile device;
determining a direction and speed of the detected file sharing gesture;
calculating a location where an object would land based on the determined tilt angle, direction and speed of the detected file sharing gesture; and
comparing the calculated location to the determined locations of the nearby discovered computing devices to identify which of the determined locations of the nearby discovered computing devices is closest to the calculated location where an object would land.

61. The non-transitory computer-readable storage medium of claim 53, wherein:
the stored processor-executable instructions are configured such that transmitting a file sharing message comprises transmitting a selected file to the targeted computing device; and
the stored processor-executable instructions are configured to cause a processor of a mobile device to perform operations further comprising:
transmitting a request to transmit the file to the targeted computing device; and
receiving a response from the targeting computing device including access data specifying an address to which the file should be transmitted,
wherein transmitting the file to the targeted computing device comprises:
determining a wireless communication link over which the file should be transmitted based upon the address specified in the received access data; and
transmitting the file to the address via the determined wireless communication link.

62. The non-transitory computer-readable storage medium of claim 61, wherein the stored processor-executable instructions are configured such that:
transmitting a request to transmit the file to the target computing device is performed using the established wireless link; and
transmitting the file to the target computing device is performed using a wireless technology that is different than the established wireless link technology.

63. The non-transitory computer-readable storage medium of claim 53, wherein:
the stored processor-executable instructions are configured such that transmitting a file sharing message comprises transmitting a selected file to the targeted computing device; and
the stored processor-executable instructions are configured to cause a processor of a mobile device to perform operations further comprising:
displaying a prompt for a user verification of the targeted computing device; and
determining whether a user input indicates user verification of the targeted computing device, wherein the file is transmitted to the targeted computing device when the user input indicates user verification of the targeted computing device.

64. The non-transitory computer-readable storage medium of claim 63, wherein the stored processor-executable instructions are configured such that displaying a prompt for a user verification of the targeted computing device comprises:
receiving a user identifier from discovered computing devices via the established wireless link;
using the received user identifier to obtain an image from a contact database; and
at least one instruction for displaying an obtained image as the prompt for the user verification of the targeted computing device.

65. The non-transitory computer-readable medium of claim 53, wherein the stored processor-executable instructions are configured to cause a processor of a mobile device to perform operations further comprising:
displaying a launch pad on a touchscreen user interface, wherein detecting a file sharing gesture comprises comparing one of a touch event start point and end point to the displayed launch pad.

66. The non-transitory computer-readable medium of claim 53, wherein the stored processor-executable instructions are configured to cause a processor of a mobile device to perform operations further comprising:
displaying a radar map image including graphical indicators for the determined relative locations of the discovered nearby computing devices.

67. The non-transitory computer-readable storage of claim 53, wherein the stored processor-executable instructions are configured such that transmitting a file sharing message comprises at least one instruction for transmitting a message requesting the targeted computing device to transmit a file.

68. The non-transitory computer-readable medium of claim 67, wherein the stored processor-executable instructions are configured to cause a processor of a mobile device to perform operations further comprising:
transmitting access data to the targeted computing device, the access data including an address to which the requested file should be transmitted.

69. The non-transitory computer-readable medium of claim 53, wherein the stored processor-executable instructions are configured to cause a processor of a mobile device to perform operations further comprising:
determining whether the detected file sharing gesture is directed away from the discovered nearby computing devices; and
calculating an indirect path based on the direction of the file sharing gesture and an edge of the touch surface of the mobile device.

* * * * *